(12) United States Patent
Kodosky et al.

(10) Patent No.: US 8,185,832 B2
(45) Date of Patent: *May 22, 2012

(54) GRAPHICAL DEPLOYMENT OF A PROGRAM TO A DEVICE WHICH DISPLAYS THE PROGRAM CONNECTED TO THE DEVICE

(75) Inventors: Jeffrey L. Kodosky, Austin, TX (US);
Darshan Shah, Round Rock, TX (US);
Steven W. Rogers, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1067 days.

This patent is subject to a terminal disclaimer.

(21) Appl. No.: 11/953,932

(22) Filed: Dec. 11, 2007

(65) Prior Publication Data
US 2008/0141174 A1    Jun. 12, 2008

Related U.S. Application Data

(63) Continuation of application No. 10/113,067, filed on Apr. 1, 2002, now Pat. No. 7,367,028.

(60) Provisional application No. 60/312,242, filed on Aug. 14, 2001.

(51) Int. Cl.
*G06F 3/048* (2006.01)

(52) U.S. Cl. ........ 715/763; 715/764; 715/765; 715/771; 715/835; 715/839; 715/967; 715/970

(58) Field of Classification Search .................. 715/763, 715/764, 765, 771, 835, 839, 847, 967, 970
See application file for complete search history.

(56) References Cited

U.S. PATENT DOCUMENTS
4,812,996 A    3/1989 Stubbs
(Continued)

FOREIGN PATENT DOCUMENTS
EP    443768 A2 *    8/1991
(Continued)

OTHER PUBLICATIONS

Tracy Marks, "Windows 95 Manual," Windweaver Training Online, Jun. 2, 1997, pp. 1-9.

(Continued)

*Primary Examiner* — Doon Chow
*Assistant Examiner* — Shen (Connie) Shiau
(74) *Attorney, Agent, or Firm* — Meyertons Hood Kivlin Kowert & Goetzel, P.C.; Jeffrey C. Hood; Mark S. Williams

(57) ABSTRACT

A system and method for creating and using configuration diagrams for configuring distributed systems. The methods described herein may be used for various types of operations in configuring distributed systems, including creating programs, managing programs in the distributed system, deploying programs to various distributed devices, configuring remote execution or inter-operation of distributed programs, and executing distributed applications. Embodiments of the invention utilize graphical iconic-based techniques for performing the above operations. The configuration diagram may include device icons which represent devices and program icons which represent programs. Device icons and program icons may be associated with each other to accomplish various program creation and deployment operations. Device icons and program icons may also interact with graphical program nodes or icons. Context sensitive device connections and/or program connections are displayed. An asynchronous data flow node may be used to facilitate asynchronous data flow between two graphical programs. The distributed system may also support distributed graphical debugging.

15 Claims, 42 Drawing Sheets

U.S. PATENT DOCUMENTS

| | | | |
|---|---|---|---|
| 4,868,785 A | 9/1989 | Jordan et al. | |
| 4,884,228 A | 11/1989 | Stanley et al. | |
| 5,136,705 A | 8/1992 | Stubbs et al. | |
| 5,155,836 A | 10/1992 | Jordan et al. | |
| 5,261,043 A * | 11/1993 | Wolber et al. | 715/809 |
| 5,309,352 A | 5/1994 | Stubbs | |
| 5,313,574 A * | 5/1994 | Beethe | 715/763 |
| 5,313,575 A * | 5/1994 | Beethe | 715/763 |
| 5,325,481 A * | 6/1994 | Hunt | 715/809 |
| 5,416,901 A | 5/1995 | Torres | |
| 5,448,739 A | 9/1995 | Jacobson | |
| 5,481,741 A | 1/1996 | McKaskle | |
| 5,630,164 A | 5/1997 | Williams et al. | |
| 5,742,286 A | 4/1998 | Kung et al. | |
| 5,777,616 A * | 7/1998 | Bates et al. | 715/837 |
| 5,801,942 A | 9/1998 | Nixon et al. | |
| 5,812,394 A | 9/1998 | Lewis et al. | |
| 5,825,361 A | 10/1998 | Rubin et al. | |
| 5,828,851 A | 10/1998 | Nixon et al. | |
| 5,838,563 A | 11/1998 | Dove et al. | |
| 5,861,882 A | 1/1999 | Sprenger et al. | |
| 5,971,581 A | 10/1999 | Gretta et al. | |
| 5,991,537 A | 11/1999 | McKeon et al. | |
| 5,999,178 A * | 12/1999 | Hwang et al. | 715/787 |
| 6,064,816 A | 5/2000 | Parthasarathy et al. | |
| 6,078,320 A | 6/2000 | Dove et al. | |
| 6,098,028 A | 8/2000 | Zwan et al. | |
| 6,102,965 A | 8/2000 | Dye et al. | |
| 6,239,800 B1 | 5/2001 | Mayhew et al. | |
| 6,259,448 B1 * | 7/2001 | McNally et al. | 715/733 |
| 6,418,391 B1 * | 7/2002 | Umezu et al. | 702/123 |
| 6,434,500 B1 * | 8/2002 | Boehne et al. | 702/120 |
| 6,437,805 B1 | 8/2002 | Sojoodi et al. | |
| 6,615,088 B1 | 9/2003 | Myer | |
| 6,642,943 B1 | 11/2003 | Machida | |
| 7,307,647 B2 | 12/2007 | Hatori et al. | |
| 2003/0084436 A1 | 5/2003 | Berger et al. | |
| 2003/0088852 A1 | 5/2003 | Lacas et al. | |

FOREIGN PATENT DOCUMENTS

| | | |
|---|---|---|
| EP | 508632 A2 * | 10/1992 |
| WO | WO 91/07719 | 5/1991 |
| WO | WO 01/29632 A2 | 4/2001 |

OTHER PUBLICATIONS

National Instruments Corporation, LabView User Manual, Chapter 2: Introduction to Virtual Instruments, Jul. 2000, pp. 2-1 through 2-5.

National Instruments™ LabVIEW™ Real-Time User Manual; Apr. 2001 Edition; 44 pages; National Instruments Corporation; Austin, Texas U.S.A.

Aho, Sethi, and Ullman, "Compilers: Principles, Techniques, and Tools", 1986, Addison-Wesley, ISBN 0-201-10088-6, Chapter 1.

"Unicenter TNG Framework Version 2.0: Administrator Guide", 1997, Computer Associates, Inc.

Wiberg, Per-Arne; "Graphical Programming of Time-Deterministic Real-Time-Systems"; 2nd IEEE International Conference on Engineering of Complex-Computersystems; ICECCS' 96 Konferenzband, ISBN 0-8186-7614-0; pp. 173-180.

\* cited by examiner

GRAPHICAL DEPLOYMENT OF A PROGRAM TO A DEVICE WHICH DISPLAYS THE PROGRAM CONNECTED TO THE DEVICE

PRIORITY AND CONTINUATION DATA

This application is a continuation of U.S. patent application Ser. No. 10/113,067, titled "Graphically Deploying Programs on Devices in a System", filed Apr. 1, 2002 now U.S. Pat. No. 7,367,028, whose inventors are Jeffrey L. Kodosky, Darshan Shah and Steven W. Rogers, and which claims benefit of priority of U.S. provisional application Ser. No. 60/312,242 titled "System and Method for Graphically Creating, Deploying and Executing Programs in a Distributed System" filed Aug. 14, 2001, whose inventors are Jeffrey L. Kodosky, Darshan Shah and Steven W. Rogers.

FIELD OF THE INVENTION

The present invention relates to the fields of system design and distributed software programming and deployment, and more particularly to a system and method for enabling a user to more easily specify or create distributed systems and/or applications utilizing a configuration diagram. The present invention further relates to techniques for graphically distributing or deploying programs among a plurality of different devices or nodes in a distributed system.

DESCRIPTION OF THE RELATED ART

With the advent of networked computer systems, there has been a trend in computer software to provide more distributed software applications. For example, in some fields developers are attempting to distribute software applications among two or more nodes or computer systems in a network, wherein the application may comprise a plurality of different software programs executing in a plurality of different computer systems.

Measurement and automation systems are moving toward computer based systems wherein a computer system performs much of the processing, analysis, or control for measurement and automation applications. Measurement and automation systems are also moving toward network-based or distributed systems, wherein a plurality of network-based devices operate together to perform a desired measurement and/or automation function. Various new intelligent devices are also starting to appear in measurement and automation systems, such as smart sensors, smart cameras, smart motion control devices, smart distributed data acquisition devices, computer based instrument cards, PXI and VXI systems which may include intelligent controllers or reconfigurable devices, programmable logic controllers (PLCs), etc.

Computer-based measurement and automation systems which employ intelligent devices have become increasingly desirable in view of the increasing complexity of measurement and automation tasks, and the variety of intelligent or programmable instruments and devices available for use. However, due to the wide variety of possible testing and control situations and environments, and also the wide array of instruments or devices available, it is often necessary for a user to develop custom programs to control a desired system.

Increasingly, computers are required to be used and programmed by those who are not highly trained in computer programming techniques. This is particularly true in the measurement and automation fields, where engineers are often required to develop a test, measurement or automation application to accomplish a certain objective. As a result, in many cases it is extremely difficult for a user to be able to create various computer programs and distribute these programs among devices in a distributed system.

Therefore, it would be desirable to be able to provide the capability for a user or developer to easily create, distribute and/or deploy applications among various components in a distributed system.

SUMMARY OF THE INVENTION

One embodiment of the present invention comprises a system and method for creating and using configuration diagrams for configuring systems. The methods described herein may be used for various types of operations in configuring, managing and specifying systems and devices, including creating programs, managing programs in the system, deploying programs to various distributed devices, configuring remote execution or inter-operation of distributed programs, and executing distributed applications. Embodiments of the present invention may also be used for device configuration, data distribution among or between devices, system and I/O configuration, data storage/management, and debugging and performance analysis. Embodiments of the invention may utilize graphical iconic-based techniques for performing the above operations.

In one embodiment, the user may create or assemble a configuration diagram on a computer system (e.g., the "main" computer system) representing a system, e.g., a distributed system. The configuration diagram may include device icons that represent devices in the system. The device icons preferably have an appearance which corresponds to the device they represent. This allows the viewer to easily view and consider what devices are present in the system. Thus, in a system which comprises two or more devices coupled to each other, such as through a network, a serial or parallel bus, or through wireless means, etc., the configuration diagram may include a device icon for each of the devices present in the system. The user may at least partially create or assemble the configuration diagram, or the configuration diagram may at least partially be automatically or programmatically created, or both.

One or more of the device icons may also store information associated with its respective device, such as information regarding I/O channels, data points, current configuration, calibration information, etc. The user may select a device icon to configure or view I/O channels, data points, and/or other information or elements associated with the device.

The configuration diagram may display connections between the device icons. The displayed connections may correspond to couplings between the plurality of devices. In one embodiment, the displayed connections between respective device icons have an appearance to visually indicate a type of connection between the devices corresponding to the respective device icons. For example, the displayed connections may have an appearance that varies according to one or more of color, size or shading to indicate the type of connection between the devices. The appearance of the respective connections may indicate whether the connection is a network connection, internal bus connection, external parallel bus connection, external serial bus connection (e.g., USB or IEEE 1394) or a wireless connection. The appearance of the respective connections may also, or instead, indicate the type of data or material flow between devices. In another embodiment, the configuration diagram may include labels displayed proximate to the connections to visually indicate types of connection. The displayed connections or displayed information may also operate to indicating cabling or connection requirements, or recommend cabling or connection types between devices.

The configuration diagram may also display program icons corresponding to programs present in the system, e.g., programs residing in the various devices or programs available for deployment to the various devices. The program icons may be displayed associated with or proximate to the respective device icons corresponding to the respective devices in which the programs reside. The user may also at least partially create one or more programs which perform a desired function within the system. For example, the user can create a program (or select an existing program), create a program icon for the program, if necessary, and iconically deploy the program icon to a device. As described below, the user may create or modify programs using the configuration diagram.

The program icons may be displayed with connections to visually indicate their relationship, such as their invocation (e.g., caller/callee) relationship. Thus the configuration diagram may display an iconic relationship view of the various programs present within the system. The iconic relationship view may comprise an object-oriented view, a hierarchy view, a tree view, a data flow view, an execution flow view, a control flow view, or combinations thereof. Thus, in the case of a program which is configured as a hierarchy of a main program and one or more sub-programs, the system may display a hierarchy view comprising an icon representing the main program and an icon representing each of the one or more sub-programs, wherein the icons are arranged and/or are shown as being connected in the respective hierarchy. In the case of a plurality of software objects configured to invoke methods and trigger events on each other, the system may display an object-oriented view comprising an icon representing each of the programs, and possibly connections indicating the method invocation and/or event messaging. In the case of a graphical program which is configured as a hierarchy of a main graphical program and one or more sub-graphical programs (e.g., a main VI and one or more sub-VIs), the system may display a hierarchy view comprising an icon representing the main graphical program, an icon representing each of the one or more sub-graphical programs, and connections between the program icons visually indicating the hierarchy.

The iconic relationship view of the various software programs may be displayed in the configuration diagram, or may be displayed in a separate window on the display. In one embodiment, the program icons are displayed in the configuration diagram proximate to (or connected to) the device icons of the devices in which they are stored. Connections are displayed between the various program icons to visually indicate their invocation relationship. As another example, the program icons may be displayed in a separate window to avoid cluttering the configuration diagram.

The configuration diagram may also display a GUI or palette of program icons corresponding to programs that may be included in the user's system. For example, the user of the main computer system may access a server and view a palette of program icons, from which the user may select program icons to include in his/her configuration diagram.

The configuration diagram may support various types of views, such as an entire system view, a subsystem view, a device view, a program view, etc. For example, the user can "drill down" in the configuration diagram to view a selected portion of the diagram, e.g., a selected subsystem of devices, a single device, the programs associated with a device, the data points associated with a device, the I/O channels associated with a device, etc.

In one embodiment, the configuration diagram may at least partly be automatically or programmatically created by the computer system based on an automatic detection of devices, programs, and/or other elements resident in the system. For example, Plug & Play software or other detection software may detect devices present in the system, their interconnections or couplings, information associated with the various devices, and programs resident in the various devices, and automatically display a portion or all of a configuration diagram. For example, the computer system may perform an automatic detection and automatically display device icons corresponding to detected devices and connections (e.g., "connection icons" or "wires") between respective device icons corresponding to the couplings between devices automatically detected in the system. The connections between device icons that are automatically displayed may be displayed with an appearance indicating the type of detected connection. The detection software may also automatically detect programs present in the system and display corresponding program icons. In a similar manner, software may also detect the relationship (e.g., invocation relationship) among programs resident in the various devices in the system and automatically display connections between the program icons to visually indicate the determined relationship. Detection software may also detect other elements in the system (e.g., data points, I/O channels) and display corresponding icons in the configuration diagram.

The configuration diagram may also be created at least partly based on manual user input. For example, the user may manually drag and drop device icons and/or program icons from a palette or menu to at least partially create the configuration diagram. In one embodiment, the user may manually connect device icons on the configuration diagram, such as by using a pointing device. For example, in creating or modifying a configuration diagram, the user can associate, e.g., drag and drop, or otherwise connect, a first device icon to a second device icon. For example, the user may use a pointing device (e.g., a mouse), and may possibly use a "wiring tool" icon on the display, to connect a first device icon to a second device icon. This may cause a connection, e.g., a wire, to appear between the device icons to indicate a coupling relationship between the two (or more) device icons. The connection that is displayed between two device icons may be context sensitive as described above. In other words, the connection that is displayed or created on the display may have a context or appearance that is associated with the types of devices that are being connected, the type of physical connection between the respective devices, and/or the type of data or material flow between the devices.

In one embodiment, the user may manually connect program icons on the configuration diagram, such as by using a pointing device (and/or "wiring tool" icon), to specify an invocation (caller/callee) relationship among the programs. The user may also modify connections between program icons to modify the invocation relationship among programs. For example, the user can graphically modify (e.g., using a pointing device) the connection displayed between a first program and a second program so that the connection is displayed between the first program and a third program. This graphical operation by the user may operate to change the invocation relationship between these programs (including changes to the programs themselves) so that the first program now calls the third program instead of the second program. In other words, this graphical operation may also cause a modification or addition of code in one or more of these programs to effect the change in invocation relationship.

In one embodiment, the configuration diagram (i.e., software) is operable to perform type checking of connections between device icons. The configuration diagram may also be operable to perform type checking of connections between program icons, e.g., to verify that a first program corresponding to a first program icon can invoke (or be invoked by) a second program corresponding to a second program icon.

The user may perform various operations using the configuration diagram.

In one embodiment, the user may operate to deploy programs to devices by graphically associating program icons with device icons. For example, the user may select various program icons, e.g., from the relationship view (within or outside the configuration diagram), or from a palette or other GUI, and associate them with various device icons (or other program icons) contained in the configuration diagram. This operation of associating program icons with device icons (or other program icons) in the configuration diagram may operate to deploy, either immediately or when the use selects "apply", the respective programs on the various devices which correspond to the device icons (or within a program relationship or hierarchy represented by the program icons). Deploying a program (e.g., graphically associating a program icon corresponding to a program residing in a first device with a device icon corresponding to a second device) may comprise: 1) moving the program from the first device to the second device (where the program is deleted from the first device), 2) copying the program from the first device to the second device (where the program remains stored on the first device), 3) transferring the program from the first device to the second device for remote execution on the second device, wherein the program on the second device is invoked for execution by a program on the first device, and wherein at least one program on the first device may be configured or modified to invoke the program on the second device; 4) transferring remote execution of the program from the first device to the second device, wherein the program is originally to be remotely invoked on the first device, and after the operation the program is remotely invoked on the second device, wherein the remote invocation is performed by a program or application on a different device (other than the first device or second device), such as the main computer system; or 5) creating a call or invocation in a program on the second device to invoke the program on the first device, wherein the program remains on the first device, and at least one program on the second device may be configured or modified to invoke the program on the first device. Various other deployment operations are also contemplated.

The operation of associating program icons with device icons (or other program icons) in the configuration diagram may operate to deploy, or cause to be deployed, the respective programs on the various devices which correspond to the device icons. For example, if the user selects a first program icon and associates (e.g., drags and drops) this first program icon on to a first device icon which represents a first device, and the user optionally selects "apply", this may operate to deploy a first program corresponding to that first program icon on to the first device which corresponds to that first device icon. This provides a greatly simplified mechanism for deploying programs on various devices in a distributed system.

The graphical association or deployment performed by the user as described herein is preferably graphically or visually performed and represented in the configuration diagram. Thus the configuration diagram may be visually updated to reflect the actions performed by the user. Stated another way, the configuration diagram may be updated in real time as the user performs iconic operations as described herein, such as the deployment operations discussed above. Thus the configuration diagram may display an updated iconic relationship view of the devices and distributed programs as the user associates (e.g., drags and drops) the program icons on the device icons, the program icons on other program icons, the device icons on other device icons, etc. For example, as the user drags and drops program icons (e.g., from the configuration diagram) on to various device icons on the configuration diagram, the system may operate to update the displayed relationship (e.g., hierarchy) of programs proximate to, e.g., underneath, the respective device icon to where they have been deployed, modify the appearances of icons, etc.

In one embodiment, when the user associates program icons with various device icons contained in the configuration diagram, the configuration diagram is immediately updated accordingly, but this operation of associating does not operate to deploy programs at that time. Rather, the user may be required to select an "apply" feature for the deployment to actually occur. This allows the user to view various configuration diagram options before a deployment actually occurs. In another embodiment, a preview window may be employed to allow the user to view proposed changes to a configuration diagram prior to the change being committed or applied.

In one embodiment, the user can graphically manipulate program icons to add or modify program code in the programs. For example, the user can select a first program icon or node, which may be associated with (e.g., stored on) a device (e.g. a first device), and associate this first program icon with (e.g., drag and drop onto) a second program icon of a second device (or of the first device). This may cause the code (source code) of the second program to be displayed. Alternatively, the user may first cause the source code of the second program to be displayed, and then may drag and drop the program icon into the displayed source code. The user may then further graphically navigate, e.g., move or drag, the first program icon within the source code that has been displayed and drop or place the first program icon at a respective location in the displayed source code. As a result, the first program corresponding to the first program icon may be deployed within the second program, e.g., the second program may be automatically modified to include the first program. Alternatively, the second program may be modified to invoke the first program. The first program may be deployed to the second device for execution with the second program on the second device. Alternatively, at the user's option, the first program may remain on the first device, and the second program on the second device may be configured or modified to remotely invoke the first program on the first device.

Where the second program icon corresponds to a graphical program, this association may cause the block diagram corresponding to this program icon to automatically be displayed. In this instance, the user may then further graphically navigate, e.g., move or drag, the first program icon within the block diagram that has been displayed and drop or place the first program icon at a respective location in the graphical program. This may cause the first program icon to be copied or inserted into the displayed block diagram at the selected location. Alternatively, a graphical program node may be displayed in the diagram which is associated with or operable to call the first program, and the user may graphically position this node at a desired location in the block diagram. The user may select a flow path, such as a data flow wire, in which to position or "drop" the first program icon (or node). As a result, the first program icon (or node) may be inserted on to or in the execution or data path of the selected wire in the block diagram of the graphical program and configured to execute. For example, where the first program is itself a graphical program, the first program icon may be inserted as a sub-VI in the second graphical program or block diagram. Alternatively, the first program icon (or node) may appear or be placed in a location of the block diagram, and the user may then manually connect or "wire up" the first program icon (or node) with other nodes in the block diagram.

The first program icon that is being dragged and dropped into the block diagram may also be of a different type, such as a DLL or an executable program compiled from a text based programming language, etc. When the user drags and drops this first program icon into the block diagram corresponding to the destination program icon, and on to a respective dataflow path, the first program icon (or another node) may be automatically created in the respective dataflow path that is able to invoke or call this first program, or which may otherwise represent execution of the first program. For example, if the first program is a DLL, and the user drags the first program icon on to a data flow wire of a block diagram, a node may be inserted into the block diagram that is configured to invoke the first program as a DLL. The node may have the appearance of the first program icon. Alternatively, the first program may be programmatically converted into a graphical code format, e.g., LabVIEW code.

Where the second program icon in this example corresponds to a textual programming language based program, this association of the first program icon with the second program icon may cause the textual source code corresponding to the second program icon to automatically be displayed. The user may then further graphically navigate, e.g., move or drag, the first program icon within the textual source code that has been displayed and drop or place the first program icon at a respective location in the textual source code. This may cause a call or invocation (e.g., a function call) to the first program to be copied or inserted into the displayed textual source code of the second program at the selected location. In other words, textual source code may be automatically added to the second program. The type of call inserted into the displayed textual source code of the second program may depend on whether the first program is a graphical program or another type of program. The first program corresponding to the first program icon may then be deployed to the second device for execution with the block diagram on the second device. Alternatively, at the user's option, the first program may remain on the first device, and configured for remote invocation by the textual source code program (after compilation) on the second device.

In one embodiment, the user may associate (e.g., drag and drop) a device icon into the source code of a program. For example, the user can select a first device icon, which may correspond to a device and associate this device icon with (e.g., drag and drop onto) a program icon. This may cause the code (source code) of the corresponding program to be displayed. Alternatively, the user may first cause the source code of the program to be displayed, and then may drag and drop the device icon into the displayed source code. As a result, the device icon may appear in the displayed source code. The user may then further graphically navigate, e.g., move or drag, the device icon within the source code that has been displayed and drop or place the first device icon at a respective location in the source code. In response to this operation, e.g., placement of the device icon in the program source code, additional program code may be included in the program that performs functionality associated with the device.

Where the program icon corresponds to a graphical program, this association may cause the block diagram corresponding to this program icon to automatically be displayed. In this instance, the user may then further graphically navigate, e.g., move or drag, the device icon within the block diagram that has been displayed and drop or place the device icon at a respective location in the graphical program. This may cause the device icon to be copied or inserted into the displayed block diagram at the selected location. Alternatively, a graphical program node may be displayed in the diagram which is associated with or operable to access or invoke functionality of the device, and the user may position this node at a desired location in the block diagram. The user may select a flow path, such as a data flow wire, in which to position or "drop" the device icon (or node). The device icon may then be inserted on to or in the execution or data path of the selected wire in the block diagram of the graphical program and configured to execute. The user may also manually connect or wire the device icon with other nodes in the diagram.

The user may optionally indicate an operation that is desired with respect to this device in the block diagram. In one embodiment, a graphical user interface (GUI) or configuration dialog may appear wherein the user can provide input indicating the desired operation. For example, the user may drag and drop a device icon of a first device into a block diagram, and provide user input that indicates that the block diagram should create code and/or data structures, and/or should include a node icon in the diagram, which operates to programmatically access this device to publish and/or subscribe data to/from the device.

For example, the user may create a graphical program which communicates with one or more measurement devices by dragging and dropping corresponding device icons into the graphical program diagram. As one example, the user may open a LabVIEW block diagram and create a While loop structure. The user may then drag and drop device icons corresponding to sensors into the While loop structure. This may cause the graphical program diagram to be configured to access these sensors and read data produced by these sensors.

In one embodiment, the user may graphically configure or deploy a program. The user may cause the computer system to display the source code of a program. The program may be written in a text-based programming language, or may be a graphical program. The computer system display may also include a configuration diagram that displays a first device icon that corresponds to a first device. The user may then select a portion of the source code of the program and graphically associate the portion of the source code with the first device icon. Where the program is written in a text-based programming language, the user may highlight the desired source code portion (e.g., highlight the C code portion, such as a subroutine) and drag and drop this code portion onto the device icon. Where the program is written in a graphical programming language, the user may select one or more nodes in the graphical program and drag and drop them on one or more device icons. This graphical association may cause deployment of the source code portion onto the first device for execution on the first device. In addition, the system may modify the program to configure the program to invoke execution of the source code portion on the first device. Thus, when the program executes, the program invokes execution of the source code portion on the first device.

As an example of the embodiment described above, the user can graphically configure nodes in a graphical program for remote execution. For example, where the program is a graphical program, such as a LabVIEW VI, the system may display the block diagram of the graphical program. The user can select nodes in the graphical program and associate, e.g., by drag and drop or menu selection techniques, these graphical program nodes with device icons (or program icons) in the configuration diagram. As a result, the functionality (program instructions and/or data structures) of the node (or nodes) may be deployed to the selected remote devices. A new icon may be displayed in the block diagram to visually indicate to the user that this node is being remotely executed. The new icon may be a modified node icon which includes at least a portion of the appearance of the original node, as well as an additional image portion to indicate the remote execution. For example, the icon in the block diagram may change its appearance to visually indicate to the user that this node (the code represented by this node) is deployed on a remote device and will execute on the remote device. The deployment of a sub-program of a graphical program block diagram on a remote device is particularly useful where there are multiple instances of the same sub-program in the main graphical program, and the user desires to select a particular sub-program for deployment.

This graphical association may involve determining if the device is capable of executing graphical programming code. If the device is not capable of executing graphical programming code, the graphical program code corresponding to this node may be automatically converted to a DLL, hardware configuration program, or other appropriate software format.

Therefore, as described above, where a program icon on the configuration diagram corresponds to a graphical program, the user may perform various additional operations. As another example, if the user desires to choose a specific location in the graphical program to have a call made to a remote device, this may be performed graphically within the graphical program. In other words, if the user desires to choose a particular function node in the graphical program to make a call or invoke a program on a remote device (e.g., different computer), this may be easily performed using the block diagram of the graphical program and graphical association techniques described herein. Additionally, as described above, if the user desires to have one or more nodes or sub-programs in the graphical program execute on a remote device, this may also be performed easily using the graphical association techniques described herein. The user may further incorporate device icons or program icons directly into a desired location in a graphical program using the graphical association techniques described herein. This provides a simple graphical mechanism for distributing functionality of a graphical program among various devices in a system. The user can simply drag and drop nodes in the graphical program on to various device icons to distribute the functionality represented by these nodes among the various devices.

The operation of associating icons with other icons (e.g., associating program icons with device icons, program icons with other program icons, device icons with program icons, etc.) in the configuration diagram may be performed with "drag and drop" techniques, menu-based techniques, dialog box techniques, speech recognition techniques, or other techniques.

In one embodiment, the user may be able to include an asynchronous data flow node or icon in two or more block diagrams or graphical programs to allow distributed execution among the two or more block diagrams or graphical programs. An asynchronous data flow icon may include two portions which are related to the same queue or memory. One portion of the asynchronous data flow icon may be a reader portion and the other portion may be a writer portion. The user may distribute the reader and writer portions with different devices or different programs, e.g., using the association techniques described above. Thus, a writer portion of the asynchronous data flow node in a first block diagram may operate to write data to the queue, and a reader portion of the asynchronous data flow node (or a different asynchronous data flow node) in a second different block diagram may operate to read data from this queue. These reads and writes may occur asynchronously to each other. This allows a first block diagram to communicate data to a second block diagram, wherein the data may be communicated asynchronously with respect to the second block diagram. This asynchronous data flow may also be configured for bi-directional communication, i.e., with readers and writers in both the first and second block diagrams or graphical programs. This asynchronous data flow may be particularly desirable between a computer system and a remote device.

In another embodiment, remote debugging of graphical program block diagrams may be performed in a distributed system. For example, where a graphical program is deployed on a remote device, the user at the main computer may be able to select the device icon and/or select a respective program icon associated with the device and view the block diagram of the graphical program. The user may thus be able to view the block diagram on the display of the main computer system, wherein this block diagram is actually executing on a remote device. The user may then be able to use various debugging tools that are useful with respect to block diagrams, such as break points, single stepping, and execution highlighting.

The user thus may be able to use the displayed block diagram as a graphical user interface for debugging the block diagram executing on the remote device. The user can single step through the block diagram executing on the remote device using the block diagram GUI displayed on the main computer system display. Also, as a block diagram executes on a remote device, the user may be able to view the block diagram on the main computer system, wherein the respective nodes in the block diagram displayed on the main computer system are highlighted as these nodes execute on the remote device. The user may also be able to view the data output from each of the respective nodes on the block diagram displayed on the main computer system as the respective nodes produce data executing on the remote device.

The user may use the configuration diagram to start execution of the programs contained in the devices. As the various programs execute, the configuration may be animated to visually indicate which programs and/or devices are executing. For example, the various program icons and/or device icons may be highlighted to visually indicate which programs and/or devices, respectively, are executing.

The user may incorporate programs into the configuration diagram from any of various devices, including remote servers coupled to a network, such as the Internet. For example, in a measurement application, a server at National Instruments may store or host various measurement applications or programs that can be used by any user, or registered users. The user may choose to connect to a server and view icons corresponding to the programs, applications, or projects present on the server, and incorporate these program icons (or application or project icons) into the configuration diagram using graphical association techniques described herein. The programs used or represented in the configuration diagram may be any of various types, including software programs of various types, hardware configuration programs, etc. The user may also select an entire configuration diagram from the server.

The user may use the configuration diagram as a mechanism for specifying devices to be purchased from a vendor. For example, the user can assemble a configuration diagram including device icons which represent devices (and/or programs) that the user desires to use or purchase for his/her system. The user may then connect to a server computer system and provide the configuration diagram as a specification for the devices and/or programs the user desires +to purchase. The server computer system, which may be located at a manufacturing site, may receive the configuration diagram, determine the desired devices from the configuration diagram, and present information to the user indicating the total cost for the requested devices. The user may then choose to purchase one or more of the recommended devices from the server computer system. These devices may then be shipped to the user. In another embodiment, the server may programmatically query the devices and/or programs present in the user system, and generate a configuration diagram that is displayed on the user's computer system representing the current state of the user's system. The user may then add device icons and/or program icons from a palette on the server or the client computer to indicate desired modifications to the user system. This updated configuration diagram may then be provided back to the server as a purchase request as described above.

BRIEF DESCRIPTION OF THE DRAWINGS

A better understanding of the present invention can be obtained when the following detailed description of the preferred embodiment is considered in conjunction with the following drawings, in which.

Figure 1:
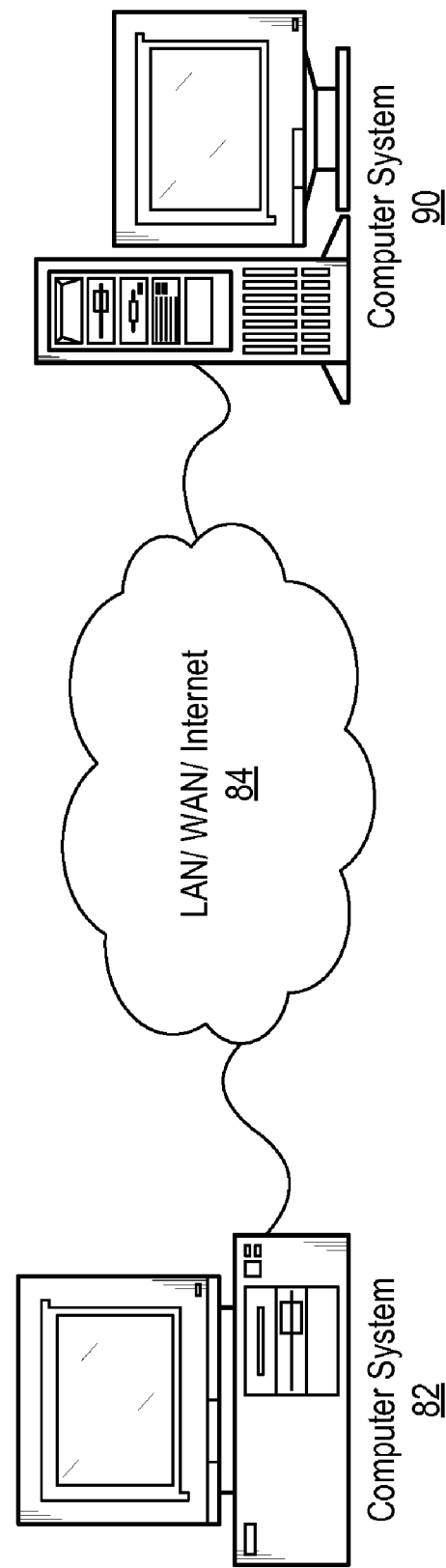
FIG. 1 illustrates a network system comprising two or more computer systems that implements an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000.

U.S. patent application Ser. No. 09/745,023 titled "System and Method for Programmatically Generating a Graphical Program in Response to Program Information," filed Dec. 20, 2000.

U.S. Provisional Patent Application Ser. No. 60/312,242 titled "System and Method for Graphically Creating, Deploying and Executing Programs in a Distributed System" filed Aug. 14, 2001.

U.S. patent application Ser. No. 10/113,067, titled "Graphically Deploying Programs on Devices in a System", filed Apr. 1, 2002.

The LabVIEW and BridgeVIEW graphical programming manuals, including the "G Programming Reference Manual", available from National Instruments Corporation, are also hereby incorporated by reference in their entirety.

FIG. 1—Computer Network

FIG. 1 illustrates an exemplary system including a first computer system 82 that is coupled to a second computer system 90 over a network. The computer system 82 may be coupled through a network 84 (or a computer bus) to the second computer system 90. The computer systems 82 and 90 may each be any of various types, as desired. Also, the network 84 can also be any of various types, including a LAN (local area network), WAN (wide area network), the Internet, or an Intranet, among others.

The first and second computer systems 82 and 90 may comprise devices that form at least a portion of a system, such as a distributed system. Alternatively, the computer system 82 may comprise part of the system, and the server computer system 90 may provide various services to the system, such as a selection of programs and/or devices for the system, or generation of a configuration diagram for the system as described herein.

Additional computer systems (not shown) may also couple to the first and/or second computer systems 82 and 90. Various other devices may connect or couple to one or more of the computer systems 82 and 90, or to other computer systems in the system. For example, any one or more of the devices shown in FIGS. 2A and 2B may couple to one or both of the computer systems 82 and 90. In addition, the system may comprise a single computer system, such as computer system 82, coupled to one or more other devices.

As used herein, the term "system" is intended to include a system comprising two or more interconnected or coupled devices, i.e., two or more devices that are coupled together in some fashion. The two or more devices may be coupled together via wired or wireless means. Wired means may include a network, such as a local area network (LAN) and/or a wide area network (WAN), such as the Internet, a computer bus, a serial or parallel bus, or other wired communication methods. Example local area networks include Ethernet networks, Token Ring networks, and various industrial communication networks such as Foundation Fieldbus, DeviceNet, and CAN (Controller Area Network) networks. Example parallel buses include the PCI bus, PXI bus, GPIB, and VXI bus, among others. Example serial buses include USB (Universal Serial Bus), IEEE 1394, RS-242, and RS-485, among others. Wireless means may include wireless protocols such as IEEE 802.11 (wireless Ethernet), Bluetooth, and other types of wireless communication.

As used herein, the term "device" is intended to have its ordinary meaning as any of various types of devices, units or components. The term "device" is intended to include "programmable devices" and "non-programmable devices".

As used herein, the term "programmable device" is intended to include any of various types of devices that include one or more of: 1) a processor and memory; or 2) a programmable hardware element or reconfigurable logic. Exemplary types of processors include a conventional microprocessor or CPU (such as an X86, PowerPC, SunSparc, etc.), a digital signal processor (DSP), microcontroller, or other type of processor. Exemplary types of programmable hardware elements include a programmable logic device (PLD), e.g., an FPGA (field programmable gate array), or other types of reconfigurable logic. It is noted that a program may typically only be deployed to or stored on a programmable device. In the description that follows, references to devices in the context of deploying, storing, or modifying programs on the device generally refer to programmable devices.

Exemplary types of programmable devices include computer systems; network devices; personal digital assistants (PDAs); television systems; measurement devices (including instruments, industrial automation devices, process control devices, smart data acquisition devices, smart sensors (including smart cameras), smart actuators, video devices (e.g., digital cameras, digital video cameras); audio devices; computer peripherals; telephones; appliances; or other processor-based or programmable hardware-based devices. Exemplary measurement and automation devices include any of the devices shown in FIGS. 2A and 2B. Exemplary network devices include network interface cards, routers, bridges, switches, hubs, etc.

The term "non-programmable device" is intended to include any of various components, such as transducers, sensors, connector blocks, cabling, and other non-programmable devices.

As used herein, the term "computer system" may include any type of computer system, including a personal computer system, mainframe computer system, workstation, network appliance, Internet appliance, etc. In general, the term "computer system" can be broadly defined to encompass any device having at least one processor that executes instructions from a memory medium.

As used herein, the term "application" includes one or more programs. An application may comprise a plurality of programs which operate together to perform a function or accomplish a certain result. The plurality of programs may operate together in a system, wherein various programs may be deployed to various devices in the system for distributed execution. An application may thus comprise a plurality of programs distributed among a plurality of devices for distributed execution. An application may also include other data structures such as configuration files for configuring hardware devices, help files, supporting documentation, etc. The term "project" may be used similarly to an "application".

As used herein, the term "program" is intended to include 1) a software program which may be stored in a memory and is executable by a processor or 2) a hardware configuration program useable for configuring a programmable hardware element or reconfigurable logic. A software program may be any type of code, script and/or data that may be stored in a memory medium and executed by a processor. Exemplary software programs include programs written in text-based programming languages, such as C, C++, Pascal, Fortran, Cobol, Java, etc.; programs written in assembly language; programs written in graphical programming languages; programs that have been compiled to machine language; scripts; and other types of executable software. Exemplary hardware configuration programs include netlists or bit files for elements such as FPGAs and other reconfigurable hardware.

As used herein, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A "data flow" graphical program or diagram refers to a plurality of interconnected nodes or icons, wherein the interconnections among the nodes visually indicate that data produced by one node is used by another node. A "data flow" graphical program or diagram may also include one or more control flow constructs or other non-data flow constructs.

A graphical program may also optionally comprise a user interface or front panel. The user interface may be contained in the block diagram of the graphical program or may be contained in one or more separate panels or windows (or both). The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. The term "front panel" refers to a user interface wherein the user is able to interactively control or manipulate the input being provided to the graphical program and view resulting output. Any of various types of programs may include a user interface or front panel, including graphical programs, text-based programs, etc.

Examples of graphical program development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

A program for performing an instrumentation, measurement, automation or simulation function, such as measuring phenomena of a Unit Under Test (UUT) or device, controlling or modeling instruments, controlling or measuring a system or process, or for modeling or simulating devices, may be referred to as a virtual instrument (VI).

As shown in FIG. 1, at least one of the computer systems 82 and/or 90 may be referred to as the "main" computer system, i.e., the computer system used by the user in creating, using and/or executing a configuration diagram. For example, computer system 82 may be referred to as the main computer system. Thus, the computer system 82 may include a display device operable to display a graphical user interface (GUI). The graphical user interface may comprise any type of graphical user interface, e.g., depending on the computing platform. The GUI is useful in assembling, creating, using and/or executing a configuration diagram as described herein. Multiple computer systems may also be used in assembling a configuration diagram.

As described below, a configuration diagram may comprise one or more device icons which each correspond to a device in the system. A configuration diagram may also comprise one or more program icons which each correspond to a program in the system. A configuration diagram may also comprise one or more system icons and/or one or more application icons or project icons. A configuration diagram may comprise various other icons, e.g., for I/O channels or data points of a device. A configuration diagram may also display connections between icons, such as physical connections between device icons and/or invocation or caller/callee connections between program icons.

As described below, the configuration diagram may be useful in representing the configuration of a system, e.g., for documentation or specification purposes. The configuration design may also be useful in deploying programs among a plurality of devices in the system. The configuration diagram may also be used in creating one or more programs and deploying these created programs in the system. The configuration diagram may further be useful in displaying and/or executing an application comprising a plurality of programs distributed among a plurality of devices in a system. The configuration diagram may further be useful in controlling device or program execution. The configuration diagram may be used for other purposes as well. The display device may also be operable to display a graphical program block diagram of a deployed program, or other source code of a deployed program. The display device may also be operable to display a graphical user interface or front panel of deployed programs, wherein the GUI or front panel of deployed programs may be selectively displayed using the configuration diagram.

The computer system 82 and/or 90 includes a memory medium(s) on which one or more computer programs or software components according to one embodiment of the present invention are stored. For example, the memory medium stores one or more programs which are executable to create, present and/or allow use of a configuration diagram as described herein. Also, the memory medium may store a programming development environment application used to create and/or execute programs. For example, the memory medium may store a graphical programming development environment application used to create and/or execute graphical programs, such as LabVIEW. The memory medium may also store various programs in the system. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

The software programs which implement embodiments of the present invention may be stored in a memory medium of the respective computer 82, or in a memory medium of another computer, and executed by the CPU. The CPU executing code and data from the memory medium thus may comprise a means for performing the methods described herein. For example, the CPU executing code and data from the memory medium may comprise a means for graphically specifying or creating a configuration diagram, creating applications or programs utilizing a configuration diagram and/or enabling a user to graphically distribute, deploy, configure and/or execute programs among a plurality of different devices or nodes in a system according to the description herein.

Figure 2A:
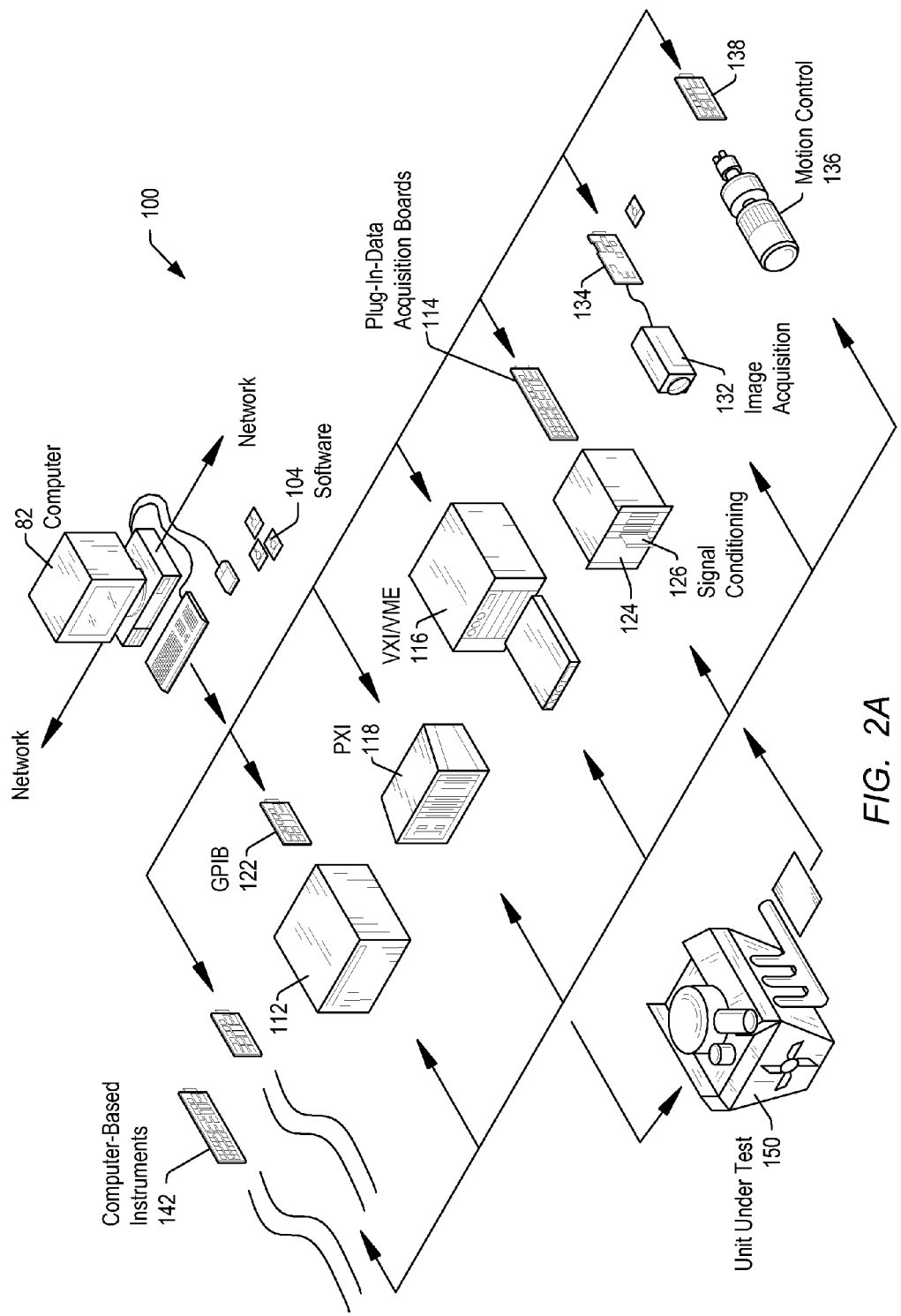
FIG. 2A illustrates an instrumentation system according to one embodiment of the invention.
Figure 2B:
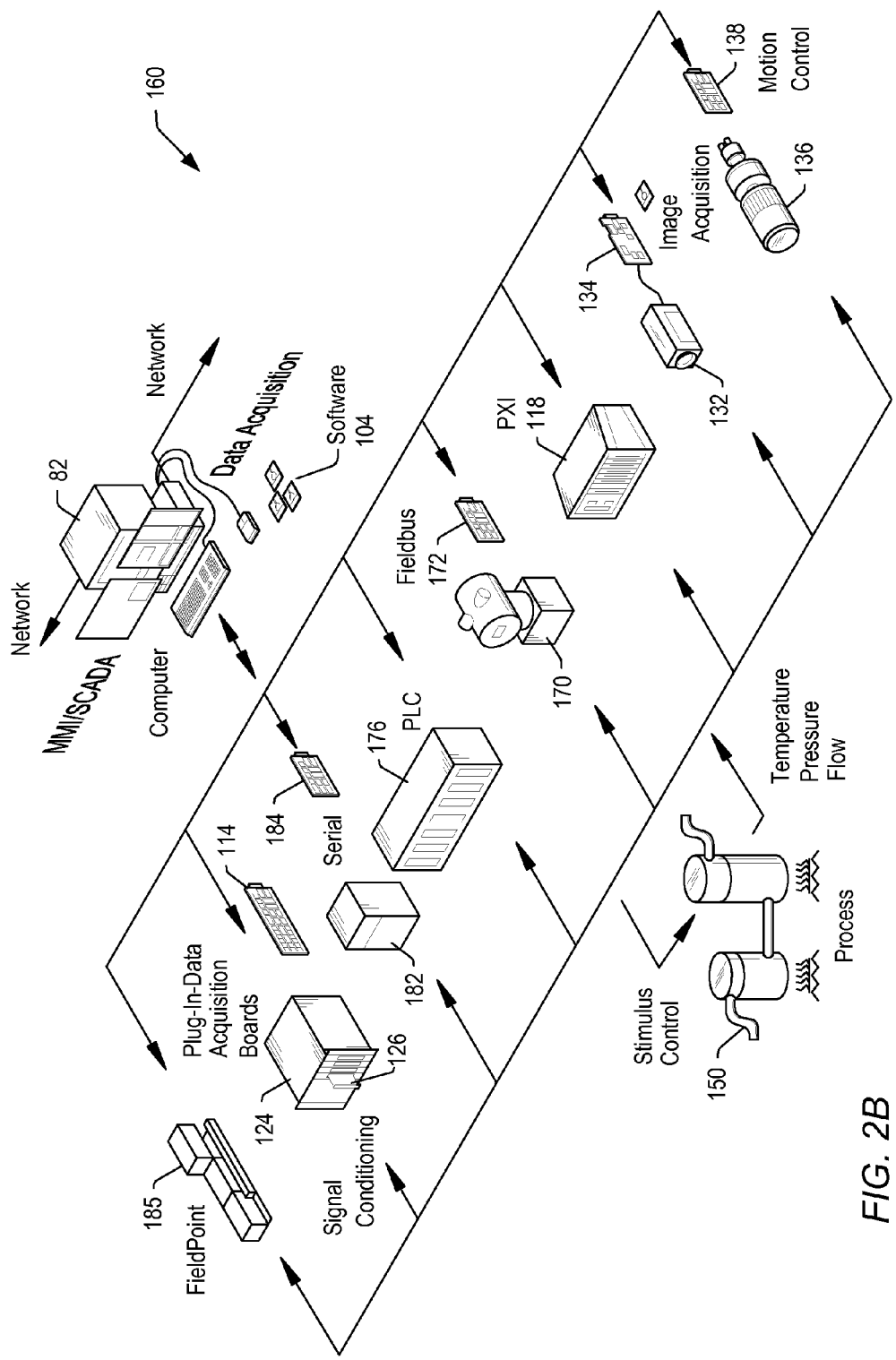
FIG. 2B illustrates an industrial automation system according to one embodiment of the invention.

FIGS. 2A and 2B—Instrumentation and Industrial Automation Systems

The following describes embodiments of the present invention involved with creating distributed applications which perform test, measurement and/or automation functions, including control and/or modeling of instrumentation or industrial automation hardware. However, it is noted that the present invention can be used for a plethora of applications and is not limited to instrumentation or industrial automation applications. In other words, the following description is exemplary only, and the present invention may be used in any of various types of systems. Thus, the system and method of the present invention is operable to be used in any of various types of applications, including distributed systems which include other types of devices such as multimedia devices, video devices, audio devices, telephony devices, Internet devices, network devices, etc.

FIG. 2A illustrates an exemplary instrumentation system 100 which may implement embodiments of the invention. The system 100 comprises a host computer 82 which connects to one or more measurement devices or instruments. The host computer 82 may comprise a CPU, a display screen, memory, and one or more input devices such as a mouse or keyboard as shown. Each of (or at least a subset of) the measurement devices may include a processor and/or a programmable hardware element, and may be capable of receiving and executing programs in a distributed application. The computer 82 may couple to one or more other computers, such as computer 90, over a network, wherein the one or more other computers may form part of the distributed system. The computer 82 may operate with the one or more measurement devices to analyze, measure or control a unit under test (UUT) or process 150 or to perform simulation of a system, such as hardware-in-the-loop simulation.

The one or more measurement devices or instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or Micro-Channel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The measurement devices or instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. Each of the devices shown in FIG. 2B may include a processor and/or a programmable hardware element, and may be capable of receiving and executing programs in a distributed application. The computer 82 may couple to one or more other computers, such as computer 90, over a network, wherein the one or more other computers may form part of the distributed system. The computer 82 may operate with the one or more devices to measure or control a process or device 150. The distributed system may perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system 185, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

Figure 3:
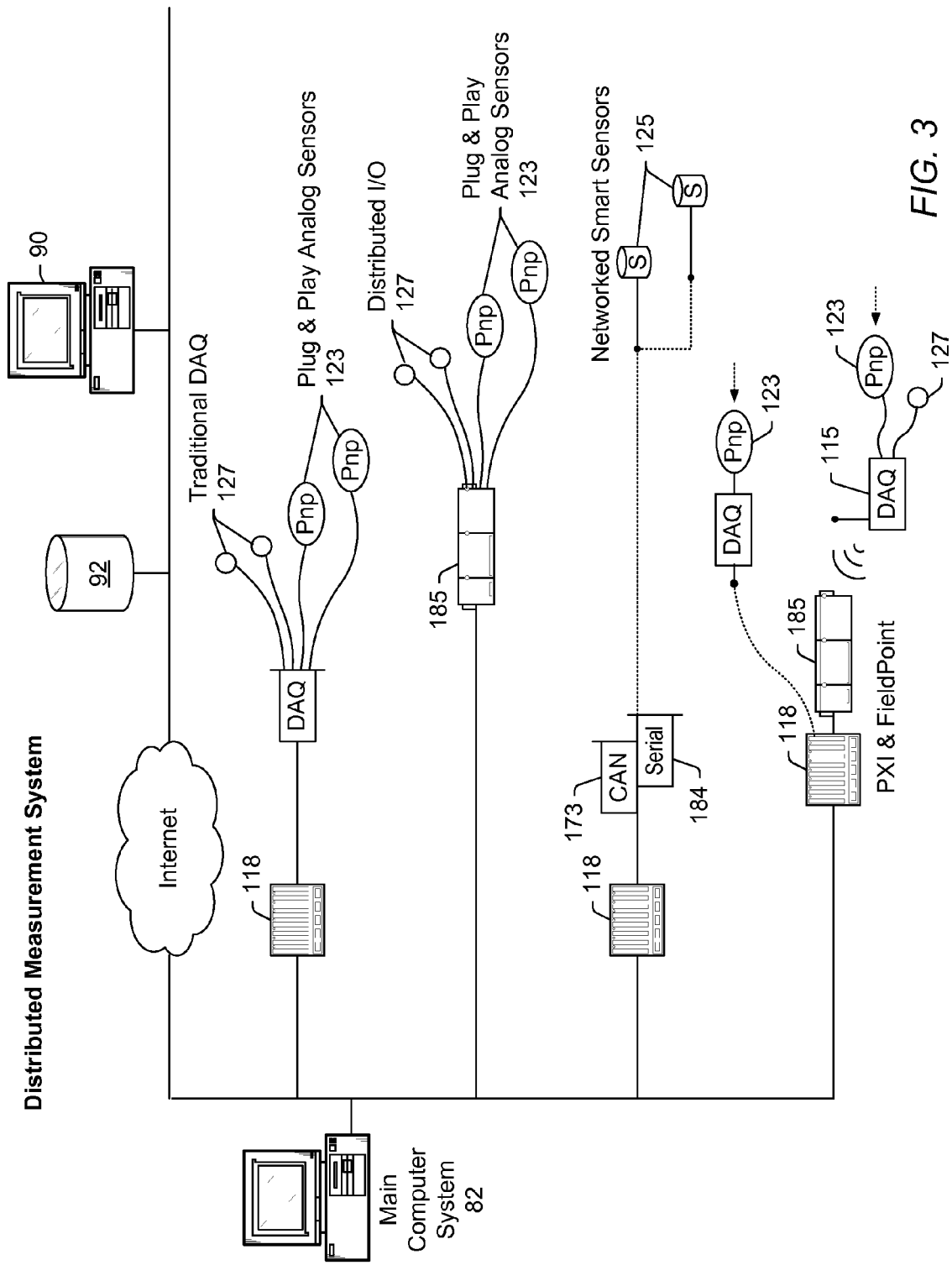
FIG. 3 illustrates an exemplary distributed measurement system according to one embodiment of the invention.

As used herein, the term "measurement device" or "instrument" is intended to include any of the devices that are adapted to be connected to a computer system as shown in FIGS. 2A, 2B and 3, traditional "stand-alone" instruments, as well as other types of measurement and control devices. The term "measurement function" may include any type of data acquisition, measurement or control function, such as that implemented by the instruments shown in FIGS. 2A, 2B and 3. For example, the term "measurement function" includes acquisition and/or processing of an image. As described below, a distributed program (e.g., a distributed graphical program) may be created that implements a measurement function. For example, the program may be used to acquire a signal and perform the measurement function on the acquired signal.

In the embodiments of FIGS. 2A and 2B above, one or more of the various instruments may couple to the computer 82 over a network, such as the Internet. In one embodiment, the user operates to select one or more target instruments or devices from a plurality of possible target devices for programming or configuration according to the methods described herein. Thus the user may create a program on a computer, such as computer 82, and use the program in conjunction with one or more target devices or instruments that are remotely located from the computer 82 and coupled to the computer 82 through a network. As described below, according to one embodiment of the invention, the user may use a configuration diagram to graphically create and distribute or deploy programs among a number of different devices in a distributed system. The configuration diagram may also be used to initiate execution of the programs, and optionally to control and/or monitor execution of the programs.

Software programs which perform data acquisition, analysis and/or presentation, e.g., for measurement, instrumentation control, industrial automation, or simulation, such as in the applications shown in FIGS. 2A and 2B, may be referred to as virtual instruments.

Although in the preferred embodiment the methods described herein are involved with measurement and automation applications, including data acquisition/generation, analysis, and/or display, and for controlling or modeling instrumentation or industrial automation hardware, as noted above the present invention can be used for a plethora of applications and is not limited to measurement, instrumentation or industrial automation applications. In other words, FIGS. 2A and 2B are exemplary only, and the present invention may be used in any of various types of systems. Thus, the system and method is operable for creating and using configuration diagrams for deploying programs in distributed systems for any of various types of applications.

Network System

As one example, embodiments of the invention may be used to create, configure, deploy and/or execute programs for network systems. Exemplary network systems may include a main computer system that couples to one or more network devices, such as switches, bridges, routers, hubs, network processors, etc. A configuration diagram for a network system may include device icons that represent the various network devices, as well as program icons that represent programs in the system. Programs may be created, configured and/or deployed among the network devices, (including having their invocation relationships changed) using the configuration diagram and the methods described herein.

FIG. 3—Distributed Measurement System

FIG. 3 is a block diagram of an exemplary distributed measurement system. As shown, an exemplary measurement system may include a computer system 82 having a display. The computer system 82 may couple through one or more networks or buses to various measurement devices.

In this exemplary embodiment, the computer 82 may couple through the Internet to a second computer 90 and to a database 92. The computer 82 may couple to a PCI/PXI chassis 118 comprising one or more DAQ cards, which in turn couple to one or more Plug & Play analog sensors 123 or other sensors 127. The computer 82 may couple to a distributed I/O system (or distributed data acquisition system) 185, such as the Fieldpoint system available from National Instruments, which in turn couples to one or more Plug & Play analog sensors 123 or other sensors 127. The computer 82 may couple to a PCI/PXI chassis 118 comprising one or more industrial network cards, such as a CAN interface card 173 and a serial interface card 184, which in turn may couple to one or more networked smart sensors 125. The computer 82 may couple to a PXI system 118 and/or distributed I/O system 185, which in turn couples to one or more DAQ modules 115 connected in a wired manner, such as through a serial, parallel, or network bus. The DAQ modules 115 may couple to one or more Plug & Play analog sensors 123, smart sensors 125, or other sensors 127. The PXI system 118 and/or distributed I/O system 185 may also couple to one or more wireless DAQ modules 117 connected in a wireless manner. The wireless DAQ module 117 may couple to one or more Plug & Play analog sensors 123 and/or other sensors 127.

The exemplary distributed measurement system may include a RIO (Reconfigurable I/O) system as described in U.S. Provisional Patent Application Ser. No. 60/312,242 titled "System and Method for Graphically Creating, Deploying and Executing Programs in a Distributed System" filed Aug. 14, 2001.

The computer system 82 may serve as the central console (or main computer system) of the distributed measurement system. The display of the computer system 82 may be used to assemble a configuration diagram of the distributed measurement system. The configuration diagram may include various device icons that represent or correspond to the various physical ("real") devices, and possibly virtual or simulated devices, that are present in the distributed measurement system. The configuration diagram shown on the display may also be used to create, configure and/or deploy programs to any of the various devices in the distributed measurement system.

The main computer system 82 may be part of the system that executes programs during operation of the system. Alternatively, the main computer system 82 may be used solely to create a configuration diagram and dispatch, configure or deploy programs to the various devices. In this latter embodiment, after deployment, the various programs may execute without further involvement of the main computer system 82.

In one embodiment, the configuration diagram for the system shown in FIG. 3 would resemble, e.g., be similar or identical in appearance to, the block diagram shown in FIG. 3. Thus, for the physical system represented by the block diagram in FIG. 3, the configuration diagram for this system that is displayed on a computer display may also have the appearance of FIG. 3. Thus one goal of the configuration diagram for a system is to represent in an intuitive manner the system that the configuration diagram represents. Other examples of configuration diagrams are shown in FIGS. 21A and 21B. Simple configuration diagrams used to illustrate graphical deployment of programs are shown in FIGS. 15-20. FIGS. 21A and 21B illustrate more complex configuration diagrams.

Figure 4:
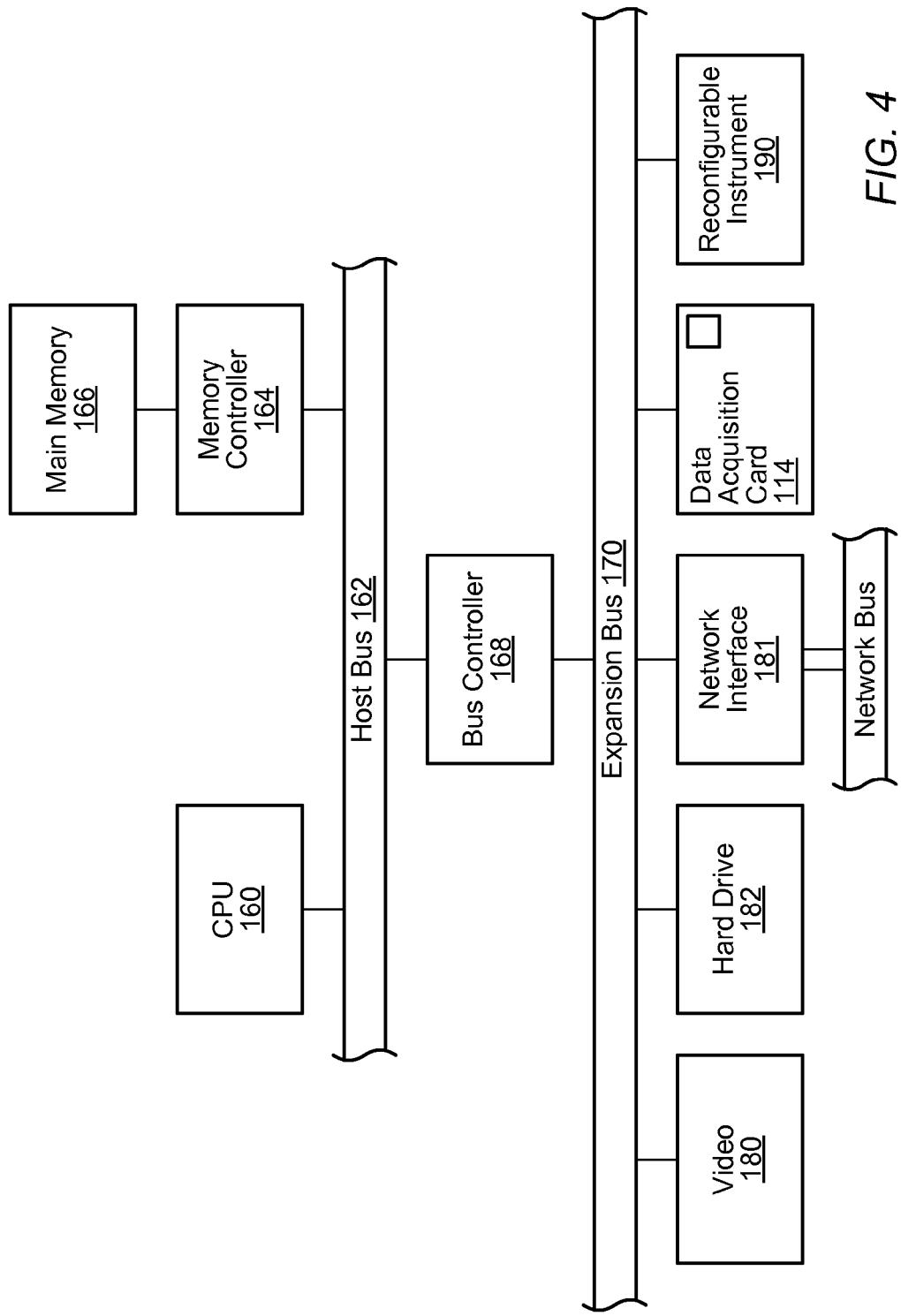
FIG. 4 is an exemplary block diagram of the computer systems of the preceding Figures.

FIG. 4—Computer System Block Diagram

FIG. 4 is a block diagram representing one embodiment of the computer system 82 and/or 90 illustrated in FIG. 1, 2A, 2B or 3. It is noted that any type of computer system configuration or architecture can be used as desired, and FIG. 4 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store one or more programs which implement an embodiment of the invention, and may also store one or more programs which may deployed to devices in a distributed system according to an embodiment of the invention. The main memory may also store a program development environment, operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The computer 82 comprises a video display subsystem 180, hard drive 182, and network interface 181, coupled to the expansion bus 170. The expansion bus 170 may also include various exemplary devices such as a data acquisition board 114 and a reconfigurable measurement device or instrument 190. Each of the data acquisition card 114 and the reconfigurable measurement device or instrument 190 may include a processor and memory and/or a programmable hardware element for receiving and executing deployed programs.

Figure 5:
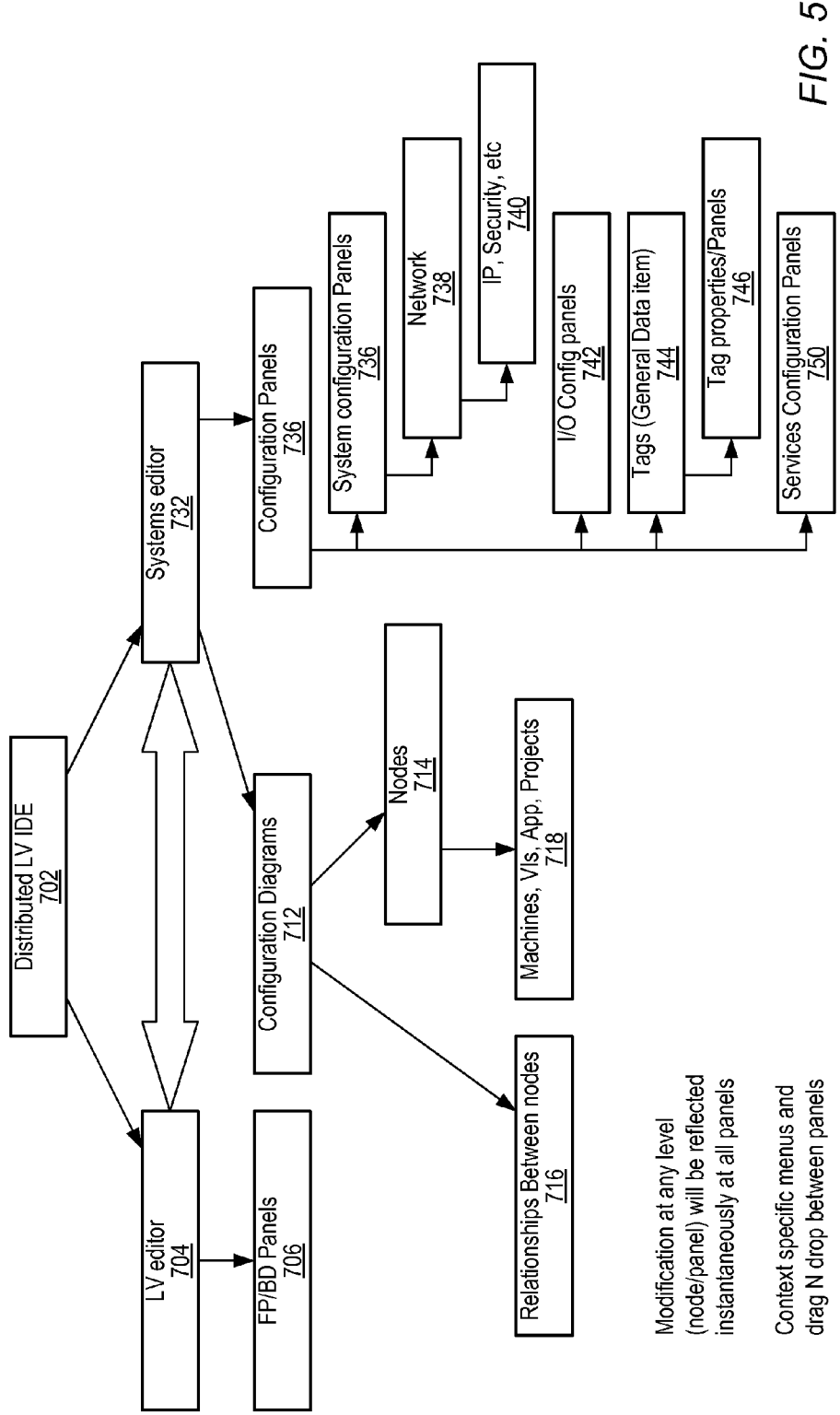
FIG. 5 is a block diagram of an exemplary development environment for creating and using configuration diagrams.

FIG. 5—System for Creating and Using Configuration Diagrams

FIG. 5 illustrates the software programs of an exemplary system for creating and using configuration diagrams according to an embodiment of the invention. FIG. 5 illustrates an exemplary system which includes the distributed LabVIEW integrated development environment (IDE). The system shown in FIG. 5 may be used for managing a distributed system as described herein.

As shown, the system includes a graphical program editor or graphical program development environment, e.g., a LabVIEW editor 704. The system also may include one or more graphical programs, e.g., may include a block diagram and/or front panel 706 of a graphical program. The block diagram and front panel may be created in any of various graphical program development environments.

The system may also include a system editor 732. The system editor may be used for creating a configuration diagram 712, also referred to as a system panel. In the present application, the terms "system panel" and configuration diagram" are used interchangeably. The configuration diagram 712 may include a plurality of nodes or icons 714 which represent items 718 in a system, such as devices, machines, programs, applications, projects or other elements in the configuration diagram 712. The configuration diagram 712 may also illustrate the relationship between nodes using connections or links 716 as described herein.

The systems editor 732 may also include configuration panels 734, which are similar to property pages. The configuration panels 734 may include system configuration panels 736 for configuring different system configuration items such as network parameters 738, e.g., IP, security, etc 740. The configuration panels 734 may also include input/output configuration panels 742 for configuring I/O points. The configuration panels may also include the ability for configuring data points (e.g., tags) 744 including methods, properties and panels 746. The configuration panels 734 may also include service configuration panels 750 for configuring various services, as described below.

The system described in FIG. 5 may be used for a plurality of different purposes. The system may be used to represent a system, deploy programs in the system, distribute data among devices or programs in the system, and perform various other functions. The system may provide various levels of views. For example, the system configuration diagram may present a view of the entire system, i.e., an entire system view; an individual system view, i.e., a view of individual system within the entire system; an application view, i.e., a view of the various programs or software applications present in the system; and a program development view, such as a view of a program development environment, such as LabVIEW, Visual Basic, etc. In one embodiment, the system includes tight integration with a graphical program development environment such as LabVIEW. The configuration diagram may also represent the system in a hierarchical manner, and the user may be able to "drill down" in the configuration diagram to view greater detail on various subsystems or devices.

Flowcharts

The flowcharts described herein illustrate various embodiments of the present invention, and various other embodiments are also contemplated. It is noted that various steps in the flowcharts described herein may occur concurrently or in different orders than that shown. Further, some steps are optional and may be omitted, and/or additional steps not shown may be added, as desired. In general, where the context so indicates, steps performed in the flowcharts below may be performed automatically or programmatically, i.e., by a software program, and not by manual user action.

FIG. 6—Flowchart

Figure 6:
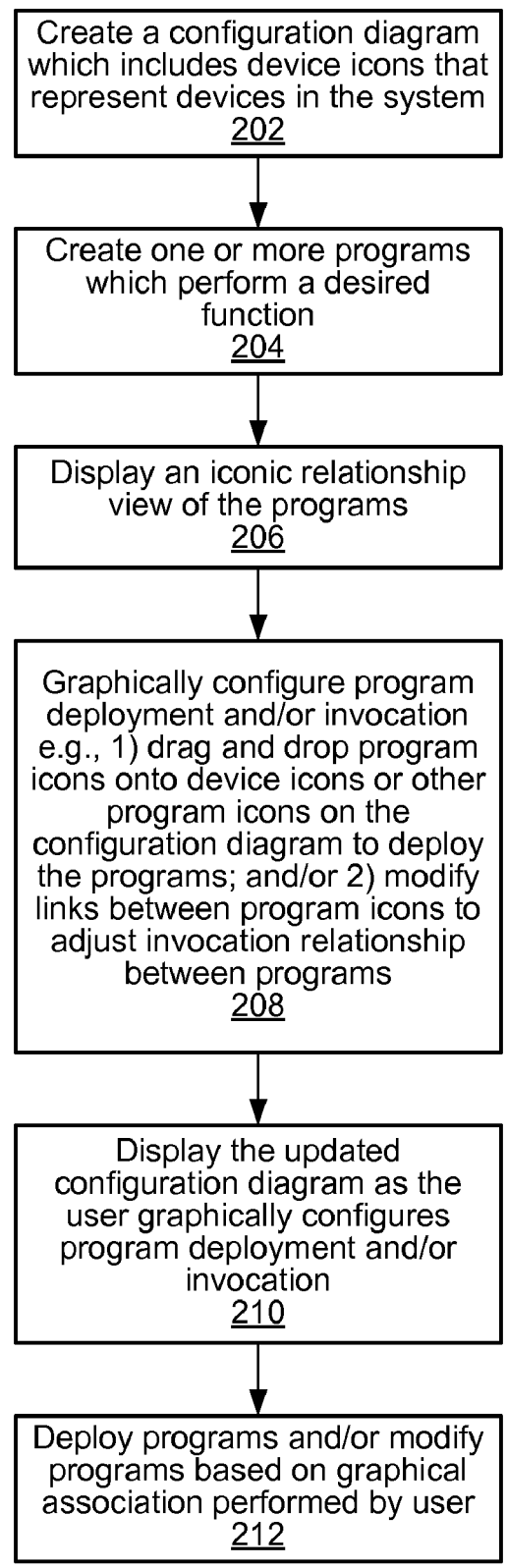
FIG. 6 is a flowchart diagram illustrating creating a configuration diagram and using the configuration diagram to graphically configure program deployment and/or invocation, e.g., deploy programs on devices in the system.

FIG. 6 is a flowchart diagram illustrating operation of the user creating or assembling a configuration diagram representing a distributed system, displaying program icons corresponding to programs present in the distributed system, and configuring or deploying one or more programs to various devices in the distributed system. FIG. 6 illustrates one embodiment of the invention, and it is noted that various embodiments of the invention may be used to create, view and use configuration diagrams using the concepts or methods described herein.

As shown, in step 202 a developer or user may assemble or create a configuration diagram which includes device icons that represent devices in the distributed system. Thus, in a system which comprises two or more devices coupled to each other, such as through a network, a serial or parallel bus, or through wireless means, etc., the user may create or assemble a configuration diagram which includes a device icon for each of the devices, or a subset of the devices, present in the system. The configuration diagram may also include program icons corresponding to programs resident in the system, e.g., in the various devices.

In one embodiment, the user may manually select device icons from a graphical user interface, e.g., from a palette or menu, to be displayed in the configuration diagram. The user may also connect the device icons on the configuration diagram, such as by using a pointing device. For example, in creating or modifying a configuration diagram, the user can associate, e.g., drag and drop, or otherwise connect, a first device icon to a second device icon. For example, the user may use a pointing device (e.g., a mouse), and may possibly use a "wiring tool" icon on the display, to connect a first device icon to a second device icon. This may cause a connection, e.g., a wire, to appear between the device icons to indicate a relationship or coupling between the two (or more) device icons.

In one embodiment, the configuration diagram may be automatically or programmatically created by the computer system 82, or by separate server system 90, based on an automatic detection of devices coupled to the computer system 82. As used herein, the terms "programmatically" or "automatically" mean that the particular function is performed by software, as opposed to being performed manually by the user. For example, Plug & Play software, or other similar detection software, may detect devices present in the system and automatically display device icons in the configuration diagram representing these detected devices. The software may also automatically display connections or links between the device icons which indicate the detected buses or interfaces connecting the devices. In another embodiment, at least a portion of the configuration diagram may be automatically or programmatically created, and a portion of the configuration diagram may be created at least partly based on manual user input. For example, software may detect and display device icons and links corresponding to a subset of the devices in the system, and the user may select (and "wire up" or connect) device icons corresponding to other (e.g., non-detected or virtual) devices from a palette or menu.

The device icons preferably have an appearance which corresponds to the device they represent. This allows the viewer to easily view and understand what devices are present in the distributed system. In one embodiment, information may be displayed proximate to various device icons to indicate information about the device, such as type of device, geographic location of the device, calibration information, etc. This information may be selectively displayed when the user selects (e.g., right clicks) a respective device icon.

The connection that is displayed between two device icons may be context sensitive. In other words, the connection that is displayed or created on the display may have a context or appearance that is associated with the types of devices that are being connected, or that is associated with the type of physical connection between the respective devices. For example, the PCI bus may be shown with a first type of visual representation, a USB (Universal Serial Bus) connection may be shown with a second type of visual representation, and an Ethernet connection may be shown with a third type of visual representation. Alternatively, or in addition, the connection that is displayed or created on the display may have a context or appearance that is associated with the data type of the data, or type of material, being transmitted between the devices.

In one embodiment, Plug & Play software or other similar detection software may detect programs present in the system and automatically or programmatically display program icons in the configuration diagram representing these detected programs. The software may also automatically display connections or links between the program icons which indicate the detected invocation relationships of the programs. In another embodiment, respective portions of the configuration diagram may be automatically or programmatically created, and a portion of the configuration diagram may be created at least partly based on manual user input. For example, software may detect and display program icons and links corresponding to a subset of the programs in the system, and the user may use a GUI to register other programs present in the system. The program icons may be displayed directly in the configuration diagram, e.g., proximate to the devices in which they reside. Alternatively, the program icons may initially appear on a separate palette or window, e.g., for deployment to the various devices. The user may manually "connect" or "wire up" links between various program icons to establish or modify invocation relationships among the programs as described further below.

In one embodiment, the configuration diagram is operable to perform type checking of connections between device icons, e.g., to verify that a first device corresponding to a first device icon can interface to a second device corresponding to a second device icon. For example, when the user draws a link between a first device icon and a second device icon, software may analyze the interface types of the two devices to ensure that the connection is proper. The configuration diagram may also be operable to perform type checking of connections between program icons, e.g., to verify that a first program corresponding to a first program icon can invoke (or be invoked by) a second program corresponding to a second program icon. For example, when the user draws a link between a first program icon and a second program icon, software may analyze the program types of the two programs to ensure that the invocation can be performed.

In addition, program icons may also have an appearance to indicate the type of program, e.g., graphical program, text-based program, hardware configuration program, etc. Also, the connection that is displayed between two program icons may be context sensitive. For example, the connection between two program icons may have a context or appearance that is associated with the type of connection between the programs, e.g., caller/callee and direction (e.g., using an arrow), event passing, etc.

The configuration diagram may be used to define all of the desired system components, including measurement phenomena, transducers, connector blocks, cabling, measurement hardware, and program components. The configuration diagram may also be used to enable distributed management of the system components, including distributed definition of components, discovery of local and remote components that are present and virtual, web service based interaction, etc.

In one embodiment, the user may assemble a configuration diagram that represents a system that the user desires. Thus, the user may select among device icons in a palette and generate a configuration diagram representing a desired system. In this embodiment, the configuration diagram is a specification of a desired system. A configuration diagram may also include a first portion that represents an actual system (one or more physically present devices) and a second portion that represents a desired system (one or more non-present devices).

In one embodiment, the user may use the configuration diagram as a mechanism for specifying devices to be purchased from a vendor. For example, the user can assemble a configuration diagram including device icons (and/or program icons) which represent devices (and/or programs) that the user desires to use or purchase for his/her system. The user may then connect to a server computer system and provide the configuration diagram as a specification for the devices and/or programs the user desires to purchase. The server computer system, which may be located at a manufacturing site, may receive the configuration diagram, determine the desired devices (and/or programs) from the configuration diagram, and present information to the user indicating the total cost for the requested devices (and/or programs). The user may then choose to purchase one or more of the recommended devices (and/or programs) from the server computer system. These devices may then be shipped to the user. In another embodiment, the server may programmatically query the devices and/or programs present in the user system, and generate a configuration diagram that is displayed on the user's computer system representing the current state of the user's system. The user may then add device icons and/or program icons from a palette on the server or the client computer to indicate desired modifications to the user system. This updated configuration diagram may then be provided back to the server as a purchase request as described above.

In step 204 the user may create one or more programs which perform a desired function within the distributed system. Alternatively, or in addition, one or more programs may be automatically or programmatically created (created by a software program), based on user input or requirements. For example, the computer system may display a graphical user interface which is used by the user to enter requirements or desired operation of a program. The system may then programmatically create a program based on these requirements. This programmatic creation of programs may be performed by the user's computer system 82 or a separate server computer system 90.

The user (or computer system) may create one or more text-based programs in text-based programming languages such as C, C++, Fortran, Basic, Cobol, Java, etc. Software programs may be created or used which are software objects or software components such as C++ objects, ActiveX controls, Java objects, etc. The user may also create one or more graphical programs in various graphical programming development environments. In the preferred embodiment, the computer system includes the LabVIEW graphical programming development system for creating LabVIEW programs. As described below, the user may create and/or modify programs using the configuration diagram. This operation is discussed with respect to FIGS. 26, 27, 32 and 33.

Alternatively, the user may simply use one or more pre-existing programs that have been previously created. The user may use programs stored on the computer system 82 or stored on any of the various remote devices. In addition, where the computer system 82 is coupled to a network, such as the Internet, the user may use programs stored on a server (e.g., server 90) coupled to the network.

For example, in a measurement application, a server at National Instruments may store or host various measurement applications or programs that can be used by any user, or registered users. The user may choose to connect to a server and view icons corresponding to the programs, applications, or projects present on the server, and incorporate these program icons (or application or project icons) into the configuration diagram using graphical association techniques described herein. The user may purchase a program by dragging and dropping a program icon from a palette displayed by the server 90 onto the user's configuration diagram. The user may be required to submit payment to purchase programs from a third party server. As described above, the user may also choose to connect to a server for programmatic generation of programs.

The user may also create one or more programs which perform a desired function within the distributed system using the configuration diagram. For example, the user may create a graphical program which communicates with one or more measurement devices by dragging and dropping corresponding device icons into the graphical program diagram (or user interface). As one example, the user may open a LabVIEW block diagram and create a While loop structure. The user may then drag and drop device icons corresponding to sensors into the While loop structure. This may cause the graphical program diagram to be configured to access these sensors and read data produced by these sensors. This operation is described with respect to FIGS. 26 and 27A-E. The user may also drag and drop icons representing data points or I/O channels into the graphical program diagram (or user interface) to configure the graphical program to access (read or write) these data points or I/O channels. Programs may also be created and/or modified in response to other actions performed by the user, as described herein.

In step 206 the system may display an iconic relationship view of the various programs, e.g., graphical programs, present within the system. The iconic relationship view may comprise icons ("program icons") representing various programs, wherein the program icons may be arranged and/or interconnected with links to indicate their relationship. The program icons may be arranged proximate to, and/or connected by a link to, the respective device icons corresponding to the devices in which the programs are stored. This may visually indicate which programs are stored on which devices. Alternatively, the iconic relationship view of the various programs may be displayed separately without the device icons. The iconic relationship view may comprise an object-oriented view, a hierarchy view, a tree view, a data flow view, an execution flow view, a control flow view, or combinations thereof.

Thus, in the case of a program which is configured as a hierarchy of a main program and one or more sub-programs, the system may display a hierarchy view comprising an icon representing the main program and an icon representing each of the one or more sub-programs. The relationship view may also display connections or links between the program icons. In the hierarchy view, the program icons are arranged and are preferably connected to visually indicate the hierarchy. In the case of a plurality of software objects configured to invoke methods and trigger events on each other, the system may display an object-oriented view comprising an icon representing each of the programs, and possibly connections indicating the method invocation and/or event messaging. In the case of a graphical program which is configured as a hierarchy of a main graphical program and one or more sub-graphical programs (e.g., a main VI and one or more sub-VIs), the system may display a hierarchy view comprising an icon representing each of the main graphical program, an icon representing each of the one or more sub-graphical programs, and connections between the program icons to visually indicate the hierarchy. An example of a hierarchy view of graphical programs is shown in FIGS. 15-20 and 21B. This allows the viewer to easily view the programs present in the system which may be used in configuring the distributed system. In another embodiment, the program icons resident in a device may simply be displayed, without any type of relationship view.

The iconic relationship view of the various software programs may be displayed in a separate window on the display, or may be displayed in the configuration diagram. For example, where most or all of the programs are initially comprised in the main computer system 82, the program icons may be displayed in the configuration diagram proximate to the device icon (or shown connected to the device icon) corresponding to the main computer system 82, or in a separate window to avoid cluttering the configuration diagram. In one embodiment, the user can select various views of the configuration diagram, as described herein.

Figure 18:
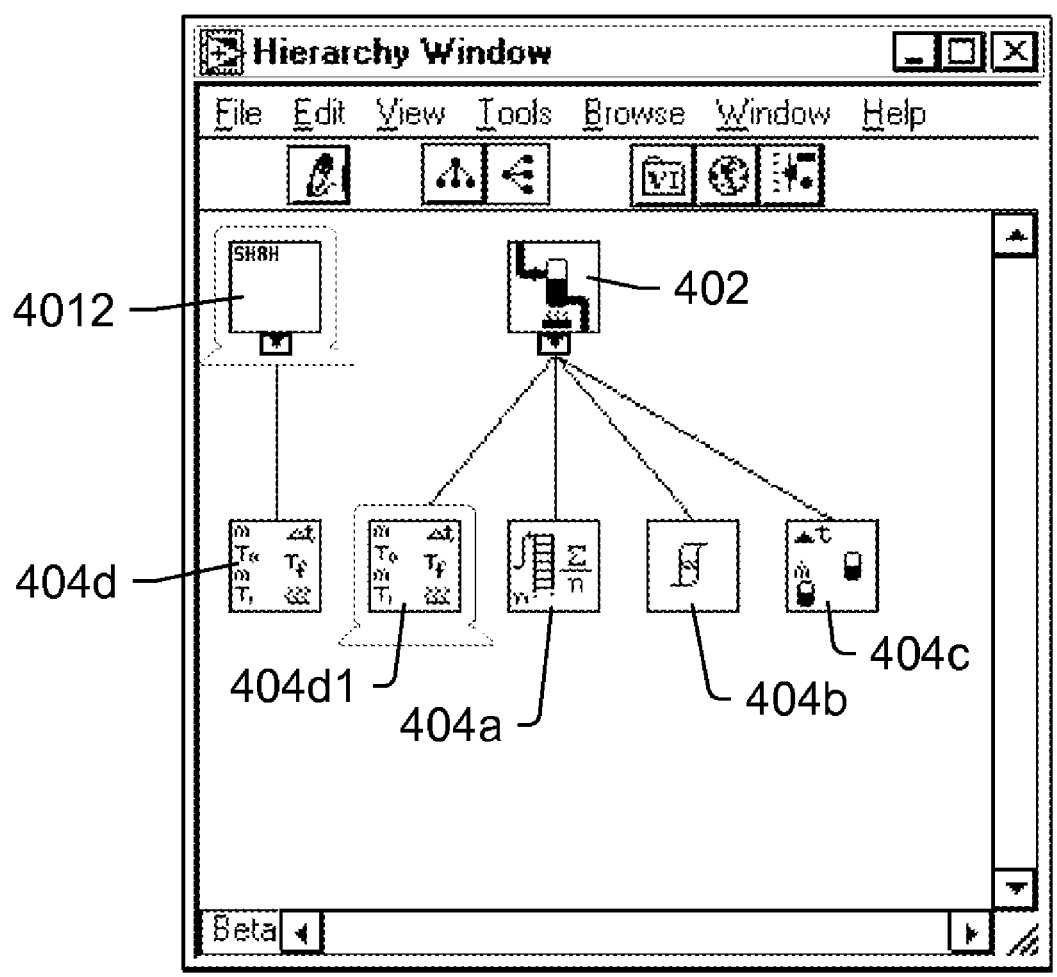

In step 206 the system may also display an iconic relationship view of the various devices present within the system. For example, the user may choose a menu option, such as shown in FIG. 18, to display the caller/callee relationships between different devices present in the distributed system.

In step 208 the user may graphically configure program deployment and/or invocation using the configuration diagram. The user may graphically configure program deployment and/or invocation by providing graphical user input to the configuration diagram to associate (e.g., drag and drop), icons with other icons, change connections between icons, etc.

For example, in one embodiment the user may select various program icons, e.g., graphical program icons, from the relationship view (within or outside the configuration diagram) and associate (e.g., drag and drop) them with various device icons contained in the configuration diagram. The user may also select a program icon and associate the program icon with another program icon in the configuration diagram. This may cause a deployment of a program to another device, or may configure a program invocation relationship (caller/callee relationship) between programs, or may cause another type of operation. For example, the operation of associating program icons with device icons (or other program icons) in the configuration diagram may operate to deploy, either immediately or when the use selects "apply", the respective programs on the various devices which correspond to the device icons.

Figure 11:
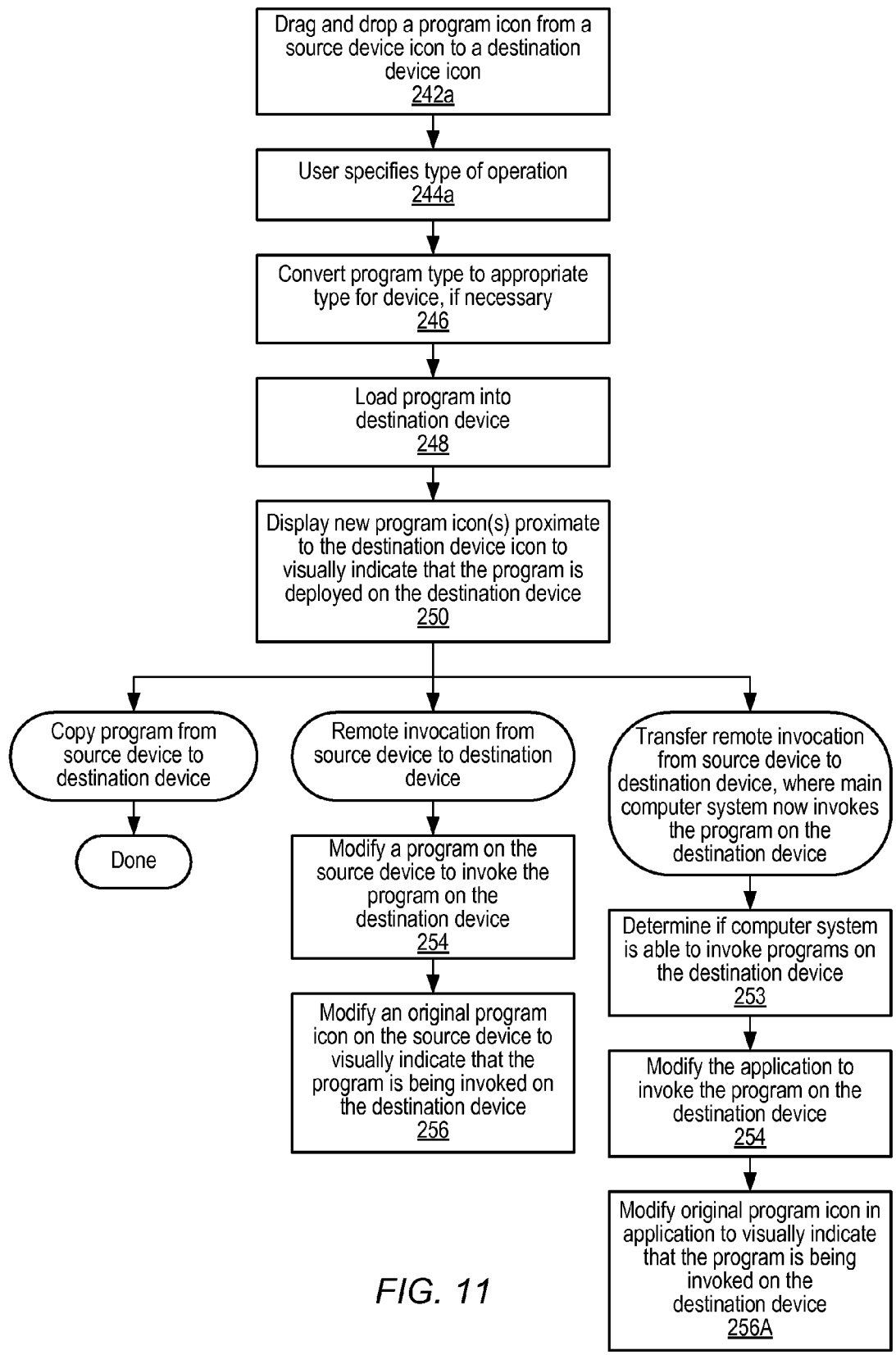
FIG. 11 is a flowchart diagram illustrating various operations that may be performed when moving a program icon from source device icon to a destination device icon.
Figure 12:
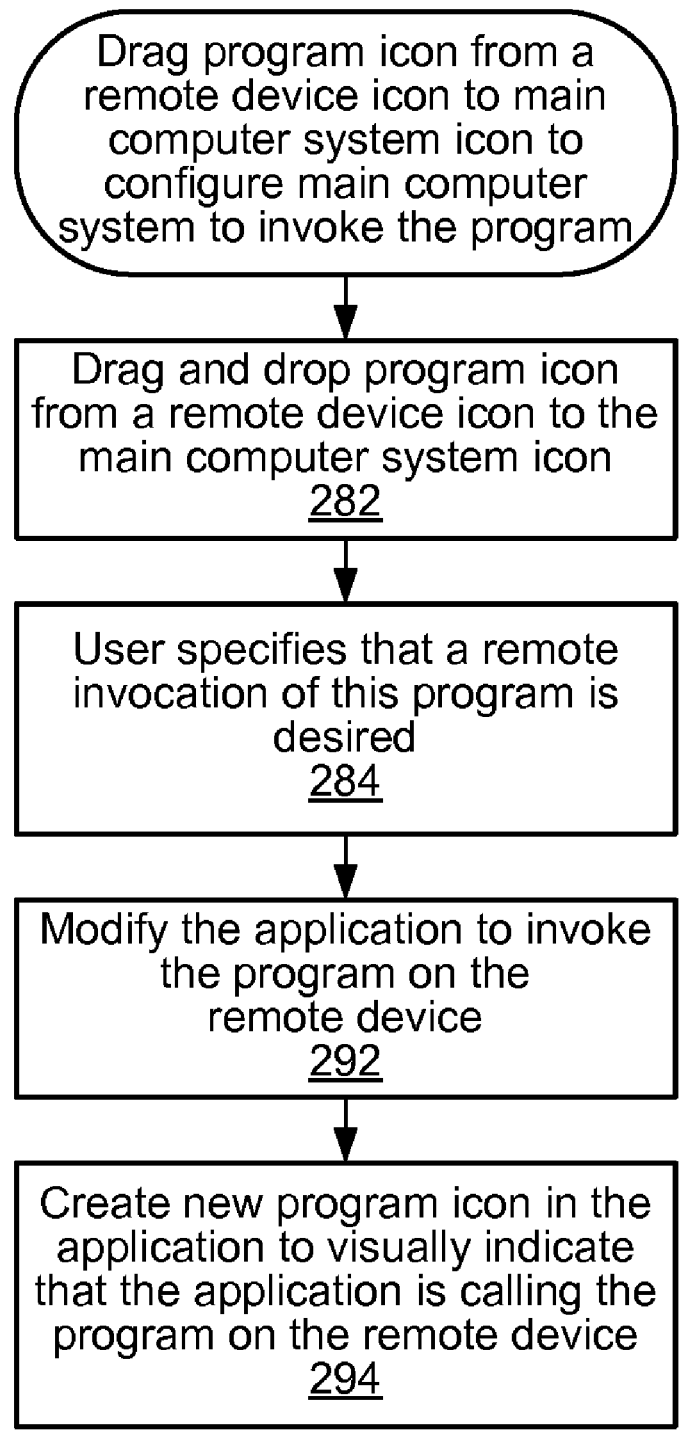
FIG. 12 is a flowchart diagram illustrating association of a program icon from a remote device to the main computer system to configure the main computer system to invoke the program.

Deploying a program may comprise: 1) moving the program from a first device to a second device (where the program is deleted from the first device), 2) copying the program from a first device to a second device (where the program remains stored on the first device), 3) transferring or moving the program from a first device to a second device for remote execution on the second device, wherein the program moved to the second device is invoked for execution by a program on the first device, and wherein at least one program on the first device may be configured or modified to invoke the moved program on the second device; 4) transferring remote execution of the program from a first device to a second device, wherein the program is originally to be remotely invoked on the first device, and after the operation the program is remotely invoked on the second device, wherein the remote invocation is performed by a program or application on a different device, such as the main computer system (FIG. 11); or 5) creating a call or invocation in a program on the second device to invoke the program on the first device, wherein the program remains on the first device, and at least one program on the second device may be configured or modified to invoke the program on the first device (FIG. 12). Further details of the deployment of programs on various devices is described with respect to the flowcharts of FIGS. 9-12 and the screen shots of FIGS. 15-20. Various other deployment operations are also contemplated.

As another example, in one embodiment the user may draw a link or connection between two program icons to configure an invocation relationship between the program icons. For example, the user may position a pointing device at a first program icon and draw a link from the first program icon to a second program icon. The displayed link may include an arrow or other graphical means to indicate the direction of the invocation, i.e., that the first program icon is invoking the second program icon, and not vice versa. This operation of drawing the link between the first and second program icons may operate to modify the first program represented by the first program icon to invoke the second program represented by the second program icon. In one embodiment, the source code of the first program may be displayed, or a GUI may be displayed, so that the user can more precisely configure where and how the first program invokes the second program.

The user may also select an existing link or connection displayed between two program icons and may associate (e.g., graphically modify or drag and drop) the end of one link to a different program icon to change an invocation relationship among the programs. For example, the configuration diagram may initially display a link connecting a first program icon with a second program icon, indicating that a first program represented by the first program icon invokes a second program represented by the second program icon. The user can select the end of the link proximate to the second program icon and graphically move or drag this end of the link to a third program icon to configure the first program to invoke a third program represented by the third program icon.

As another example, the user may select a device icon, or an icon representing a data point or I/O channel, and associate (e.g., drag and drop) the device icon with a program icon in the configuration diagram. This may be used in creating a program, e.g., may cause the creation of code in the program to access the device, data point, or I/O channel. For example, an icon representing a device, data point and/or I/O channel may be associated with or dropped in the source code or user interface of a program, e.g., the block diagram or front panel of a graphical program. This may cause various operations to be performed, as described below.

Various other operations using the configuration diagram are also contemplated.

The term "associate" used herein generally means or includes some type of user input that is provided to indicate that one icon should be associated with another icon. Each icon may be a device icon, program icon, a link (link icon) displayed between device icons and/or program icons, a data point icon, an I/O channel icon, or another icon that represents an element in the system. The term "associate" includes various types of graphical techniques, such as drag and drop techniques, and use of graphical user interface elements, such as menus, dialog boxes, etc. The term "associate" also encompasses the use of speech recognition techniques to indicate that one icon should be associated with another icon.

The "association" may indicate that some relationship should be established between the two icons (a relationship between programs and/or devices represented by the icons, e.g., an invocation or caller/callee relationship, etc.), or that some operation should be performed (e.g., deployment of a program, creation or modification of a program, etc.).

As noted above, the operation of associating icons with other icons, e.g., associating program icons with device icons (or other program icons), in the configuration diagram may be performed with "drag and drop" techniques, menu-based techniques, dialog box techniques, speech recognition techniques, or other techniques. The "drag and drop" method may comprise the user selecting an icon (device icon, program icon, link icon, etc.) with a pointing device (e.g., a mouse) and dragging the icon on the display to be on top of or proximate to another icon, such as another device icon, program icon, or link icon. Drag and drop techniques are well known in the art. Other similar graphical input techniques may also be used.

As one example, the operation of associating program icons with device icons in the configuration diagram may operate to deploy, or cause to be deployed, the respective programs on the various devices which correspond to the device icons. Stated another way, if the user selects a first program icon and associates (e.g., drags and drops) this first program icon on to a first device icon which represents a first device, and the user optionally selects "apply", this operates to deploy a first program corresponding to that first program icon on to the first device which corresponds to that first device icon. The "drag and drop" method may comprise the user selecting the first program icon with a pointing device (e.g., a mouse) and dragging the first program icon on the display to be on top of or proximate to the first device icon. This provides a greatly simplified mechanism for deploying programs on various devices in a distributed system. Further details of the deployment of programs on various devices is described with respect to the flowcharts of FIGS. 9-12 and the screen shots of FIGS. 15-20.

In step 210 the configuration diagram may be updated as the user performs iconic operations, such as the deployment operations discussed above. Thus the configuration diagram may display an updated iconic relationship view of the distributed programs and distributed devices as the user associates (e.g., drags and drops) the program icons on the device icons, the program icons on other program icons, the device icons on other device icons, etc. For example, as the user drags and drops program icons (e.g., from the configuration diagram) on to various device icons on the configuration diagram in step 208, the system may operate to display the updated relationship (e.g., hierarchy) of programs proximate to, e.g., underneath, the respective device icon to where they have been deployed. For example, FIGS. 15-20 illustrate a configuration diagram which shows a main graphical program 402 and four sub-graphical programs 404A-D at the next level of the hierarchy.

In one embodiment, when the user associates program icons with various device icons contained in the configuration diagram, the configuration diagram is immediately updated accordingly, but this operation of associating does not operate to deploy programs at that time. Rather, the user may be required to select an "apply" feature for the deployment to actually occur. This allows the user to view various configuration diagram options before a deployment actually occurs. In another embodiment, the system may provide a configuration diagram preview window where the user can view proposed changes to the configuration diagram prior to these changes being made in the actual configuration diagram. In another embodiment, the configuration diagram (and/or the preview window) may support multiple levels of undo/redo, thereby allowing the user to "back out" changes that have been made.

Figure 7:
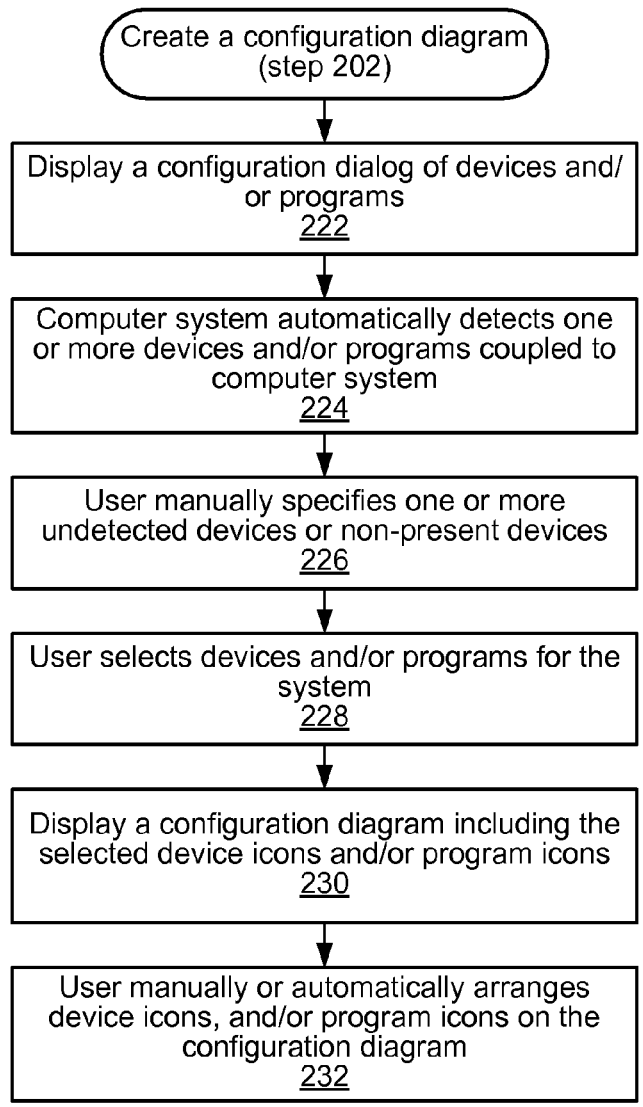
FIG. 7 is a flowchart diagram illustrating creation of a configuration diagram according to one embodiment of the invention.

FIG. 7—Creating a Configuration Diagram

FIG. 7 is a flowchart diagram illustrating an exemplary embodiment of operation of creation or assembly of a configuration diagram representing a system.

As shown in FIG. 7, a developer or user may assemble or create (and/or a software program may create) a configuration diagram which includes device icons that represent devices in the distributed system. The configuration diagram may also include program icons that represent programs in the system. The configuration diagram may further include other icons or elements, such as links displayed between device icons and/or program icons, icons representing I/O channels, icons representing data points or tags, and icons representing other elements in the system, e.g., named configurations (such as named channels) etc.

Thus, in a distributed system which comprises two or more devices connected to each other, such as through a network, a serial or parallel bus, or through wireless means, etc., the user or system may create or assemble a configuration diagram which includes a device icon for each of the devices present in the system, program icons created for programs resident in the devices, and icons representing I/O channels, data points, named configurations etc. The configuration diagram may at least partially (or completely) be automatically or programmatically created. For example, the configuration diagram may be created by software executing on the computer system 82 which is part of the system, or the configuration diagram may be created by software executing on a separate server computer 90 which analyzes the system and generates the configuration diagram for the computer system 82.

Figure 14:
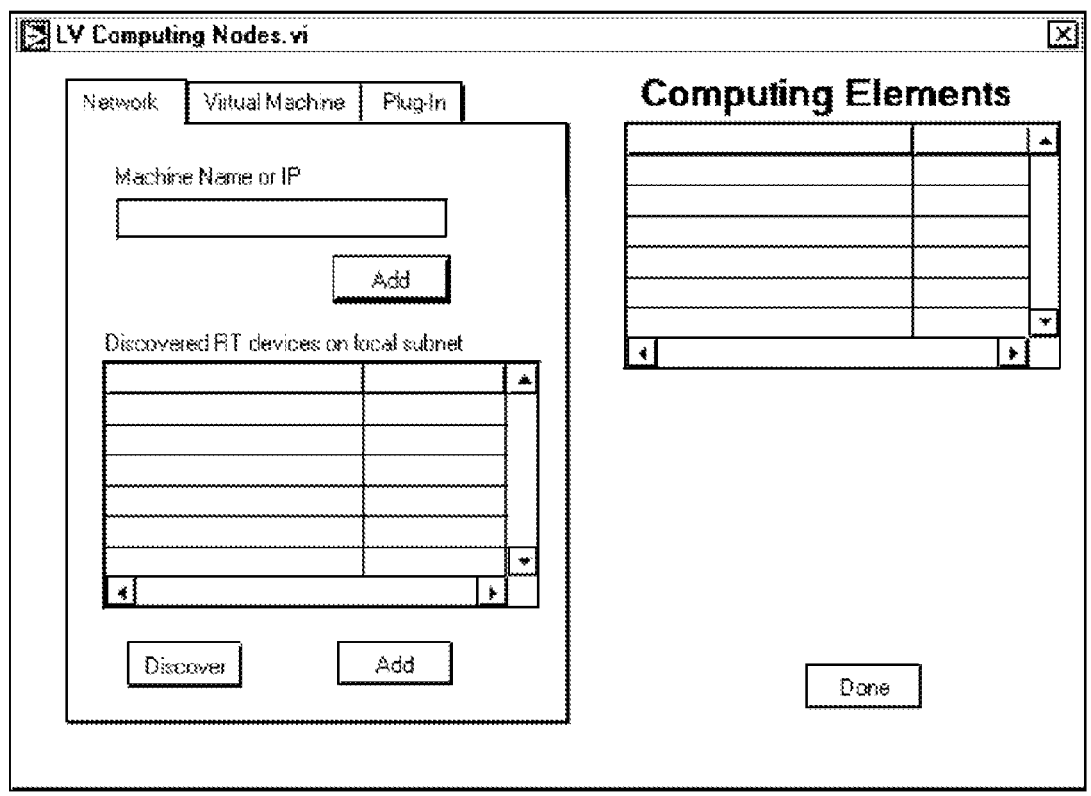
FIG. 14 illustrates a configuration dialog which may be used in creating a configuration diagram.

In step 222 the computer system 82 may display a graphical user interface, such as a configuration dialog, which may be useful in creating a configuration diagram. An exemplary configuration dialog is shown in FIG. 14. The configuration dialog may have various appearances, and FIG. 14 is an exemplary embodiment. The configuration dialog may include various tabs, may include the ability to discover or manually add new devices, and may visually display the various devices present (or "virtually present") in the distributed system. The configuration dialog may include the ability to discover or manually add new programs, and may visually display the various program present (or "virtually present") in the distributed system. The configuration dialog may also include the ability to discover or manually add I/O channels, data points, or other items relevant to the system. In one embodiment where the configuration diagram is mostly or completely automatically or programmatically created, the configuration dialog may not be displayed.

In step 224 the computer system 82 may automatically or programmatically detect devices coupled to the computer system 82 and/or programs present in the system. For example, Plug & Play software executing in the computer system 82 may have previously (such as at system boot time) automatically detected Plug & Play devices and/or programs. Plug & Play software may also be invoked from the configuration dialog. Other application programs executing in the computer system 82 may also automatically detect devices present in the distributed system, and may be optionally invoked from the configuration dialog. For example, the Measurement and Automation Explorer (MAX) software program from National Instruments may be used to automatically detect measurement and automation devices (such as those shown in FIGS. 2A, 2B and 3) and/or programs present in the distributed system. Software may also automatically or programmatically detect other elements in the system, such as I/O channels, data points, named configurations, etc.

In one embodiment, a server (e.g., server 90) may access the system (e.g., computer system 82) over a network and automatically or programmatically detect elements in the system, such as devices coupled to the computer system 82, connections between devices, programs resident in the system, program relationships, I/O channels, data points, and possibly other elements. For example, a server 90 at National Instruments may access a user's computer system 82 at a remote location and, optionally with the user's permission, detect devices and programs installed in the user's system and cause a configuration diagram to be displayed on the display of the user's computer system 82.

In step 226 the user may manually specify one or more devices, such as undetected devices. Thus, for those devices that were not automatically detected, the user may be required to manually specify these devices. In one embodiment, all devices present in the distributed system are automatically detected, and thus no manual specification is required. In step 226 the user may also manually specify one or more programs, such as undetected programs. The user may also manually specify other elements.

In step 226 the user may also specify one or more non-present or "virtual" devices or programs. Thus, for those devices or programs which the user desires to be present in the distributed system, but which are not actually currently physically present, the user may include a "placeholder" by creating a "virtual device icon" or "virtual program icon" that represents the non-present device or program, respectively. Virtual device icons and/or virtual program icons may also be automatically or programmatically generated. For example, the user may provide input indicating the desired operation of the system represented by the configuration diagram, and the software may automatically display a virtual device icon or virtual program icon representing a device or program, respectively, that the system may require to perform the desired operation. Thus software may display suggested device or program icons based on the task requirements entered by the user. Virtual device/program icons are described further below.

In step 228 the user may select one or more devices, programs, and/or other elements for the distributed system. In other words, the user may select one or more devices, programs, and/or other elements to be not included in the distributed system shown in the configuration diagram. For those elements (devices, programs, etc.) that are selected to not be included, corresponding icons (device icons, program icons, etc.) may not appear in the configuration diagram, or may have an altered appearance, e.g., be "grayed out" or may be shown in a separate window.

For example, for those devices that are not selected (or are selected to not be included), corresponding device icons may not appear in the configuration diagram, or may have an altered appearance. This feature may be used in situations where there are devices coupled to the computer system 82, but the user does not desire to use these devices at the present time. Thus the user can choose to deselect these devices so that corresponding device icons will not appear in the configuration diagram. This helps to prevent cluttering the configuration diagram with device icons corresponding to unused or undesired devices. In an alternate embodiment, device icons corresponding to unused or undesired devices may appear in a separate palette of the configuration diagram so that they do not clutter the configuration diagram, yet the user is reminded of their presence. In another embodiment, device icons corresponding to unused or undesired devices may appear in the configuration diagram, but these device icons may be "grayed out" or have a different appearance to indicate they are not being used. In a similar manner, for programs that are not selected to be included, corresponding program icons may not appear in the configuration diagram, or may have an altered appearance. Non-selected program icons may appear in a separate palette. This also helps to prevent cluttering the configuration diagram with program icons corresponding to unused or undesired programs.

In one embodiment, all detected devices, programs and other elements are displayed in the configuration diagram, and thus user selection in step 228 may not be performed.

In step 230 the computer system 82 may display a configuration diagram including device icons, program icons, and possibly other elements. In one embodiment, the configuration diagram includes device icons corresponding to all detected devices. Alternatively, the computer system 82 may display the configuration diagram with only the devices selected in step 228. As described above, the device icons each preferably have an appearance that visually indicates the type of device. The configuration diagram may display connections between the various device icons to visually indicate how the devices are coupled to each other. These connections may be automatically displayed, or created by the user, or both. As described above, the connections displayed between the devices may each have an appearance that visually indicates the type of connection. The configuration diagram may also include program icons corresponding to programs, as well as other elements described herein.

In one embodiment, the configuration diagram may present different views, such as an entire system view, a subsystem view, an individual device view, a program relationship view, etc. Thus the user can select different options to display the configuration diagram with different views or different levels of granularity. Example configuration diagrams are shown in Figures FIGS. 21A and 21B, as well as in other Figures.

As noted above, the configuration diagram may include device icons that represent the various devices in the distributed system. Each of the device icons preferably has an appearance which corresponds to the device it represents. Thus, a computer system 82 may be represented by a device icon that has the appearance of a computer system. In a similar manner, other device icons may have an appearance which is similar to the appearance of the device it represents. This allows the viewer to easily view and understand what devices are present in the distributed system.

In another embodiment, a program stored on a device may optionally be represented by a device icon. This may be desirable where a certain program performs a "device-like" function. In another embodiment, a non-present device may have a device icon (virtual device icon), and the functionality of the non-present device may be simulated by a program executing on the main computer system or another device.

The configuration diagram may include connections ("connection icons") such as lines, that are displayed between the various device icons to show the interrelationship or coupling between the respective devices. In one embodiment, the connections that are displayed may be context sensitive to indicate the type of interconnection or interface (e.g., bus type), and/or the type of data or phenomena being provided between the devices.

In a measurement application, the device icons may represent the various measurement devices present in the system, such as those shown in FIGS. 2A, 2B and 3. For example, there may be device icons present for any one or more of the various measurement or automation devices shown in FIGS. 2A, 2B and 3. Thus, as one example, where a computer system is coupled to a PXI chassis that includes a plurality of PXI instrument cards comprised in the chassis, the configuration diagram may include a device icon which represents the computer system, and a device icon which represents each of the respective PXI instruments comprised in the PXI chassis. The configuration diagram may also optionally include a device icon which represents the PXI chassis, with further device icons comprised in or proximate to the PXI chassis device icon representing each of the respective PXI instrument cards. As another example, where one or more smart sensors are present in the measurement system, device icons may be present which represent each of the various smart sensors. In a machine vision application, device icons may be present for a host computer system 82, an image acquisition board 134, and a camera 132, which may be a smart camera as desired. Thus, the configuration diagram graphically displays a plurality of device icons which represent the devices that are present in the system, for which the user is desiring to configure or create an application.

In step 232 the user may manually or automatically arrange the various icons on the configuration diagram. For example, the configuration diagram may include an "auto-arrange" feature which automatically arranges the device icons and/or program icons to improve the appearance of the configuration diagram. The user may also manually arrange the device icons and/or program icons on the configuration diagram as the user desires.

In one embodiment, one or more of the devices may communicate geographic location information indicating the geographic location of the device. For example, where the distributed system includes a first computer system or other device located in Austin, Tex. and a second computer system or other device located in San Jose, Calif., each of these devices may communicate their geographic location information. The user may optionally select a feature which causes the geographic location of each device (or a selected subset of devices) to be displayed on the configuration diagram. This enables the user to more readily understand the distributed system.

The configuration diagram may include a "device view" that only shows interconnected device icons. The configuration diagram may also include a "program view" that shows program icons. The program view may show only program icons, or may show the program icons proximate the respective device icons on which they are stored. As discussed above, in steps 204 and 206 one or more existing or created programs may be displayed in a relationship view in the configuration diagram. The program icons may be displayed proximate to (e.g., under) and/or connected to the device icon on which they are stored or located (deployed). For example, programs that are stored on the main computer system 82 are displayed proximate to the main computer system device icon. Alternatively, as mentioned above, the configuration diagram may support a program relationship view that displays only program icons, without device icons. Links may be displayed between the program icons to indicate invocation (caller/callee) relationships.

Where the plurality of programs are configured to execute according to a specified relationship, the plurality of program icons may be displayed on the display according to the specified relationship. The plurality of program icons may thus be displayed to visually indicate the specified relationship of the plurality of programs, e.g., according to their corresponding relationship or program execution hierarchy. FIGS. 15-20 and 21B show a configuration diagram with program icons arranged in a program execution hierarchy.

Figure 8:
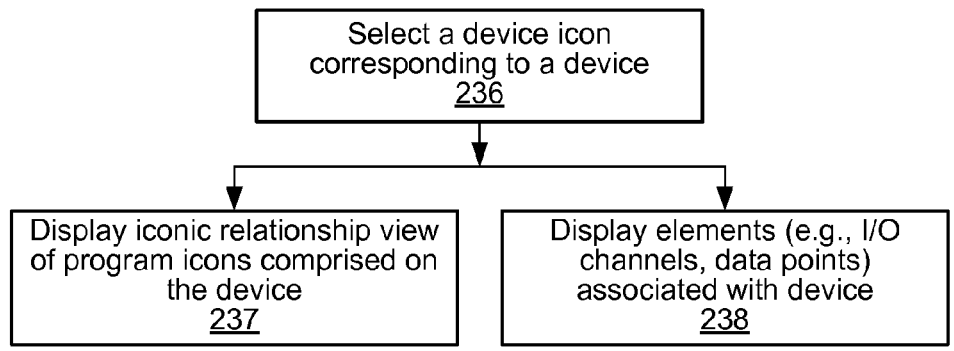
FIG. 8 is a flowchart diagram illustrating display of program icons or element icons corresponding to programs or elements comprised in a device.

As shown in FIG. 8, in one embodiment in step 236 the user may select a device icon (e.g., by double clicking or right clicking on the device icon). This may cause certain actions to occur, or a menu may open with different selections. For example, in step 237 the program icons corresponding to the programs comprised on or deployed on the device may be shown. As noted above, the program icons corresponding to the programs comprised on or deployed on the device may be shown proximate to the respective device icon, e.g., under the device icon, and/or connected to the device icon, as shown in FIGS. 15-20 and 21. Alternatively, the user may select a feature to show the program icons corresponding to all of the device icons. The configuration diagram may initially also display various program icons that are stored with each of the various devices.

As another example, the user may select a device icon in step 236 to view various other elements contained in the respective device in step 238, such as I/O channels, data points, named configurations, and programs stored in or deployed on the device.

Therefore, in one embodiment, the configuration diagram may be automatically or programmatically created by the computer system 82 based on an automatic detection of devices coupled to the computer system 82. In another embodiment, the computer system 82 may automatically or programmatically create a first portion of the configuration diagram for devices that it detects as being coupled to or comprised in the computer system 82, and the user may optionally create a second portion of the configuration diagram for devices that could not be detected by the computer system 82 through automatic means, and/or which include virtual devices that are not physically present.

The computer system 82 preferably stores the configuration diagram, e.g., data structures (which may be referred to as configuration data) corresponding to the configuration diagram. This configuration data may be saved in memory and reloaded on the system 82 or on other devices.

Connecting Device Icons

In one embodiment, the user can use a wiring tool to connect two device icons, similarly to the wiring tool used in LabVIEW. This may cause a connection, e.g., a wire, to appear between the device icons to indicate that the devices are coupled to each other. As noted above, connections between two device icons may also be displayed automatically. In one embodiment, the connection that is displayed between two device icons is context sensitive. In other words, the connection that is displayed or created on the display has a context or appearance that is associated with the types of devices that are being connected, the type of physical interface (e.g., bus type), and/or the type of data or information flow between the devices.

For example, where the link icon indicates the type of physical interface, when the user connects two device icons representing first representing first and second devices, the method may examine the interface type supported by the first and second devices and generate a connection or link between the two device icons having an appearance corresponding to the interface type or bus type being used. Alternatively, the user may select a link or connection from a palette based on the type of devices that the user desires to connect.

For example, where the link icon indicates the type of information flow, if the user is connecting a device icon representing a laser to a device icon representing a mirror or other optical device, when the user associates the first device icon with the second device icon (e.g., by clicking on the first device icon and dragging the cursor to the second device icon to create the connection), the configuration diagram may automatically draw a laser beam connection, i.e., a connection icon which has the appearance of a laser beam or optical signal. This visually indicates to the user the type of data or signals that are being passed between the devices. Alternatively, in a measurement, automation or simulation application, when the user connects a tank icon representing a tank to, for example, a valve icon representing a valve, the diagram may automatically draw the connection with the appearance of a pipe to visually indicate to the user the type of signals, data or phenomena that is being transferred between the devices.

In one embodiment, the configuration diagram is operable to perform type checking of connections between device icons. For example, if the user attempts to connect a PCI device to a USB device, the method may determine that the devices are incompatible and generate an error indication, such as a broken connection. As another example, if the user attempts to connect a tank icon to a laser icon, the configuration diagram may perform type checking and determine that the two device icons are incompatible types that cannot share the same physical phenomena.

However, if the user is connecting a first device icon to a second device icon to deploy a program or indicate program invocation, then type checking may not be performed, i.e., may be unnecessary.

Virtual Device Icons

As described above, the user may create a "virtual device icon" or "virtual program icon" that represents a non-present device or program, respectively. Virtual device icons and/or virtual program icons may also be automatically or programmatically created. For example, virtual device icons and/or virtual program icons may be automatically created for devices or programs that are purchased by user, wherein the virtual icons are displayed and used in the configuration diagram until the actual device or program is received and installed. For example, where the user purchases a device from a server computer 90, the server 90 may provide a virtual device icon to be temporarily displayed in the user's configuration diagram until the actual device is received and installed. In one embodiment, simulation code may be created or used to simulate operation of the virtual device until the physical device is installed.

In one embodiment, from the user's perspective, programs can be deployed to virtual devices (a program icon deployed to a virtual device icon) just as if the device was physically present. The program is not actually deployed or transferred to a virtual device until the corresponding physical device is added to the distributed system. When this occurs, the new device may be automatically detected, the new device may be correlated with the previously created virtual device, and programs that have been previously "deployed" to the virtual device by the user in the configuration diagram may now be physically or actually deployed to the real or physical device that has been installed. When a program is automatically deployed to a device icon, the configuration diagram may be animated to visually indicate to the user the deployment operation that is occurring to the newly installed device. For example, when a program is automatically deployed from the main computer system 82 to a first device, the corresponding program icon may be animated on the configuration diagram to "flow" from the computer system device icon to the first device icon corresponding to the first device.

In a similar manner, a virtual program may be deployed to a device just as if the program was actually installed. For example, a virtual program icon that represents a hardware configuration program may be deployed to a device that includes a programmable hardware element. A virtual program icon may be used in the instance where the actual hardware configuration program is in the process of being compiled and is not yet ready for deployment. In one embodiment, the operation of the hardware configuration program may be simulated by software executing on the computer system until the hardware configuration program has been compiled and deployed.

In another embodiment, where a user specifies a non-present or "virtual" device, or attempts to deploy a program to a non-present or "virtual" device, the method may optionally use another "present" device as a stand-in.

Figure 9:
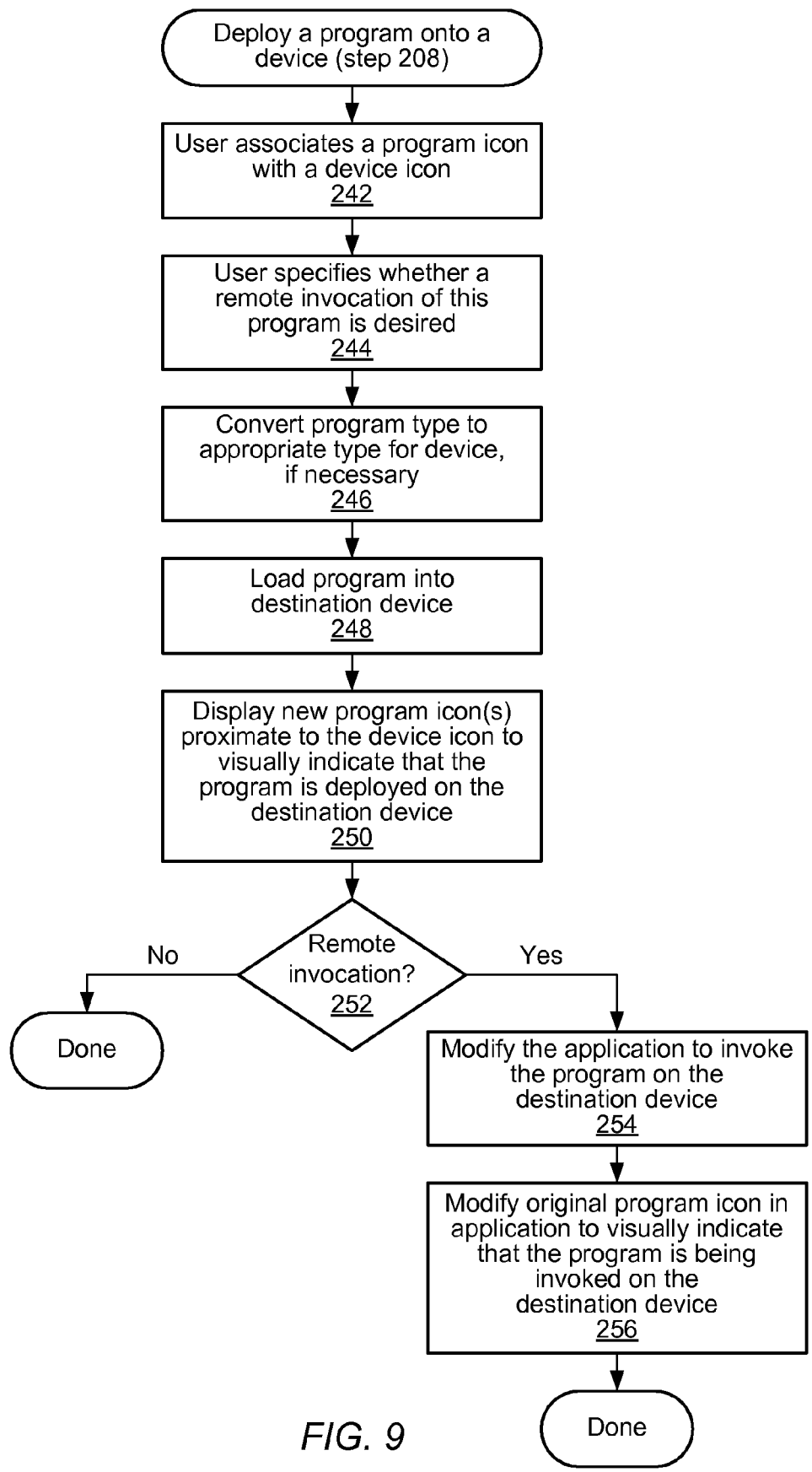
FIG. 9 is a flowchart diagram illustrating deploying a program on to a device according to one embodiment of the invention.

FIG. 9—Deploying a Program on a Device

FIG. 9 is a flowchart diagram illustrating operation of graphically deploying a program on a device. The method of FIG. 9 can be used to distribute an application among a plurality of devices in a distributed system, wherein the application comprises one or more programs. The method executes on a first computer system, such as computer system 82, which includes or is coupled to a display for displaying the configuration diagram. In one embodiment, the configuration diagram may be shown on client computer 82 and the method may execute on server computer 90, which displays the configuration diagram on the client computer 92.

It presumed that the configuration diagram (or another window) displays one or more program icons, preferably a plurality of program icons, wherein each of the program icons corresponds to at least one program in the application. The configuration diagram also displays one or more device icons on the display, wherein each device icon corresponds to a device in the system. Each device may be coupled to the first computer system 82 in some manner, or may be a virtual device as described above.

In step 242 the user associates a first program icon of the plurality of program icons with a device icon in response to user input, wherein the first program icon corresponds to a first program in the application. The device icon represents a device in the system. For example, the device icon may correspond to a remote device in the distributed system, i.e., a device other than the main computer system 82. In the preferred embodiment, associating the first program icon with the device icon in response to user input comprises "dragging and dropping" the first program icon on to the device icon. This may comprise the user selecting a program icon on the display in the configuration diagram with a pointing device, such as a mouse, and dragging and dropping the program icon on to a device icon. The concept of "dragging and dropping" icons is well known in the computer arts. The user may also associate the first program icon with the device icon using speech recognition techniques. For example, the user might say "associate program A with device B" or "deploy program A on device B" to cause the association. Other types of user input to create the association are also contemplated.

The step of associating (e.g., dragging and dropping) the first program icon with the device icon may include receiving further user input (e.g., a modifier) in step 244 indicating a certain operation. The type of operation may include moving the program; copying the program; deploying the program for remote execution (steps 254 and 256); changing the location of remote execution of a program from a first device to a second device (FIG. 11) or creating a call or invocation to the program (FIG. 12) without moving the program. The step of associating may also have a default mode, e.g., that the first program is to be deployed on to the device for remote execution. Further user input may be provided by the user if a different operation than the default mode is desired.

This further user input may comprise the user pressing a key on the keyboard during the drag and drop operation performed in step 242. For example, in one embodiment, when the user drags and drops the first program icon on to the device icon without pressing a key on the keyboard, the first program corresponding to the first program icon is copied to the device, but is not deployed for remote execution. When the user drags and drops the first program icon on to the device icon while pressing a key on the keyboard (e.g., the ALT key), the first program corresponding to the first program icon is copied to the device and deployed for remote execution. In another embodiment, when the user associates (e.g., drags and drops) the first program icon on to the device icon, a dialog box or menu appears which queries the user as to the type of association the user desires. Speech recognition techniques may also be used.

In step 246 the method may convert the program type of the first program to a different program type supported by the device, if necessary. In one embodiment, each program may have a program type, such as executable, text-based source code (uncompiled), graphical program, hardware configuration file, etc. In one embodiment, the method (e.g., the computer system 82) may operate to automatically convert programs between different device types to ensure that deployed programs work properly on the devices to which they are deployed. The conversion method may involve: determining the first program type of the first program; determining the one or more program types supported by the device; determining if the device is incompatible with the first program type of the first program; and converting the first program to a different program type supported by the device if the device is incompatible with the first program type of the first program. Step 246 is discussed in greater detail with respect to the flowchart of FIG. 9. The conversion method may also display an error if conversion is not possible.

In step 248 the method may load or deploy the first program on to the device in response to the association performed in step 242. For example, the method may transfer or load (e.g., move or copy) the program to the specified device for later (or immediate) execution. The type of load or deploy operation in step 248 may be performed based on the input received in step 244. This transfer step may utilize any of various standard bus protocols. Where the source and destination devices are coupled to the Internet, the transfer may use TCP/IP. Where the source device is the main computer system 82 and the destination device is a USB device coupled to the computer system 82, the transfer may use USB communication (USB packets).

In one embodiment, the plurality of programs are configured to execute according to a specified relationship. For example, the plurality of programs may be configured to execute according to a specified execution hierarchy. In this embodiment, the first program may be configured to call one or more other (e.g., lower level) programs according to the specified relationship or hierarchy. In this instance, the deploying step 248 comprises deploying the first program and the one or more other (e.g., lower level) programs on to the device. In other words, the respective program selected by the user in step 242 may be loaded in step 248, and all programs beneath the respective program in the hierarchy may be loaded as well.

In step 250 the method may display a new program icon proximate to the device icon after the associating step. The new program icon may be displayed in response to the deploying performed in step 248. The new program icon is preferably a copy of, or has the appearance of the first program icon proximate to, or connected to, the device icon. The new program icon (e.g., the copy of the first program icon) displayed proximate to, or connected to, the device icon visually indicates that the first program is deployed on the device. In another embodiment, the method may modify the device icon after or in response to the deploying step 248 or the associating step 242. The modified device icon visually indicates that the first program is deployed on the device.

For example, in one exemplary embodiment, a small downward-pointing triangle may be displayed on the device icon to indicate that the software program represented by the program icon(s) displayed proximate to the device icon (e.g., and coupled to the device icon via a line) is deployed on the corresponding device, as shown in FIGS. 17, 18, 19, 20A and 20B, among others.

In one embodiment as noted above, the plurality of programs may be configured to execute according to a specified relationship (such as a specified execution hierarchy), and the first program may be configured to invoke one or more other (e.g., lower level) programs according to the specified relationship or hierarchy. In this instance, step 250 comprises displaying the first program icon corresponding to the first program, as well as program icons corresponding to the one or more other (e.g., lower level) programs, proximate to the device icon.

Figure 15:
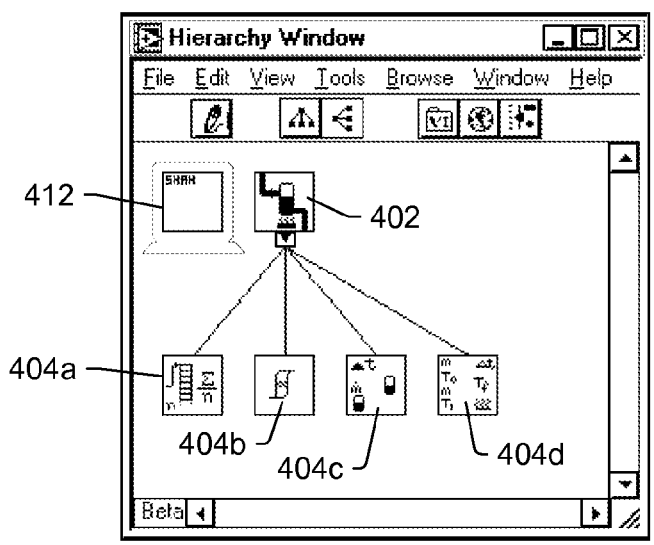
FIGS. 15-19 are screen shots illustrating graphical deployment or invocation changes of programs in exemplary simple configuration diagrams.
Figure 16:
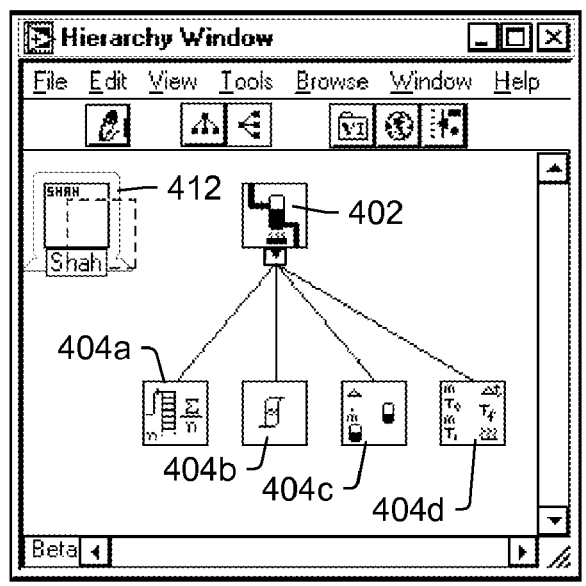
Figure 17:
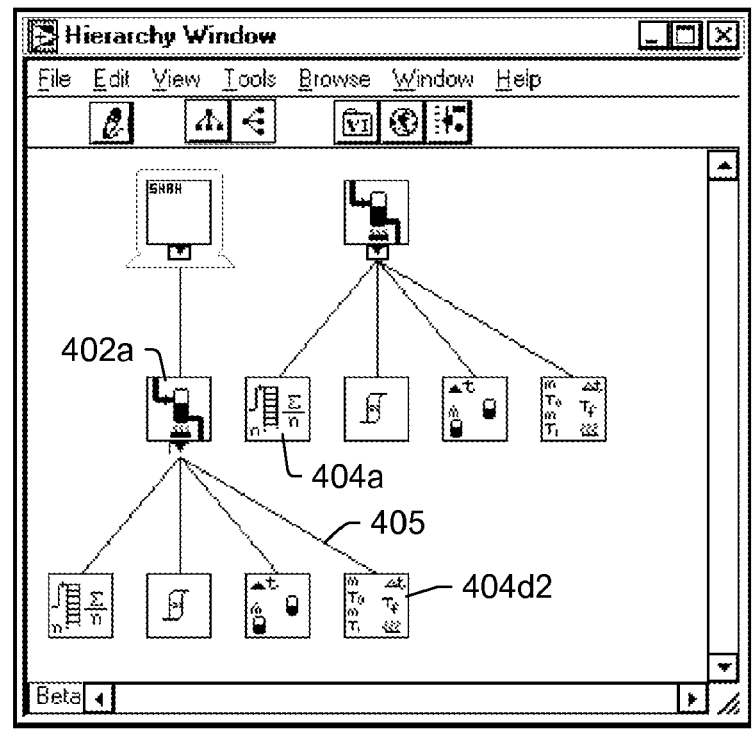

This is illustrated in FIGS. 15-17. For example, FIG. 15 illustrates an exemplary configuration diagram including a hierarchy of program icons 402 and 404A-D and a device icon 412. The hierarchy of program icons comprises a main program icon 402 at the top level of the program hierarchy and four program icons ("sub-program icons) 404A-D at the next level of the program hierarchy. When the user associates the program icon 402 with the device icon 412 (e.g., drags and drops the program icon 402 on to the device icon 412), as shown by the "dotted line" icon in FIG. 16, the resulting configuration diagram appears as shown in FIG. 17. As shown in FIG. 17, the program icon 402, as well as the lower level program icons 404A-D are copied proximate to (e.g., under) the device icon labeled "Shah" 412. This visually indicates that the entire program hierarchy has been deployed on or copied to the device represented by the device icon 412. In another embodiment, the user can configure the deployment where only the selected program is transferred, and any lower level programs are not transferred.

In step 252 the method determines if the action being performed is a remote invocation. If the action being performed is simply a copy step, then operation completes, the copy having been performed in step 248.

If the action being performed is a remote invocation as determined in step 252, then in step 254 the method may modify the application to invoke the first program on the remote device. This may comprise modifying at least one program in the application to invoke the first program on the device. Thus, during execution of the application, the application is operable to invoke the first program on the device, wherein the first program executes on the device. Where the plurality of programs are configured to execute according to a specified relationship, and where the first program (e.g., callee program) is invoked by a second program (e.g., caller program) according to the specified relationship, step 254 may comprise modifying the second program in the application to invoke the first program on the device. If the action being performed involves associating a program icon from a source device to a destination device to configure remote invocation of the program on the destination device from the source device, then at least one remaining program on the source device (which may be referred to as the caller program) may be modified to invoke the program on the destination device.

In step 256 the method may comprise displaying a new icon (e.g., a modified version of an existing icon) on the display in the configuration diagram to represent the invocation being performed. This new icon may visually indicate that the first program is deployed on the device and will be executing on the device. In other words, this new icon may visually indicate that the application invokes the first program on the device. For example, the new icon may be displayed in place of the first program icon. In one embodiment, the new icon is a modified version of the first program icon which visually indicate that the first program is deployed on the device and will be executing on the device. For example, the modified version of the first program icon may comprise modifying the first program icon to include the appearance of the device icon.

For example, as noted above, FIG. 15 illustrates an exemplary configuration diagram including a hierarchy of program icons 402 and 404a-d and a device icon 412. The hierarchy of program icons comprises a main program icon 402 at the top level of the program hierarchy and four program icons ("subprogram icons) 404a-d at the next level of the program hierarchy. When the user associates the program icon 404d with the device icon 412 (e.g., drags and drops the program icon 404d on to the device icon 412), as shown in FIG. 16, for the purpose of deploying the program remotely, the resulting configuration diagram appears as shown in FIG. 18. As shown in FIG. 18, the program icon 404d is copied under the device icon labeled "Shah" 412. Also the appearance of the original program icon 404d is changed to include the appearance of the device icon 412 resulting in new icon 404d1. This visually indicates that the program 404d in the program hierarchy is deployed on the device represented by the device icon 412 and will be executing on the device.

Figure 13A:
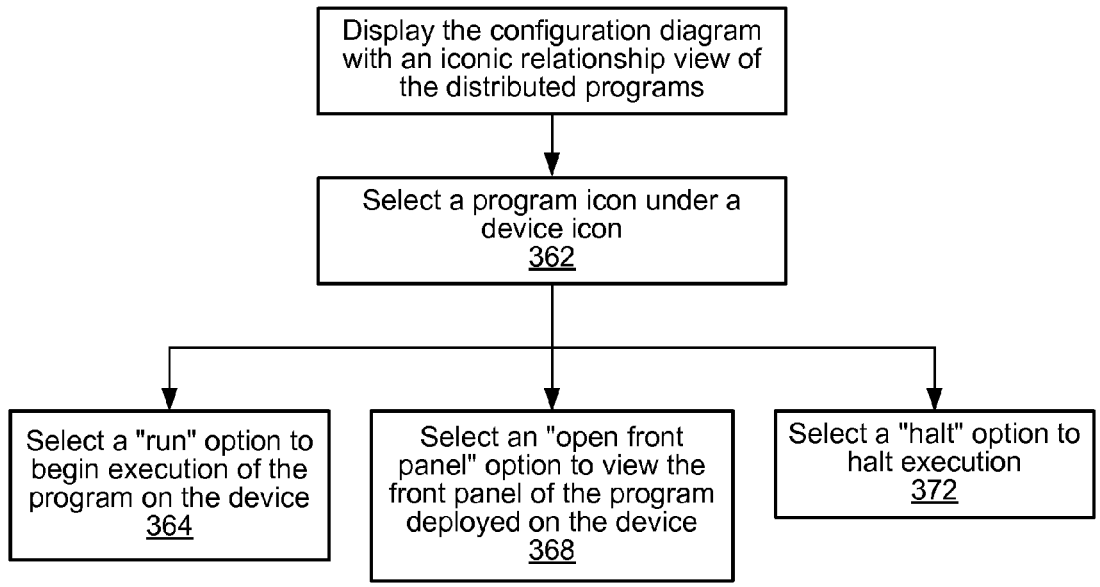
FIG. 13A is a flowchart diagram illustrating various operations that may be performed on a program icon.
Figure 13B:
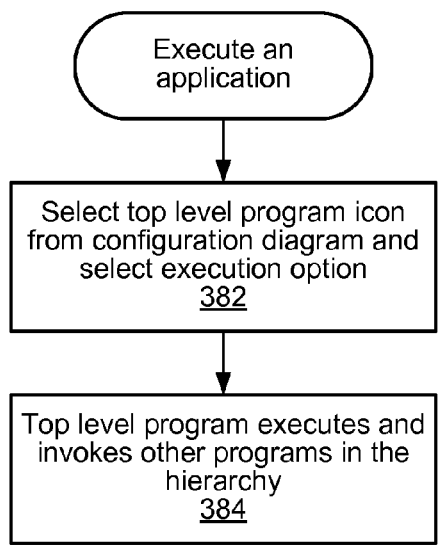
FIG. 13B is a flowchart diagram illustrating execution of an application.

After programs have been deployed to the various devices as desired, the application may be executed, as described with respect to FIG. 13b During execution, a portion of the application may execute on the main computer system 82, or another device, and the application may invoke various programs on various devices in the distributed system. For example, the application on the main computer system 82 execution may invoke a first program that has been deployed on a remote device. The first program may execute on the device and then either invoke other devices or return control to the application on the main computer system 82.

Figure 10:
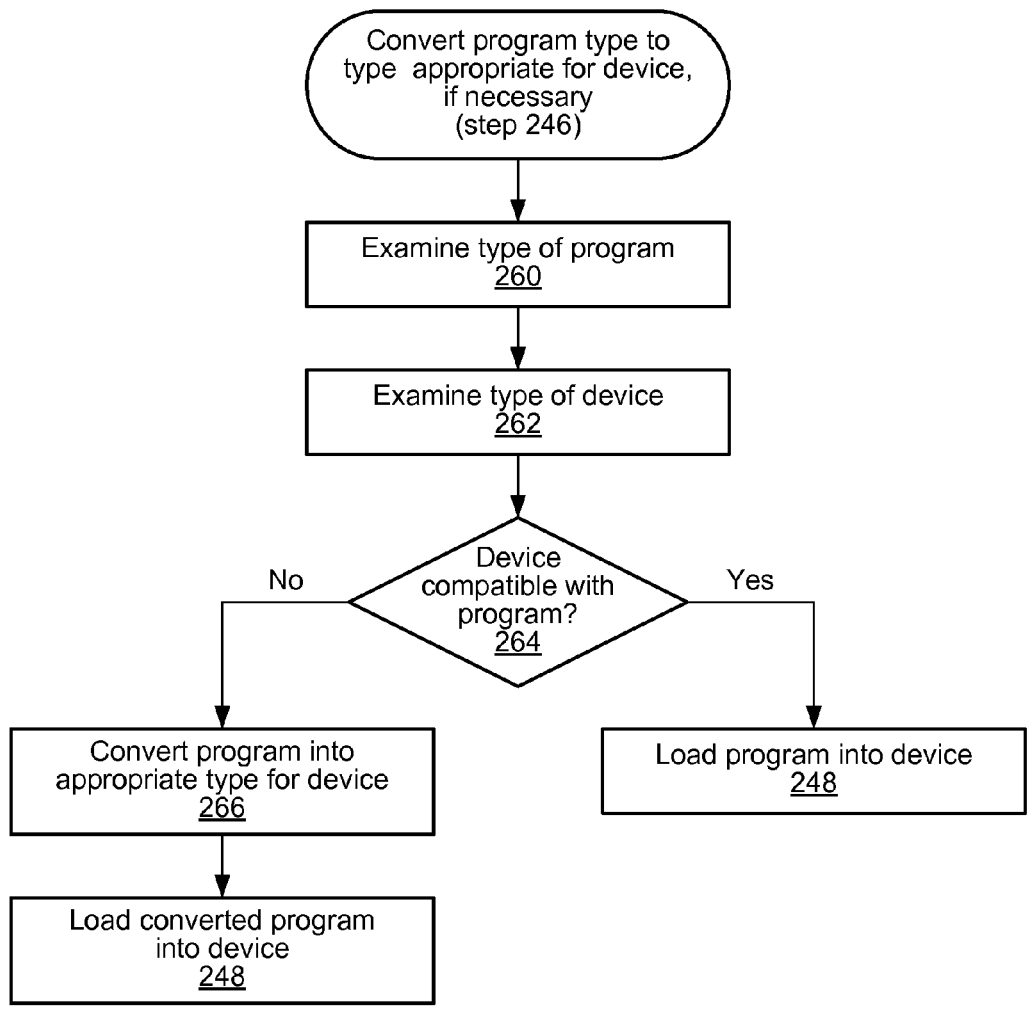
FIG. 10 is a flowchart diagram illustrating examining a program type of a program and selectively converting the program to a type compatible with the destination device.

FIG. 10—Converting a Program to a Different Program Type

FIG. 10 is a flowchart diagram illustrating more detail regarding step 246 of FIG. 9. FIG. 10 illustrates more detail regarding examining the program type of a program being deployed and ensuring that the program type is compatible with the device to which it is being deployed. As described above, the method of FIG. 10 is performed when a user deploys a program on a device, e.g., when the user drags and drops a program icon on to a respective device icon. The method of FIG. 10 may also be performed in response to other operations preferred by the user, such as an automatic deployment of a program.

As noted above, the program icon may represent any of various types of programs ("program types") such as executable (compiled) programs, source code (uncompiled) programs of various types, graphical programs, hardware configuration programs (hardware descriptions), etc. The device represented by the device icon may be any of various device types, e.g., may include a processor and memory or may include a programmable hardware element.

In one embodiment, the main computer system 82, which may be different from the source device which currently stores the program and the destination device to which the program is being deployed, may store conversion software which examines both the type of the program being deployed and the type of device icon to which the software program is being deployed. The main computer system 82 may execute this conversion software to automatically convert programs to different types on an as needed basis, thereby ensuring that the destination device is able to receive a program having a type that is executable or useable by the destination device. In another embodiment, one or both of the source device and the destination device may include conversion software for converting programs between various types.

In step 260 the method examines the type of software program being deployed, i.e., whether the software program is an executable program, uncompiled program, graphical program, software object, etc. The method may also determine more specific information regarding the program type. For example, if the software program is an uncompiled program, the method may determine the type of source code, e.g., C, C++, Java, etc., to determine the appropriate compiler, if necessary. If the software program is a graphical program, the method may determine whether the software program is a LabVIEW VI, a Simulink diagram, a VEE diagram etc. The method may also determine different types of hardware configuration programs or files (hardware descriptions).

In step 262 the method examines the type of device ("device type") to which the software program is being deployed, i.e., the type of device represented by the device icon with which the program icon was associated. The various types of devices may include devices which include a CPU with memory, a programmable hardware element, such as an FPGA, and/or may include respective types of execution engines or compilers for different software types.

If the program icon has been associated (dragged and dropped) with or deployed to another program, i.e., (the destination program icon) the method may examine the destination program icon in step 262. This may be necessary to ensure that the destination program corresponding to the destination program icon can interoperate with the program being deployed. The method may also examine the destination device which includes the destination program.

In step 264 the method determines whether the device is compatible with the respective program. For example, if the device includes a CPU and memory and an appropriate operating system and/or execution software, and the software program is a conventional executable which can be executed by the software currently present on the device, then the device is determined to be compatible with the program. However, as another example, if the program is a software program such as a compiled executable or source code, and the device contains only a programmable hardware element such as an FPGA, then the software program would be determined to be incompatible with the device. As another example, if the program is a graphical program such as a LabVIEW graphical program developed in the LabVIEW program development environment, and the device is a computer system which does not include the LabVIEW execution environment or LabVIEW run time system, then the software program would be determined to be incompatible with the device.

If the device is determined to be compatible with the program in step 264, then in step 248 the program is loaded into the memory of the device or configured on to the device for later execution. Thus, if the program is a software program and the device includes a processor and memory medium, the software program can be loaded into the memory medium of the device for later execution. As another example, if the program is a hardware configuration program or file for configuring a programmable hardware element such as an FPGA, and the device is, for example, a smart sensor which includes an FPGA, loading the program on to the device may comprise configuring the FPGA of the device with the hardware configuration program. Step 248 was discussed above with respect to the flowchart of FIG. 8.

If the device is determined to be incompatible with the program in step 264, then in step 266 the program may be converted into the appropriate format for the device, if possible. As one example, if the program is a software program such as an executable (compiled) program, a graphical program, a source code program, etc., and the device includes a programmable hardware element such as an FPGA, the software program may be programmatically converted into a hardware configuration program in step 266. As another example, if a program is a particular type of program which requires a particular execution engine, such as a LabVIEW graphical program or VI which requires a LabVIEW execution engine, and the destination device does not include the LabVIEW execution engine, then the LabVIEW graphical program may be converted into a text based programming language, e.g., a C program, and then compiled into executable format in step 266. As yet another example, if the program is a hardware configuration file intended for an FPGA or other programmable hardware element, and the device to which the program is being deployed comprises a CPU and memory and does not include a programmable hardware element, then the hardware configuration file may be converted into a software program for execution by the device in step 266. As another example, if the program is currently in a source code format, an appropriate compiled . . . procedure-based code, object oriented code . . . .

In step 248 the converted program is loaded on to the device. For example, where the main computer system 82 is the source device, the main computer 82 may execute the conversion program to convert the program to the appropriate program type, and transfer the converted program to the destination device. If the main computer system 82 is not the source device, the program may first be transferred to the main computer system 82 for conversion, followed by transferring the converted program to the destination device.

It is noted that the operation of converting the program into the appropriate format for the device in step 232 and then loading the converted program on to the device in step 234 may occur invisibly to the user. In other words, the user may simply drag and drop the program icon on to the device icon in step 242 and enter other information in step 244. Steps 246, 248, 250, 252, 254 and 256 of FIG. 8 (and the steps of FIG. 9) may be performed invisibly to the user. Thus, the user may never know that the program corresponding to the program icon that the user dragged and dropped on to the device icon was initially incompatible with the device, the conversion of the program to the appropriate format in step 246 having been performed invisibly to the user.

In another embodiment, if the device is determined to be incompatible with the program in step 264, a dialog may appear alerting the user as to this incompatibility and asking if the user desires for the conversion to occur. In some instances there may be a plurality of appropriate formats or program types for the device. In this instance, the dialog box may request the user to select which format or program type in to which to convert the program in step 266. Alternatively, the user may choose to not complete the deployment due to the incompatibility.

In another embodiment, instead of converting the program to the appropriate type, the method may transfer software, such as an execution engine, to the device to enable the device to execute the program. For example, if the program is a graphical program such as a LabVIEW graphical program developed in LabVIEW, and the device does not include the LabVIEW execution environment or LabVIEW runtime system, then the computer system 82 may transfer the LabVIEW execution engine, e.g., LabVIEW or LabVIEW RT, to the device.

FIG. 11—Association of a Program Icon From a Source Device to a Destination Device FIG. 11 is a generalized flowchart diagram illustrating association of a program icon from a first or source device to a second or destination device. Stated another way, FIG. 11 illustrates where a program icon corresponding to a first or source device icon may be associated with a second or destination device icon, or a program icon of the destination device icon. The flowchart of FIG. 10 describes operation where the source device icon may be the main computer system 82 or a remote device coupled to the main computer system 82. In a similar manner, the destination device or second device may be the main computer system 82 or a remote device coupled to the main computer system.

The flowchart of FIG. 11 is similar to the flowchart of FIG. 9. However, the flowchart of FIG. 11 further includes case 4 described above, which involves transferring remote execution of a program from a first device to a second device, wherein in each case the program is being remotely invoked by a third device.

As shown, in step 242 the user may associate a program icon from a first source device to a second destination device. As described above with respect to step 242, this may be performed using iconic drag and drop techniques.

In step 244 the user may specify the type of operation. As described above, this may comprise pressing a selected key on the keyboard during the drag and drop operation, using a dialog box before or after the drag and drop operation, or using speech recognition techniques.

In step 246 the method may convert the program type of the source or first program to a different program type supported by the destination device. As described above with respect to 246 of FIG. 9, where the source and destination devices are both remote devices, this may involve the main computer system 82 detecting that a conversion is needed, reading the respective program from the source device, performing the conversion to the new program type, and then sending the converted program to the destination device in step 248. In another embodiment, various devices in the distributed system may include the capability of performing this program type conversion as desired.

In step 248 the program may be deployed on the destination device. This may be performed by the source device directly sending the program or the converted program to the destination device. Alternatively, the program may be routed through the main computer system 82, e.g., may be transferred from the source device to the main computer system 82 and then to the destination device.

In step 250 a new program icon may be displayed proximate to the destination device icon in the configuration diagram to indicate that this program has been transferred or copied to the destination device.

Upon completion of step 250, various different operations may be performed depending on the type of operation selected by the user. As shown, if the user has indicated a desire to simply copy the program from the source device to the destination device then operation completes, the copy operation having been performed in step 248.

If the user has indicated in step 244 that a remote invocation from the first remote device to the second remote device is desired, then in step 254 the method modifies the caller program on the source device to invoke the callee program (the program that was transferred in step 248) on the destination device. In step 256 the caller program icon is modified on the source device or first device to initially indicate that the program is being invoked on the second or destination device. This operation is similar or identical to operation in steps 254 and 256 of FIG. 9.

The user may also indicate in step 244 that the user desires remote invocation of this program from a third device (e.g., the main computer system 82) to this program on the second or destination device. In other words, the user may have previously deployed this program on the source device, and may later decide to instead have the remote execution of this program occur on a different device, i.e., the destination device instead of the source device. Thus, instead of the user having to move the program icon corresponding to this program back to the main computer system device icon and then to the new destination device where remote execution is desired, the user can simply drag and drop the program icon for this program from the first or source remote device to the second or destination remote device and indicate that the user desires this program to be called from the main computer system 82 and execute on this second destination device. In this instance, in step 253 the computer system 82 may determine if it is able to invoke the program from the destination device. If so, then in step 254A the computer system 82 modifies the application, e.g., one of the programs on the application contained on the computer system 82, to invoke the program on the second destination device. In step 256A the original program icon, i.e., the caller program icon proximate to the computer system device icon is modified to visually indicate that the program is now being invoked on the second or destination remote device and is no longer being invoked on the first or source remote device.

As noted above, the user may also associate (e.g., drag and drop) a program icon from a first device icon to a second device icon and indicate that the user desires for a program or application on the second device icon to invoke the program corresponding to the program icon being associated on the first icon. In this situation, as shown in FIG. 12, in step 292 a program or application on the second device, e.g., one or more programs in the second device, may be modified to invoke the program that is stored on the first device. In step 294 the method may modify the original program icon on the second device to visually indicate that the program is being invoked on the first device. FIG. 12 is described further below.

FIG. 12—Association of a Program Icon From a Remote Device to the Main Computer System FIG. 12 is a flowchart diagram illustrating association of a program icon from a remote device to the device icon for the main computer system 82. It is noted that the flowchart of FIG. 12 can also apply readily to associating a program icon from a first remote device to the device icon of a second remote device.

In one embodiment, the user can select program icons comprised on a device that is not the main device 82 and associate these program icons with the main device 82 using the drag and drop techniques described above. The user can select various operations to be performed, as described below. For example, in step 282 the user can select a program residing on a remote device and drag and drop the corresponding program icon on to the device icon of the main device 82.

In step 284 the user can select among various options, e.g., either to 1) move or 2) copy the program to the main computer system 82, 3) to deploy the program in the main computer system; 4) to transfer execution from a first device to a second device; or 5) to cause remote execution of this program by the programs on the main computer system 82. This selection may be performed by providing certain user input, such as holding down a certain key during the drag and drop operation, or through a dialog box, or using speech recognition. Here it is presumed that the user selects option 5. Options 1, 2 and 3 were described above in FIG. 9 and options 1, 2, 3 and 4 were described above in FIG. 11.

If the user selects the option to cause remote execution of this program by the application on the main computer system 82 as determined in step 286, then steps 292 and 294 are performed. In step 292 the application, e.g., one or more programs in the application, may be modified to invoke the program that is stored on the remote device. In step 294 the method may modify the original program icon in the application to visually indicate that the program is being invoked on the remote device.

Thus, in this instance, the program on the remote device is not actually copied to the main device, rather dragging and dropping the program on the remote device to the main device icon causes the main device icon to include a call to this program on the remote device. Thus, when the main program on the main device executes, a call is made to this program on the remote device to invoke execution of this program on the remote device during execution of the main application program.

In step 282 the user can drag the program from the remote device to a particular program icon in the hierarchy of program icons displayed on the main device. Thus the user can select which program in the hierarchy of the main device 82 will call this program on the remote device. If the user drags a first program icon from the remote device on to a second program icon residing on the main device 82 in this fashion, then in the embodiment of FIG. 12, the second program is configured to place a call to the first program. Thus, after the second program (corresponding to the second program icon) in the main device 82 executes, it places a call to the first program (corresponding to the first program icon) on the remote device to invoke execution of this first program on the remote device. If the user desires to specify with finer granularity where in a respective second program on the main device this call should be made, the user may open up the source code of the second program and specify the exact location. For example, if the program is a graphical program, such as a LabVIEW VI, the user may open the block diagram of the second program (e.g., by right clicking on the program icon in the configuration diagram and selecting this option) and then further select a particular node where this call is to be made. In one embodiment, the user may drag and drop the program icon from the remote device on to a particular location (e.g., on to a node or wire) in the diagram to select where this call is to be made. In one embodiment, when the user drags a program from a remote device to a program icon on the main device, and where the program on the main device is a graphical program, the graphical program block diagram automatically appears on the display, allowing the user to easily navigate and place the call to the program in the calling program.

FIG. 13A—Possible Operations with Program Icons

As described above, the system displays the configuration diagram with an iconic view, preferably an iconic relationship view (e.g., hierarchy view), of the distributed software programs. The user can select various options associated with device icons and/or program icons. FIG. 20A illustrates an exemplary screen shot showing a user selecting options (e.g., by right clicking on the icon) from a menu associated with a program icon. The follow are representative examples of operations that may be performed with respect to a program icon.

In step 360 the configuration diagram is displayed with an iconic relationship view of the distributed programs.

In step 362 the user can select a program icon associated with a device icon, e.g., by is right clicking on the respective program icon. Alternatively, the user may select a device icon, e.g., by right clicking on the device icon and then selecting a run option for the device icon.

In step 364 the user can then select a "run" option to begin execution of the program that has been deployed on to the device. If the user has selected a device icon, the user can select a run option for the device icon. This operates to begin execution of the top level program, or all of the programs, that have currently been deployed on the device. This Run option is shown in FIG. 18.

In step 368 the user may select an "Open Front Panel" option to view the front panel or user interface of the program deployed on or executing on the device. If the program is not currently executing, selection of this option will cause the user interface panel(s) or front panel to be displayed for the program. If the program is currently executing on the device, and the user selects this option to view the user interface panel, the user interface panel may appear wherein the user interface panel may show one or more of the inputs and/or outputs of the program being executed. Where the program is executing on a remote device, i.e., a device separate from the computer system, the panel or user interface information may be transferred to the main computer system 82 for display. The data being received by or generated by the program may be transferred over a bus or network to the main computer system 82 where the user interface panel is displayed, and the data may appear in the user interface panel much like the programs executing directly on the main machine. In one embodiment, the user may also be able to interactively manipulate input provided to the program using the user interface panel on the main program, wherein this user input is received by the main computer system and transferred to the device where the program is actually executing. Output produced by the program in response to this input may then be transferred back to the main computer system 82 and displayed on the user interface panel that is being displayed on the display of the main computer system 82. The "Open Front Panel" option is shown in FIG. 20A.

As shown in step 372, the user may also select an option to cause the program represented by the program icon to halt execution. This may also cause all programs below this program in the hierarchy to also halt execution. Alternatively, the user may select an option for a device icon to select a stop or halt menu item, which causes all programs executing on the respective device to stop execution.

In one embodiment, the may also select an option to cause the source code of the program to be displayed. For example, if the program is a graphical program, then user selection of this option may cause the block diagram of the graphical program to be displayed. If the program is a text based program, such as a C-language program, then user selection of this option may cause the textual source code of the program to be displayed. The user may also select various debugging features to executing on the program.

Various other operations are possible. For example, FIG. 20A illustrates a menu which includes options such as "Highlight Connections", "Hide All Sub-VIs", "Show VI Hierarchy", "Show All Sub-VIs", "Show All Callers", "Find All Instances", "Edit Icon", VI Properties", "Open Front Panel" (see step 368), "Print Documentation", "Run" (see step 362), "CloseVI", and "Remote Call".

Figure 20A:
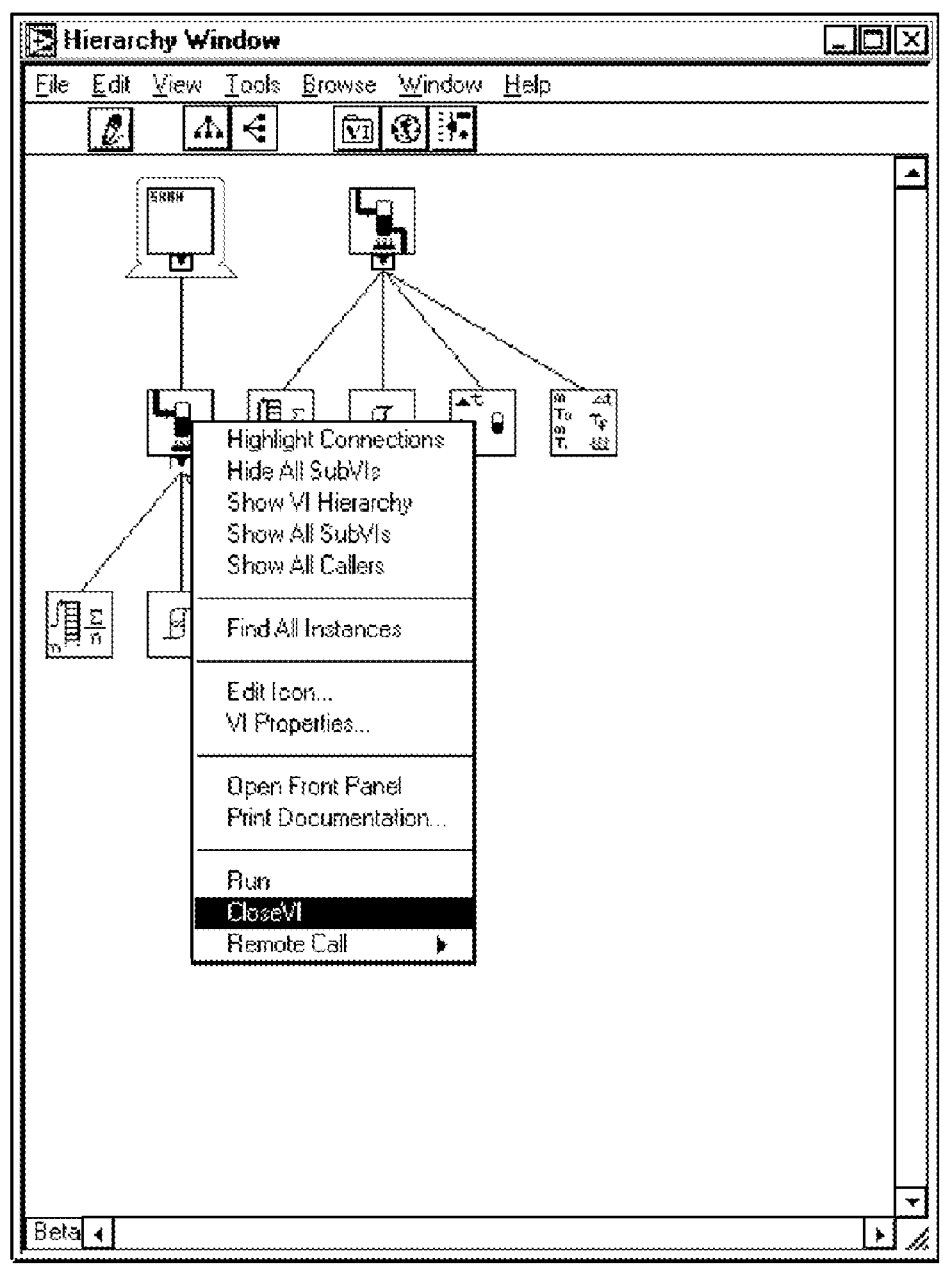
FIG. 20A illustrates selection of options on the configuration diagram.
Figure 20B:
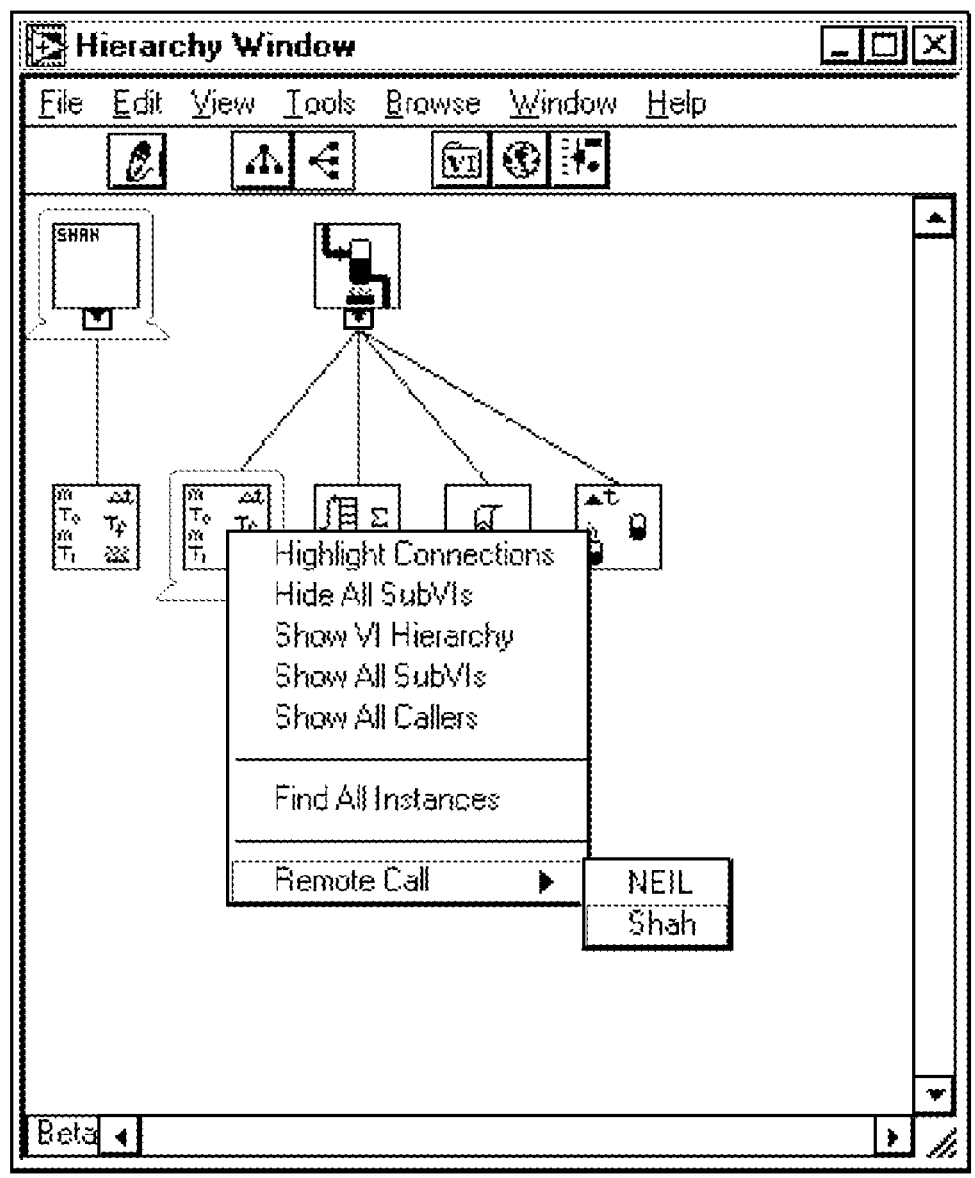
FIG. 20B illustrates selection of a "Remote Call" feature.
Figure 21A:
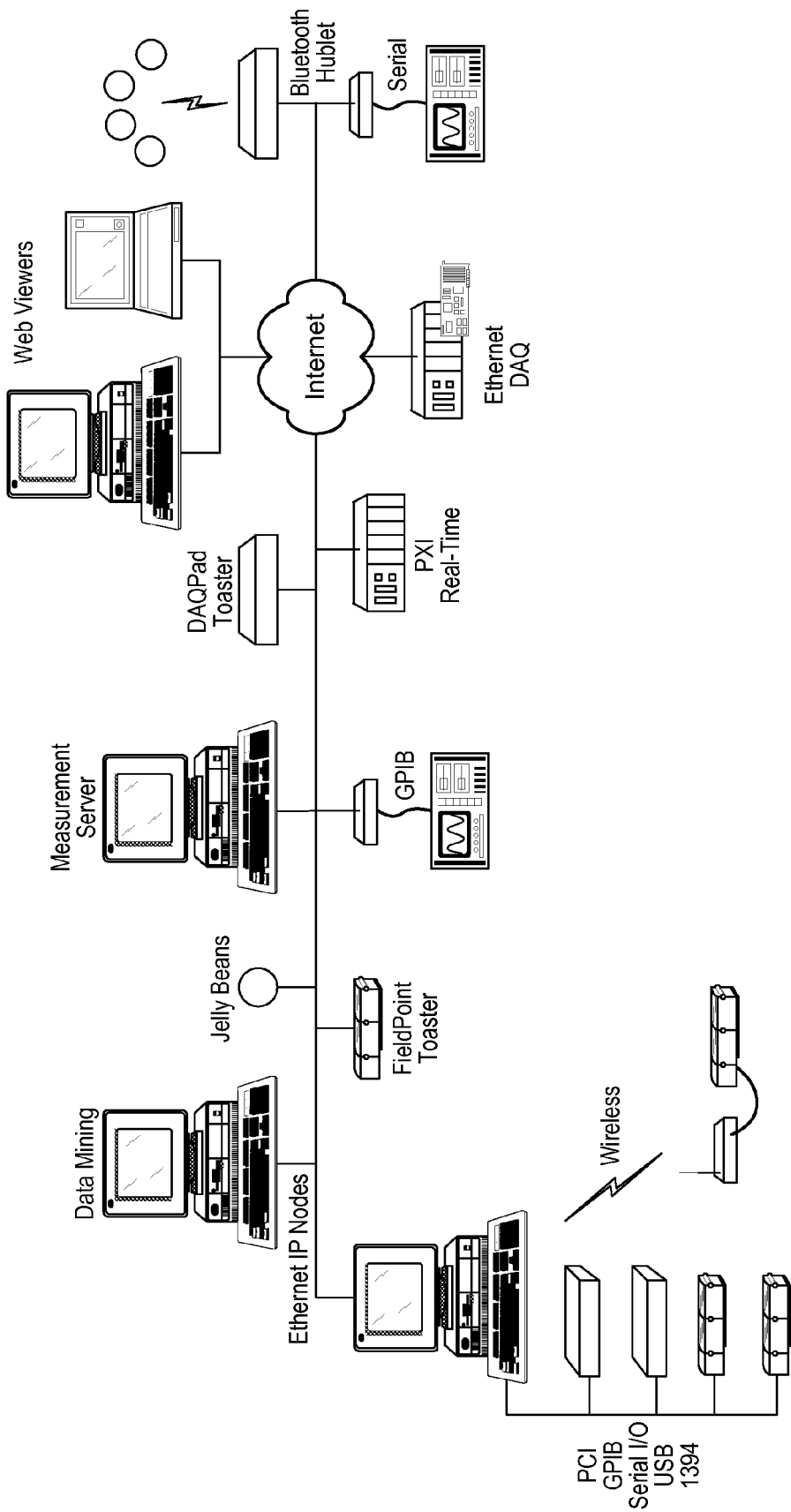
FIGS. 21A and 21B illustrate exemplary configuration diagrams for a measurement system.
Figure 21B:
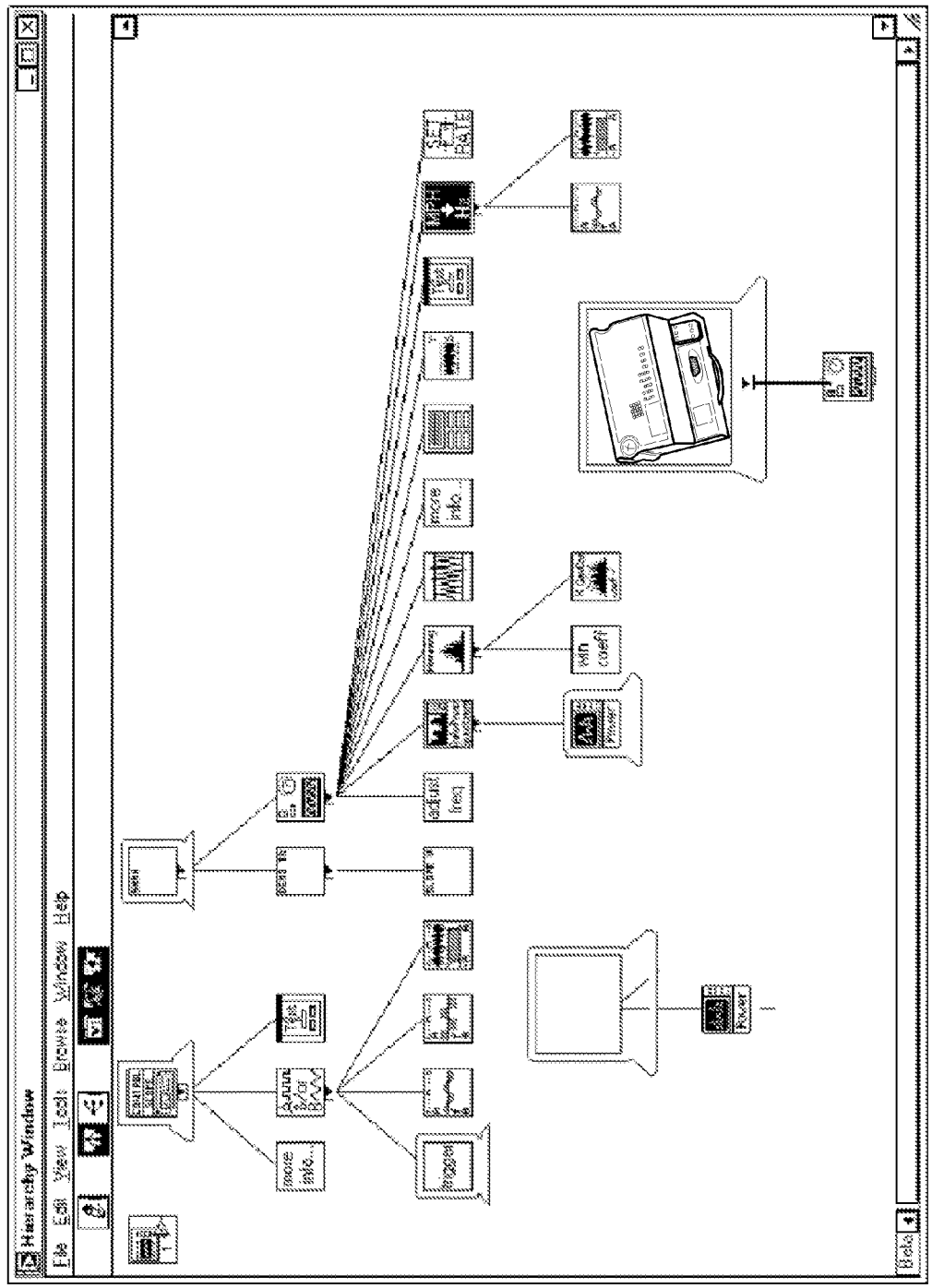

Selection of the "Remote Call" feature is shown in FIG. 20B. As shown, selection of the "Remote Call" feature may cause the names of other program icons or device icons to be displayed in a menu. The user may then select the name of an icon to configure a remote call or invocation. A new link may then be displayed in the configuration diagram to visually indicate this remote call. Alternatively, when the user selects the "Remote Call" feature, program icons or device icons themselves may be highlighted in the diagram. The user may then select from among these icons to configure the remote call.

In one embodiment, if the user drags and drops a first device icon on to a second device icon, this causes all programs stored on the first device icon to be copied to or deployed to the second device icon.

In one embodiment, the configuration diagram may support an application icon or project icon, wherein the application icon or project icon represents one or more programs and possibly other information. For example, the application icon or project icon may also include or represent information that specifies how the various programs, help files, etc. are to be distributed among the various devices in a system. The configuration diagram may also support a system icon, wherein the system icon represents a distributed system comprising a plurality of devices (wherein each device may have its own device icon).

The user may associate (e.g., drag and drop) the configuration icon or project icon on to a system icon, wherein this causes the various programs to be distributed or deployed among the devices in the system represented by the system icon. Information represented by the application icon may be used in deploying the programs to the various devices.

FIG. 13B

FIG. 13B illustrates execution of an application. As shown, the user can select the top level program icon in the relationship or hierarchy and begin execution of the top level program, e.g., by right clicking on the top level program icon and selecting a "run" feature. Alternatively, the user can select the device icon and select a "run" feature, which causes the top level program to begin execution.

During execution, a portion of the application may execute on the main computer system 82 in step 382, and the application may invoke various programs on various devices in the distributed system in step 384. For example, the application on the main computer system 82 execution may invoke a first program that has been deployed on a remote device. The first program may execute on the device and then either invoke other devices or return control to the application on the main computer system 82. In another embodiment, the main computer system 82 may be used for configuration only, and the application may execute on various other devices.

Where two or more of the programs are configured for concurrent or parallel execution, such as on different devices, selecting the "run" option for the top level program icon and/or the device icon may cause these two or more programs to begin concurrent or parallel execution.

Installing New Programs

When a user installs a new program on the main computer system 82 or on another device in the distributed system, the new program may be automatically detected, e.g., by the main computer system 82, and a new program icon may be automatically displayed on the configuration diagram displayed on the main computer system 82 corresponding to the new program. The new program icon may be automatically displayed on the configuration diagram proximate to, and/or connected to, the device on which the program has been installed. For example, if the new program is installed on the first computer system, a new program icon may appear proximate to, and/or connected to, the first computer system device icon on the configuration diagram.

Example Configuration Dialog for Assembling a Configuration Diagram

FIG. 14 illustrates one embodiment of a configuration dialog for creating or specifying a configuration diagram. FIG. 14 illustrates a configuration dialog or user interface panel which is used for detecting or discovering devices connected within the system. As noted above, the computer system 82 may act as the central console of the distributed system, and may operate to execute software which displays the configuration diagram, as well as the configuration dialog used in configuring the configuration diagram.

The computer system 82 preferably has the ability to discover devices, e.g., other computers, smart sensors, FPGA devices, or other types of nodes or devices that are comprised and are coupled to the computer, e.g., coupled to the computer through a network. The system preferably discovers or detects devices and adds them to the configuration diagram. In one embodiment, one or more of the various devices may have the capability to report their presence and device type to the main computer system 82. For example, various smart sensors may publish their presence and device type to the main computer system 82.

In one embodiment, the system also has the ability to create virtual devices in cases where the actual device is not presently available, but the device will be present when the system executes the application being created. Thus, the user can create a virtual device for devices that are not actually present during design time. In one embodiment, a physical device may be used as a "stand in" device for a virtual device, wherein the program desired to be deployed to the virtual device instead is deployed to or executes on the "stand in" device until a physical device is installed in the system that corresponds to the virtual device. In another embodiment, a software program may be used to simulate operation of a virtual device, i.e., a physical device that is not present.

In one embodiment, as devices or nodes of interest are added to the user interface panel in FIG. 14, they appear as devices icons or computing element icons in the configuration diagram. Thus, when the main computer system 82 is started, devices which are automatically detected may immediately and automatically appear as device icons in the configuration diagram. As the user later inputs the presence of other devices to the configuration dialog, corresponding device icons may also automatically appear in the configuration diagram. When the user or other party couples a new device to the distributed system, the new device may be automatically detected, and a new device icon corresponding to the new device may be automatically displayed on the configuration diagram.

In another embodiment, more advanced wizards may be used to create the configuration diagram. In one embodiment, a configuration wizard may execute on a server 90, or on the user's system 82, where the server 90 also stores a plurality of different programs. The configuration wizard may ask the user a series of questions regarding desired operation of the system, the hardware devices the user's system contains, etc. The configuration wizard may then automatically create a configuration diagram for the user and display this configuration diagram on the user's display. The configuration wizard may also transfer the corresponding configuration data to the user's computer 82. This configuration data may be executable to automatically deploy programs on various of the user's hardware devices. Alternatively, the server 90 may automatically deploy programs on various of the user's hardware devices over a network.

In one embodiment, the configuration diagram may support a find or discovery tool. The find tool may support various filters that the user can configure with logical expressions in order to locate various devices, programs, I/O channels, data points, etc. For example, the user can enter the following "find" expressions:

Find Only FP2000 or Devices with AI
Find device that has a tag named . . .
IP starts with 130.164.*
Add all RT devices on my subnet. Etc
Find devices on building No 2
Do not show nodes on Building 1

FIG. 15—Deploying Programs and Changing Invocation Relationships

Figure 32:
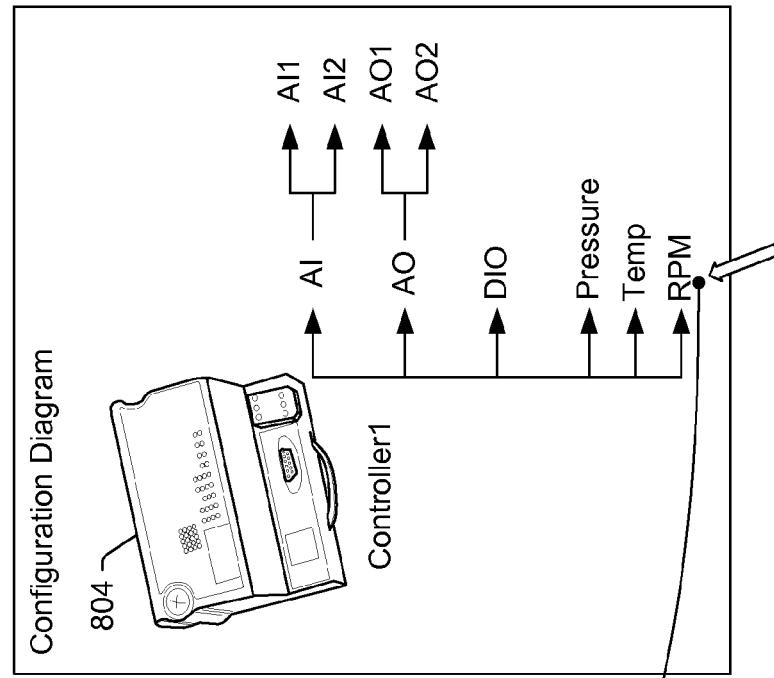
FIG. 32 illustrates operation whereby a user selects a data point element from the configuration diagram and drags and drops the data point element from the configuration diagram on to the front panel of a graphical program.
Figure 32:
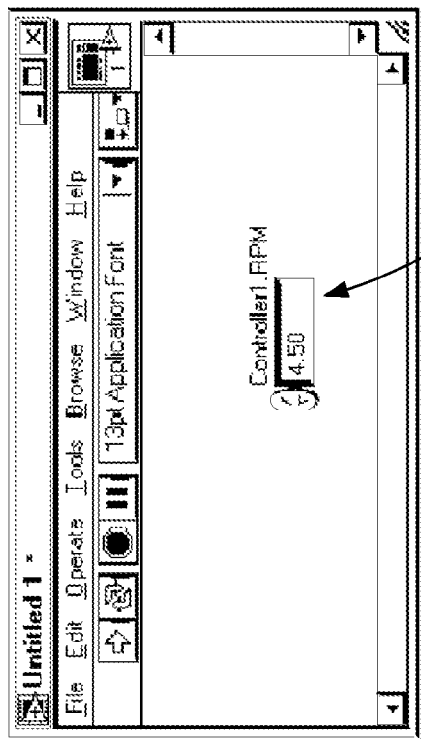

FIGS. 15-19 illustrate embodiments of how programs may be deployed using a configuration diagram. FIG. 32 illustrates an example of deployment of a program to a target device.

FIG. 15 illustrates a configuration diagram (labeled "hierarchy window") which includes a main program icon 412 and four sub-program icons 404A-404D. In this example, the user has added a computer system on the network into the configuration panel of FIG. 14 wherein the name of this computer system is "Shah". Thus, the configuration diagram appears as shown in FIG. 15 with a device icon 412 representing the computer system labeled "Shah".

As shown in FIG. 16, when the user desires to distribute an application among various devices, e.g., to deploy a program on to a device, the user can select a program icon with a pointing device, and drag and drop the icon on to a device icon. As shown in FIG. 16, the user has selected the main program icon 402 and has dragged and dropped this icon 402 on to the device icon 412. This is represented by the box outlined with dashed lines shown in FIG. 16.

When this operation is completed the main software program corresponding to the program icon 402 and all of the sub-programs within the hierarchy are copied to the destination device. Also, the program icon 402 and all of the sub-program icons 404A-D are copied to appear proximate to (e.g., under) the device icon 412. The configuration diagram then appears as shown in FIG. 17. Thus, the same application hierarchy of program icons 402 and 404A, 404B, 404C and 404D appear below the device icon 412, indicating that these programs are now deployed on the device represented by device icon 412.

As described above, in one embodiment when the user drags a program icon from the hierarchy of program icons on to a device icon, this may operate to copy the underlying program corresponding to the program icon on to the respective device. Thus, for example, the configuration window may display a hierarchy of program icons that are resident on the main computer system. If the user selects the top level program from this hierarchy and drags this top level program on to a device icon corresponding to a different device in the system, this causes the various programs corresponding to the main program and all programs below this main program in the hierarchy to be copied to the respective device. If the user selects a sub-program in the hierarchy resident on the main computer system and copies this over to a device, this causes the sub-program and all sub-programs below this sub-program in the hierarchy to be copied over to the device. Thus, when the user drags a program icon to a respective device, this causes the program corresponding to that program icon and all programs below that program icon in the hierarchy to be copied to the respective device.

In one embodiment, the user may desire to distribute parts of an application to different devices in the distributed system for distributed execution, which also effectively changes the operation of the programs contained on the original or source device (e.g., the main computer system) that are being executed. For example, assume the user desires to deploy a sub-program of a main program on to a different device for execution. In one embodiment, the user simply drags the program icon corresponding to the sub-program from the main program hierarchy on to the device icon and may further indicate a "deployment for remote execution" (such as by holding down the ALT key during the drag and drop operation). This causes the sub-program to be transferred to the device. This also causes the main program to be automatically modified to include a call of the sub-program to the target device to which the program was deployed. Thus, the high level program in the hierarchy is automatically modified to include a call to the device to call or invoke execution of this program on the remote or target device. The corresponding configuration window would appear as shown in FIG. 18, wherein the top level program in the program hierarchy has three sub-program icons 404A-404C which are resident on the main machine 82, and an icon 404D1 corresponding to the remote device in the hierarchy indicates that a call is being made to a remote device during execution.

One example of this operation is as follows. Presume an application is measuring the temperature of a tank and is performing calculations and control as well as logging data values to a non-volatile memory or disk. If the temperature sensor used in the application is connected to a different computer system or a different device (device B), then the user may desire to run the program that measures the temperature on that separate or remote device (device B). The user can accomplish this result without requiring manual modification of the application. The user can simply drag the temperature program to the different device or machine (device B). In one embodiment, the user presses the ALT key while dragging and dropping the sub-program icon on to the remote device. This causes the temperature program to be downloaded to device B. The top level application, i.e., the program immediately above this program in the program hierarchy, is preferably automatically modified to make a call to this temperature program, which is now located on device B. Also, the configuration diagram would appear as shown in FIG. 18. Here, the top level application is calling the temperature program on the machine referred to as "SHAH". It is noted that the user can easily change where this remote call is made simply by dragging the program to another device or by using a pop-up menu.

In one embodiment, the user may also change the invocation relationship between two (or more) programs by selecting a link or link icon between two programs and manipulating or changing one or both ends of the link to connect one or more different programs. The user can also draw links between program icons to configure an invocation relationship between the respective programs.

Figure 19A:
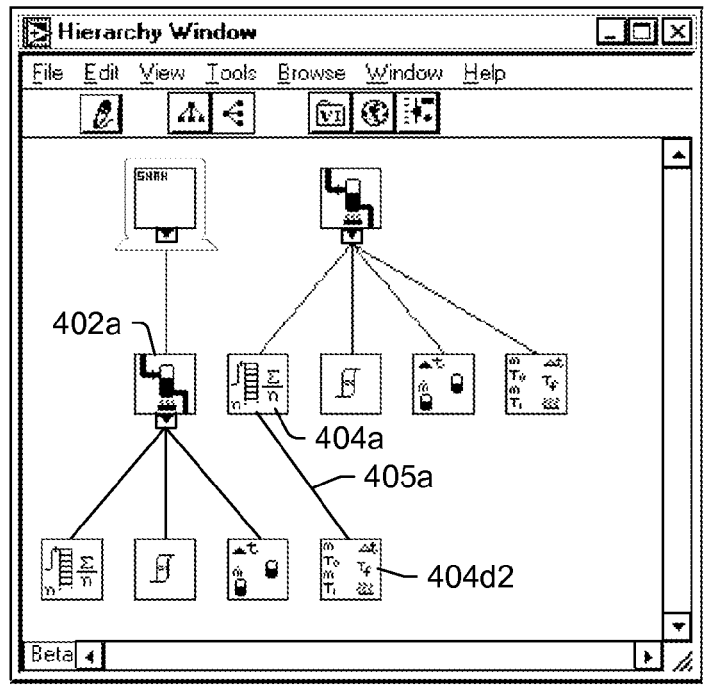

For example, FIG. 17 illustrates a program relationship view of various programs. The program relationship view shows the invocation relationship or caller/callee relationship between the programs. If the user no longer desires the program represented by program icon program 402a to invoke or call the program represented by program icon 404d2, the user can select the link icon 405 and graphically reconfigure the link icon to be drawn between program icon 404a and program icon 404d2. For example, the user may select the end of the link proximate to the program icon 402a and drag this end of the link with a pointing device over to the other program icon 404a, creating a new link 405a. After this operation, the configuration diagram would appear as shown in FIG. 19A. As shown, program icon 404a is now connected by link icon 405a to program icon 404d2, and link icon 405 between program icons 402a and 404d2 is no longer displayed. This indicates that the program represented by program icon 404a is configured to call the program represented by program icon 404d2, instead of the program represented by program icon 402a being configured to call the program represented by program icon 404d2.

Figure 19B:
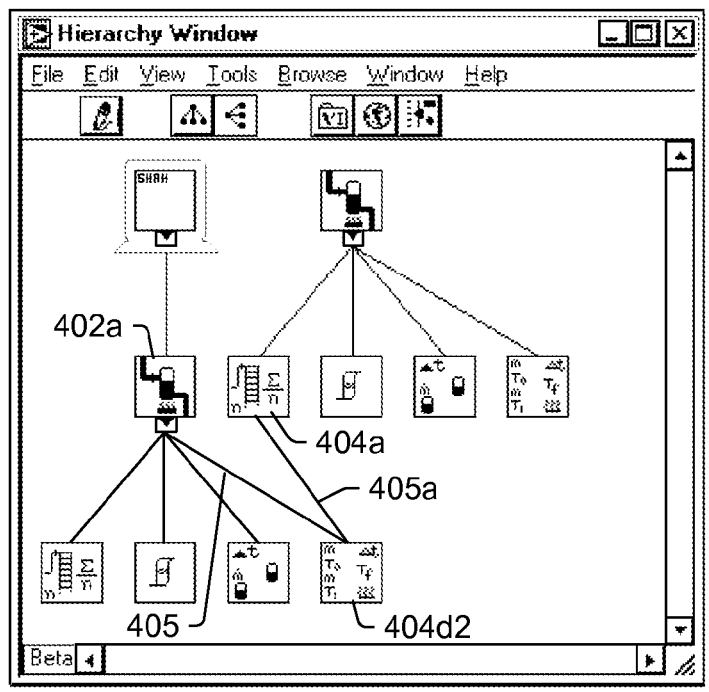

If the user had desired both programs represented by program icons 402a and 404a to call program 404d2, the user could simply draw a new link between program icon 404a and program icon 404d2. The resulting diagram would then appear as shown in FIG. 19B. As shown in FIG. 19B, links are displayed between program icons 402a and 404d2 as well as between program icons 404a and 404d2.

Use of the Configuration Diagram with Graphical Programs

Where a program icon on the configuration diagram corresponds to a graphical program, the user may perform various additional operations. Since the graphical program is itself an iconic program, the user is able to graphically specify particular locations in the graphical program or invocation to occur. For example, if the user desires to choose a specific location in the graphical program to have a call made to a remote device, this may be performed graphically within the graphical program. In other words, if the user desires to choose a particular function node in the graphical program to make a call or invoke a program on a remote device (e.g., different computer), or if the user desires to have one or more nodes or sub-programs in the graphical program execute on a remote device, this may be easily performed using the block diagram of the graphical program. The user may further incorporate device icons or program icons directly into a graphical program using the graphical association techniques described herein.

Creation of a Graphical Program

A graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicate the functionality of the program. As noted above, the graphical program may comprise a block diagram and may also include a user interface portion or front panel portion. Where the graphical program includes a user interface portion, the user may assemble the user interface on the display. As one example, the user may use the LabVIEW graphical programming development environment to create the graphical program.

Figure 22:
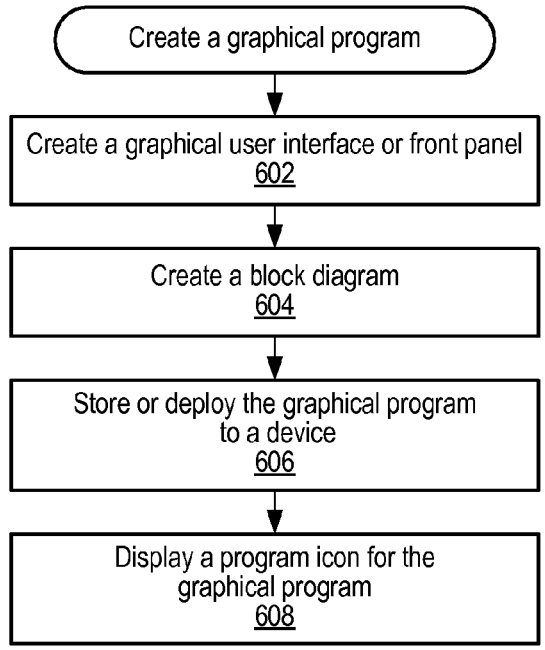
FIG. 22 is a flowchart diagram illustrating creation of a graphical program.

In an alternate embodiment, the graphical program may be created by the user creating or specifying a prototype, followed by automatic or programmatic creation of the graphical program from the prototype. This functionality is described in U.S. patent application Ser. No. 09/595,003 titled "System and Method for Automatically Generating a Graphical Program to Implement a Prototype" and U.S. patent application Ser. No. 09/587,682 titled "System and Method for Automatically Generating a Graphical Program to Perform an Image Processing Algorithm", which are both hereby incorporated by reference in their entirety as though fully and completely set forth herein. The graphical program may be created in other manners, either by the user or programmatically, as desired. The graphical program may implement a measurement function that is desired to be performed by an instrument or measurement device. The graphical program may also implement an automation function (including process control), a simulation function, or any other type of function FIG. 22—Creating the Graphical Program FIG. 22 is a flowchart diagram illustrating one embodiment of a method for creating a graphical program operable to receive and respond to user interface events. It is noted that steps in the following flowcharts may occur concurrently or in different orders than that shown.

In step 602, a graphical user interface or front panel for the graphical program may be created, e.g., in response to user input. The graphical user interface may be created in any of various ways, e.g., depending on the graphical programming development environment used.

In step 604, a block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations. The block diagram may have one or more nodes which represent sub-graphical programs (e.g., sub-VIs), and thus may be hierarchical. An exemplary block diagram is shown in FIGS. 24 and 24B.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

In step 606, the graphical program may be stored on or deployed to a device, and in step 608 a corresponding graphical program icon may appear in the configuration diagram The graphical program may then be deployed to various other device using the graphical deployment techniques described herein, or may be executed as described herein. The graphical program may be executed on any of the various devices present in the distributed system.

Figure 23:
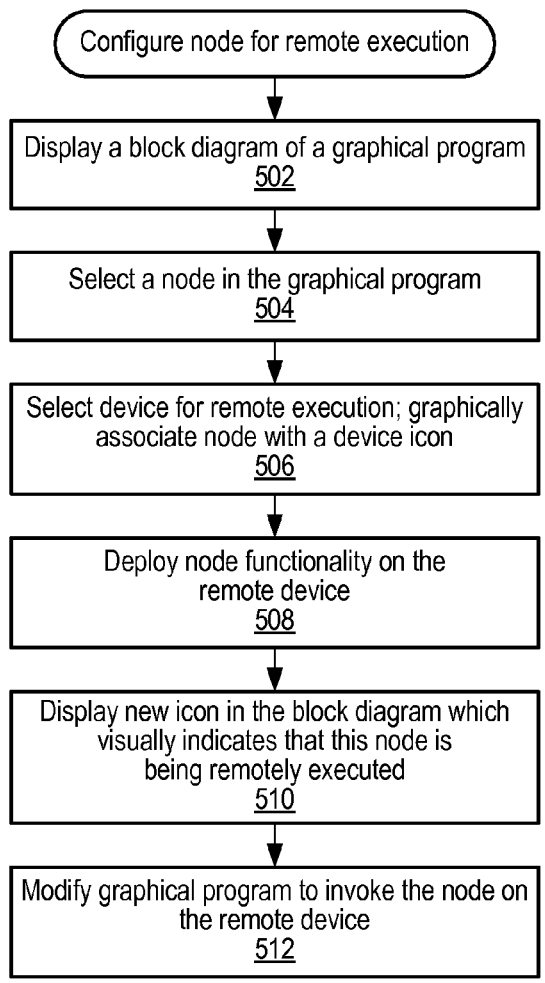
FIG. 23 is a flowchart diagram illustrating configuration of a node in a graphical program for remote execution.

FIG. 23—Configuring A Graphical Program Node for Remote Execution

FIG. 23 is a flowchart diagram illustrating one embodiment of operation of configuring a graphical program node for remote execution. The method of FIG. 23 may be used for deploying nodes of a graphical program to various different devices for remote execution.

As shown, where the program is a graphical program, such as a LabVIEW VI, the user can display the main block diagram of the graphical program (LabVIEW VI) in step 502.

In step 504 the user can select a node in the graphical program, e.g., a sub-program or sub-VI node, a primitive node, or other type of node. The user may also be able to select a group of nodes by drawing a "box" around the desired nodes. The user may select a node by using a pointing device or by other means.

In step 506 the user may then select among the various devices in the configuration diagram, e.g., other computer systems or devices on which the user desires to have this node or sub-VI execute. For example, where the graphical program is stored on a first device, the user may select a second device icon corresponding to a second device and graphically associate the node with the second device icon. The term "remote device" in this context simply means a different device than the one which currently stores the graphical program. This selection may be performed in the same manner as an association, e.g., by using drag and drop techniques, menus, dialog boxes, or speech recognition, among other methods.

Figure 24A:
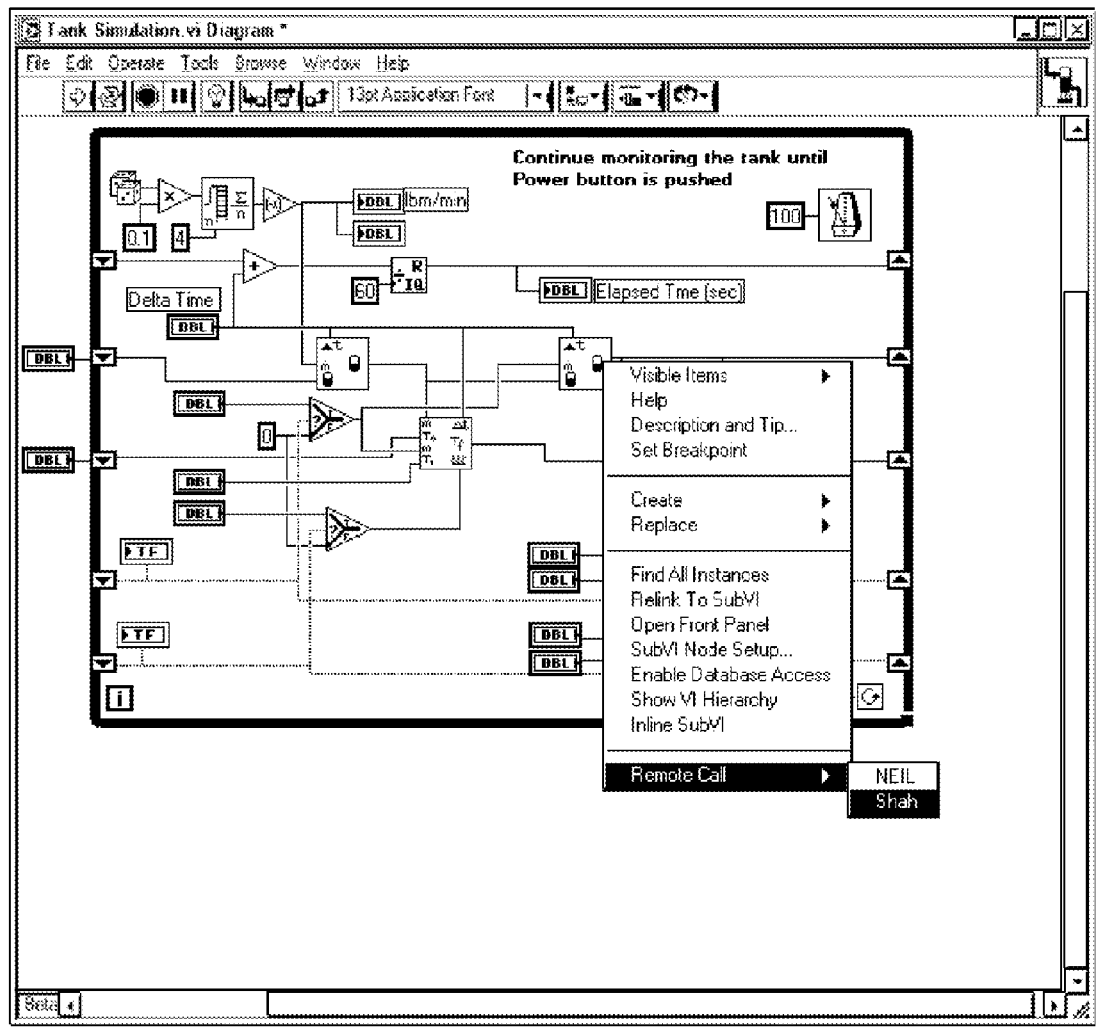
FIG. 24A illustrates an exemplary block diagram of a graphical program where the user is configuring a remote call of a node.
Figure 24B:
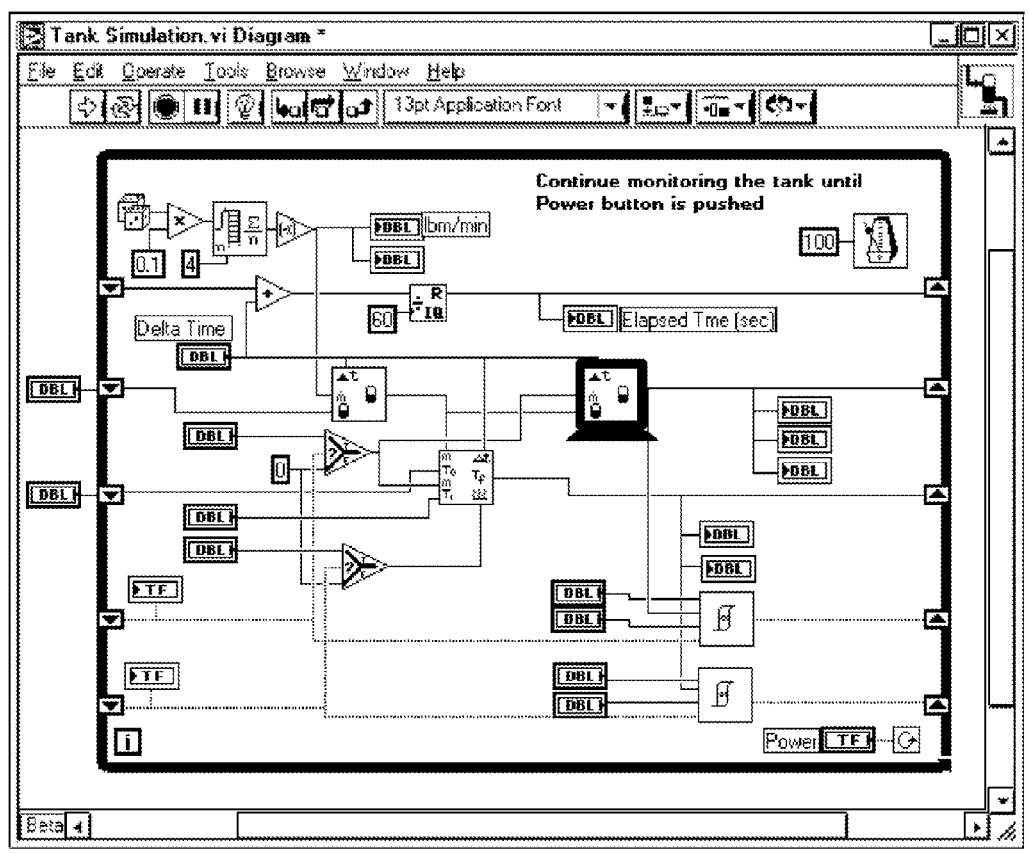
FIG. 24B illustrates the exemplary block diagram of FIG. 24A after the user has deployed the node to a remote device for remote execution.

For example, FIG. 24A illustrates a block diagram of a LabVIEW graphical program or VI wherein the user has selected a menu of a node, e.g., by right clicking on the node, and has selected a remote call feature from the menu. When the user selects the remote call feature, a list of devices may appear for the user to select. User selection of a device from this menu may cause deployment of the respective node (e.g., deployment of the functionality represented by the node icon) to the selected device. Alternatively, the user may drag and drop a graphical program node from the block diagram on to a device icon representing another device to deploy the graphical program node onto the device for remote execution. For example, the user can select one or more nodes in the graphical program and "drag and drop" them onto a device icon to deploy these nodes onto the respective remote device.

In step 508 the functionality of the node (or nodes) may be deployed to the selected remote device, i.e., the device selected in step 506. In step 508 the functionality (e.g., program instructions and/or data structures) of the node (or nodes) may be automatically transferred to the selected remote device based on the user input in step 506. In other words, each node in a graphical program may have associated program instructions and/or data structures, and these may be automatically transferred to the selected remote device. As noted above, the user input may comprise selecting a remote device in step 506 from a menu, or may comprise graphically associating or dragging and dropping the node onto a device icon of a device in the configuration diagram.

This deployment operation in step 508 may also involve determining if the device is capable of natively executing graphical programming code. If the device is not capable of executing graphical programming code, the graphical program code corresponding to this node may be converted to a DLL, hardware configuration program, or other software format.

In step 510 a new icon may be displayed in the block diagram to visually indicate to the user that this node is being remotely executed. The new icon may be a modified node icon which includes at least a portion of the appearance of the original node, as well as an additional image portion to indicate the remote execution. For example, FIG. 24B illustrates one example of the block diagram of FIG. 24A after the user has selected this feature to remotely call this graphical program node or VI on a different device. As shown, the icon in the block diagram changes its appearance to visually indicate to the user that this node or sub-program is deployed on a remote device and will execute on the remote device. In another embodiment, the icon in the block diagram does not change its appearance to visually indicate remote execution. In this embodiment, the user may optionally select a certain view of the block diagram to highlight respective nodes that are configured for remote execution.

In step 512 the graphical program may be modified to be able to invoke the node on the remote device. In other words, the graphical program may include program instructions and/or data structures, and these may be modified, e.g., new program instructions and/or data structures may be added, to invoke the node on the remote device during graphical program execution. Alternatively, the graphical program execution engine (the software that executes the graphical program) may be modified to implement this remote invocation. Graphical code in the graphical program may also be modified (or added) in the graphical program to invoke the node on the remote device. For example, one or more nodes may be added or modified in the graphical program (e.g., as described in step 510) to visually indicate that the invocation is occurring, and that the respective node is being invoked on the remote device. Added nodes may include associated program instructions and/or data structures that are executable to invoke the node on the remote device.

Thus this remote call feature can be used to cause a selected node or program, e.g., the selected sub-VI, to execute on a different device or computer system, wherein the main graphical program or main VI calls this sub-VI to execute on the remote device.

The deployment of a sub-program of a graphical program block diagram on a remote device is particularly useful where there are multiple instances of the same sub-program in the main graphical program, and the user desires to select a particular sub-program for deployment.

Therefore, the user can configure a graphical program node for remote execution. Where the program is a graphical program, such as a LabVIEW VI, the user can display the main block diagram of the graphical program. The user can select nodes in the graphical program and associate, e.g., drag and drop, these graphical program nodes to device icons in the configuration diagram. As a result, the functionality of the nodes may be deployed to the selected remote devices. This provides a very simple mechanism for a user to distribute execution of a graphical program among a plurality of different devices in a system.

In one embodiment, the user may graphically configure or deploy portions of any of various types of programs, including programs written in text-based and graphical programming languages. The method may involve displaying source code of a program on the display of the computer system. The program may be written in a text-based programming language, or may be a graphical program. The computer system display may also include a configuration diagram that displays a first device icon that corresponds to a first device and a second device icon that corresponds to a second device. The program may be stored on the first device. The user may then select a portion of the source code of the program and graphically associate the portion of the source code with the second device icon.

Where the program is written in a text-based programming language, the user may highlight the desired source code portion (e.g., highlight the C code portion, such as a subroutine) and associate, e.g., drag and drop, this code portion onto the second device icon. Thus, the user can deploy portions of the source code onto devices other than the device on which the program is stored. Where the program is written in a graphical programming language, as described above, the user may select one or more nodes in the graphical program and drag and drop them on the second device icon, e.g., or various device icons.

This graphical association may cause deployment of the source code portion onto the second device for execution on the second device. In addition, the system may modify the program to configure the program to invoke execution of the source code portion on the second device. Thus, when the program executes, the program invokes execution of the deployed source code portion on the second device.

Alternatively, where the program is written in an object-oriented programming language, and the software objects are represented by icons, the user may associate or drag and drop the various software object icons to various device icons to deploy these software objects on various devices.

Figure 25:
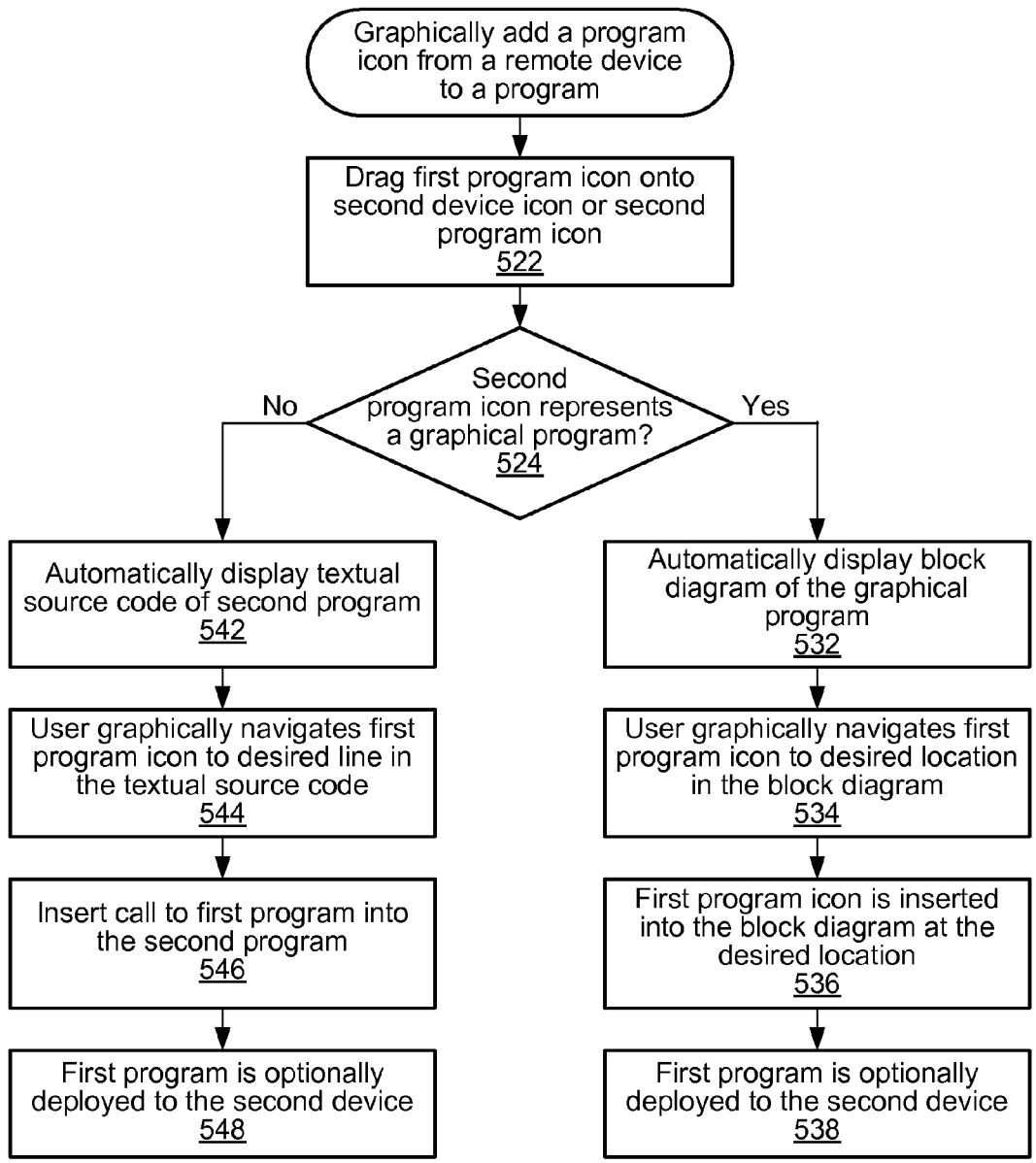
FIG. 25 is a flowchart diagram illustrating graphically incorporating a program icon from a remote device into another program.

FIG. 25—Adding Program Code to Another Program

In one embodiment, the user can manipulate program icons to add program code to other programs. For example, the user can select a first program icon or node, which may be associated with a device (e.g. a first device), and associate this first program icon with (e.g., drag and drop onto) a second program icon of a second device (or of the first device). This may cause the code (source code) of the second program (which corresponds to the second program icon) to be displayed. The user may then further graphically navigate, e.g., move or drag, the first program icon within the source code of the second program that has been displayed and drop or place the first program icon at a respective location in the source code. The first program corresponding to the first program icon may be deployed to the second device for execution within the second program on the second device. Alternatively, at the user's option, the first program may remain on the first device, and be configured for remote invocation by the second program on the second device.

FIG. 25 is a flowchart diagram illustrating one embodiment of operation of adding program code to another program.

As shown, in step 522 the user can select a first program icon or node associated with a device (e.g. a first device) and associate this first program icon with (e.g., drag and drop onto) a second program icon of a second device (or of the first device). As noted above, this association may be performed using any of the techniques described above, e.g., by using drag and drop techniques, menus, dialog boxes, or speech recognition, among other methods.

This association may cause the code (e.g., the source code) of the second program corresponding to this second program icon to automatically be displayed. The first program icon (or another node which represents the first program) may be displayed in the displayed source code of the second program to allow the user to further position the first program icon (or other node) at a desired location in the displayed source code. In one embodiment, a new node, which may represent an invocation of the first program, may be displayed in the source code. When the source code is graphical source code, the graphical program or block diagram may appear, and the program icon (or another node that is operable to invoke the respective program) may be displayed within the graphical program. When the source code is a text-language program, the text language source code may be displayed, and the first program icon may appear within the displayed text language source code.

Thus, where the second program icon corresponds to a graphical program in step 524, this association may cause the block diagram corresponding to this program icon to automatically be displayed in step 532. For example, when the user drags and drops the first program icon proximate to or onto the second program icon, the block diagram that corresponds to the second program icon may automatically appear at the location of the second program icon (or at a different location). The first program icon (or a new node) may appear in the displayed block diagram for further positioning or navigation by the user.

In step 534 the user may then further graphically navigate, e.g., move or drag, the first program icon (or "new node") within the block diagram that has been displayed and drop or place the first program icon (or "new node") at a respective location in the block diagram. Thus, where the second program icon corresponds to a graphical program, the user may graphically position the first program icon within the block diagram of the graphical program. In one embodiment, the user may select a flow path, such as a data flow wire, in which to position or "drop" the first program icon. The first program icon may then be inserted on to or in the execution or data path of the selected wire in the second block diagram of the graphical program and configured to execute. For example, when the user selects a data flow path connected between a source node and a destination node, the first program icon may be inserted as a node in the data flow path with an input terminal connected to an output terminal of the source node and with an output terminal connected to an input terminal of the destination node. The input and output terminals may be automatically created for the first program icon. Where the first program is also a graphical program, the first program icon may be inserted as a sub-VI in the second graphical program or block diagram.

Where the first program icon is dropped or inserted the path of a selected wire in the second graphical program, the method may automatically create one or more input terminals and/or one or more output terminals on the first program icon based on at least one of: parameters of the first program and parameters of the graphical program, e.g., parameters of the source and/or destination nodes to which the first program icon is being connected. The input terminals and/or output terminals may be automatically created with the appropriate data types based on the preceding and/or subsequent (source and/or destination) nodes in the block diagram to which the first program icon will connect. The method may also involve automatically (or manually) connecting at least one of the input terminals and/or output terminals of the first program icon to an existing node in the graphical program.

In step 536 positioning of the first program icon in the source code may cause additional source code, e.g., program instructions/data structures and/or one or more nodes, to be included in the second program. For example, where the second program icon corresponds to a graphical program, the first program icon may be copied or inserted into the displayed block diagram at the selected location, effectively resulting in a new node in the block diagram. This may also cause program instructions and/or data structures to be included in the second graphical program which represent functionality of the first program, or which are operable to call the first program. These program instructions and/or data structures may be associated with the first program icon in the second graphical program. Thus, the executable code associated with the first program icon may be deployed to the device on which the second graphical program is located, and the first program icon may appear in the second graphical program and be associated with the executable code. As another example, a new node may be created in the second graphical program that is operable to invoke the first program. In this instance, the first program may remain where it is and be remotely invoked.

In step 538 the first program corresponding to the first program icon may be deployed to the second device for execution with the block diagram on the second device. Alternatively, at the user's option, the first program may remain on the first device, and configured for remote invocation by the block diagram executing on the second device.

The first program icon that is being dragged and dropped into the block diagram may also be of a different type, such as a DLL or an executable program compiled from a text based programming language, etc. When the user drags and drops this first program icon into the block diagram corresponding to the second or destination program icon, and on to a respective dataflow path, a node may be automatically created in the respective dataflow path that is able to invoke or call this program. For example, if the first program is a DLL, and the user drags the first program icon on to a data flow wire of a block diagram, a node, e.g., a "DLL node" may be inserted into the block diagram that is configured to invoke the first program as a DLL. The DLL node may have the appearance of the first program icon. Alternatively, the first program may be programmatically converted into a graphical code format, e.g., LabVIEW code, and this created graphical code may execute natively in the block diagram.

Where the second program icon corresponds to a textual programming language based program in step 524, this association may cause the textual source code corresponding to this program icon to automatically be displayed in step 542.

In step 544 the user may then further graphically navigate, e.g., move or drag, the first program icon within the textual source code that has been displayed and drop or place the first program icon at a respective location in the textual source code.

In step 546 this may cause a call or invocation (e.g., a function call) to the first program to be copied or inserted into the displayed textual source code of the second program at the selected location. The type of call inserted into the displayed textual source code of the second program may depend on whether the first program is a graphical program or another type of program.

In step 548 the first program corresponding to the first program icon may be deployed to the second device for execution with the block diagram on the second device. Alternatively, at the user's option, the first program may remain on the first device, and configured for remote invocation by the textual source code program (after compilation) on the second device.

Thus the user can select a first program icon or node associated with a device and associate this first program icon with (e.g., drag and drop onto) a second program icon of a different device. Where the second program icon corresponds to a graphical program, this association may cause the block diagram corresponding to the second program icon to automatically be displayed. The user may then further graphically navigate, e.g., move or drag, the first program icon within the block diagram that has been displayed and drop or place the first program icon at a respective location in the graphical program.

This may cause different things to happen:

- In response to the association, the first program icon may be copied or inserted into the displayed block diagram at the selected location. The first program corresponding to the first program icon may be deployed from the first device onto the second device for execution on the second device with the block diagram
- In response to the association, the first program may remain on the first device and be configured for remote invocation by the block diagram on the second device. For example, the user can drag and drop other program icons onto a node icon in the graphical program to specify that the respective programs are invoked by the graphical program, e.g., by a specific node in the graphical program.
- If the user drags and drops the first program icon onto a second program icon that corresponds to a graphical program, then that first program icon may be inserted at the appropriate location in the destination graphical program as a graphical program node, or a sub-program or "sub-VI". For example, the block diagram of the destination graphical program may appear and the user may then select a flow path, such as a data flow wire, in which to "drop" the first program icon. The first graphical program may then be inserted on to or in the execution or data path of the selected wire in the second block diagram of the graphical program and configured to execute. If the first program icon which is being associated (e.g., dragged and dropped) also corresponds to a graphical program, then the first program icon may be inserted as a sub-VI.
- The first program icon that is being dragged and dropped into the source code, e.g., block diagram, may also be of a different type, such as a DLL or an executable program compiled from a text based programming language, etc. When the user drags and drops this first program icon into the block diagram corresponding to the destination program icon, and optionally on to a respective dataflow path, a node may be automatically created, e.g., in the respective dataflow path, that is able to invoke or call this program, or that represents execution of this program. For example, if the first program is a DLL, and the user drags the first program icon on to a data flow wire of a block diagram, a "DLL node" may be inserted into the block diagram that is configured to invoke the first program as a DLL. Alternatively, the first program may be programmatically converted into a graphical code format, e.g., LabVIEW code.
- Where the second program icon corresponds to a textual programming language based program, this association may cause the textual source code corresponding to this program icon to automatically be displayed. The user may then further graphically navigate, e.g., move or drag, the first program icon within the textual source code that has been displayed and drop or place the first program icon at a respective location in the textual source code. This may cause a call or invocation (e.g., a function call or method invocation) to the first program to be copied or inserted into the displayed textual source code of the second program at the selected location. The type of call inserted into the displayed textual source code of the second program may depend on whether the first program is a graphical program or another type of program.

Figure 26:
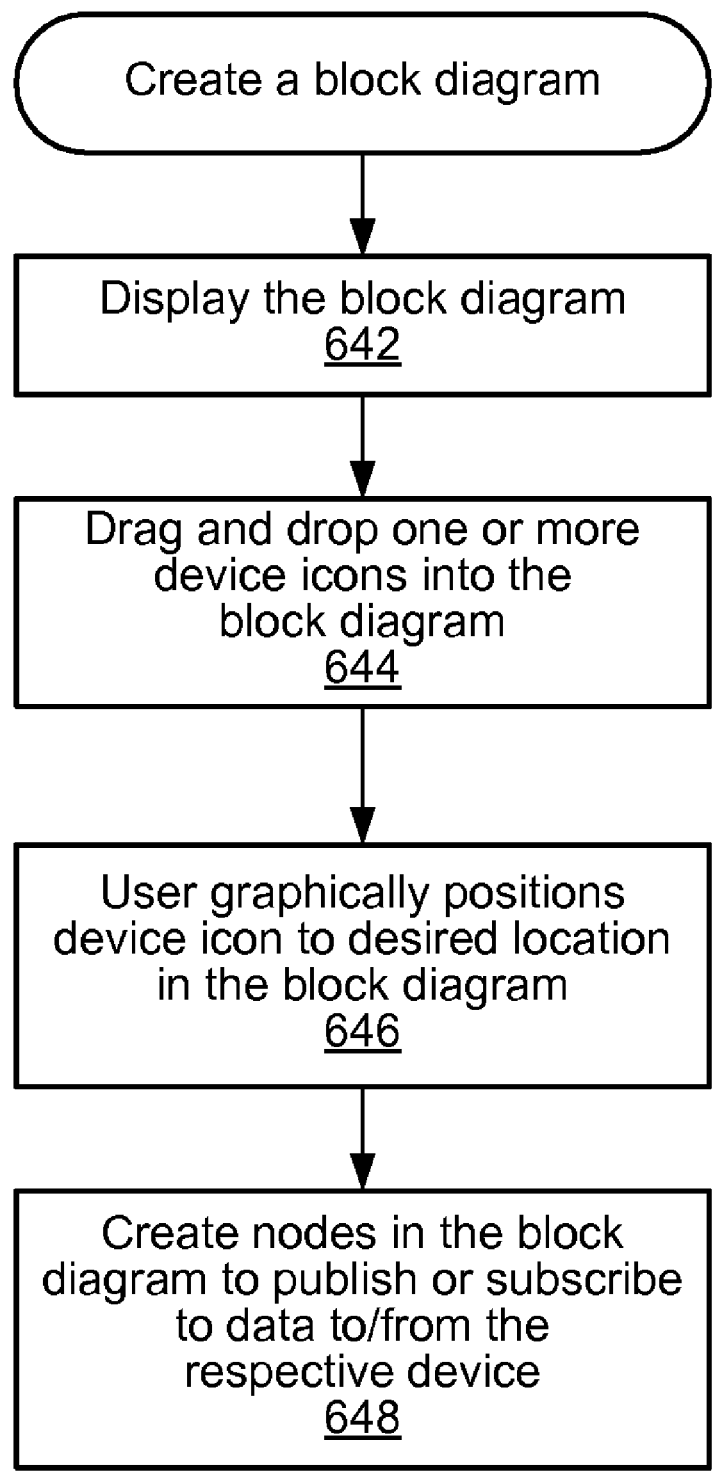
FIG. 26 is a flowchart diagram illustrating creation of a graphical program which includes incorporation of device icons into the graphical program.

FIG. 26—Incorporating a Device Icon into a Program

As mentioned above, the user may associate (e.g., drag and drop) a device icon into the source code of a program, similar to dragging and dropping a program icon into the source code of a program as described above. The device may correspond to a first device, and the program may be stored on a second different device. The following describes this operation where the program or source code is a graphical program or block diagram. However, the description below also applies where the program or source code is written in a textual programming language.

After the association of a device icon with (or into) a block diagram or graphical program, the user may then optionally indicate an operation that is desired with respect to this device in the block diagram. For example, the user may drag and drop a device icon of a first device into a block diagram, wherein this indicates that the block diagram should create code and/or data structures, and/or should include a node icon in the diagram, which operates to programmatically access this device to publish and/or subscribe data to/from the device. Other types of operations are also contemplated.

FIG. 26 is a flowchart illustrating operation of creating or modifying a graphical program by associating device nodes with the graphical program. For example, the user may use a configuration diagram as described herein to aid in creating (or configuring) a portion or all of a graphical program.

As shown, in step 642 the graphical program may be displayed on the display. For example, where the graphical program includes a block diagram, the block diagram may be displayed. The user may have previously included various nodes or icons in the graphical program and may have connected various ones of these nodes.

As described above, the block diagram may automatically be displayed in response to an association performed by the user in step 644. In other words, the user may drag and drop a device icon onto a program icon in the configuration diagram. Where the program icon represents a graphical program, this may cause the block diagram corresponding to the program icon to be automatically displayed. The device icon may then automatically appear in the block diagram for further navigation or positioning by the user.

In step 644 the user may associate (e.g., drag and drop) one or more device icons into the block diagram. For example, the user may associate, e.g., drag and drop a first device icon corresponding to a first device into the block diagram of a graphical program stored on a second device. Where the block diagram is already displayed, this may comprise the user simply selecting a device icon with a mouse and dragging the device icon into the displayed block diagram. As described above, where the block diagram is not already displayed, and a program icon is displayed on the configuration diagram that represents the graphical program or block diagram, the user can select the device icon with a mouse and drag the device icon proximate to or onto the program icon (or use other graphical association techniques). This may cause the graphical program or block diagram corresponding to this program icon to be displayed, with the device icon displayed in the graphical program or block diagram for further graphical positioning by the user. This may instead cause a "new node", such as a "device access node" to be displayed in the block diagram, wherein this "new node" may be graphically positioned by the user.

In step 646 the user may graphically position the device icon to a desired location in the block diagram. For example, in step 646 the user may then further graphically navigate, e.g., move or drag, the device icon (or "new node") within the block diagram that has been displayed and drop or place the device icon (or "new node") at a respective location in the block diagram. Thus, where the program icon corresponds to a graphical program, the user may graphically position the device icon (or new node) within the block diagram of the graphical program. In one embodiment, the user may select a flow path, such as a data flow wire, in which to position or "drop" the device icon (or new node). The device icon (or new node) may then be inserted on to or in the execution or data path of the selected wire in the second block diagram of the graphical program and configured to execute. For example, when the user selects a data flow path connected between a source node and a destination node, the device icon may be inserted as a node in the data flow path with an input terminal connected to an output terminal of the source node and with an output terminal connected to an input terminal of the destination node. The input and output terminals may be automatically created for the device icon.

In step 648 the actions performed by the user in steps 644 and 646 may cause the automatic creation of nodes in the block diagram to publish and/or subscribe to data from the respective device(s), or perform other functions associated with the devices. Automatic creation of a node in the block diagram may comprise displaying the device icon in the block diagram, and automatically creating program instructions and/or data structures associated with the device icon which perform functionality associated with the device, such as accessing (reading and/or writing data values from/to the device). Automatic creation of a node in the block diagram may also comprise displaying a new node (e.g., "a device access node"), and creating or including program instructions and/or data structures associated with the new node, that is operable to access the device during graphical program execution. Where the new node has the appearance of the device icon, then the above two operations may be similar.

Thus the automatic creation of node(s) in the block diagram may comprise automatic creation of program instructions and/or data structure which perform functionality of the node(s). For example, the device icon may appear in the block diagram, and underlying code or data structures may be created that correspond to the device icon which operate to publish and/or subscribe to data from the respective device(s), or perform other functions associated with the devices.

As one example, the user may configure a measurement application by inserting a loop structure, such as a While loop, into a block diagram. The user may then drag and drop one or more device icons into the While loop. The device icons may correspond to various devices which produce data, such as sensor or transducer devices, or instrument devices. As described above, when a user associates (e.g., drags) a device icon on to a program icon, and the program icon corresponds to a graphical program, this may cause the block diagram of the graphical program to automatically appear in the display, whereby the user can then further navigate the device icon at an appropriate location in the block diagram. Alternatively, if the block diagram window of the graphical program is already open on the display, such as in a separate window, the user may simply drag and drop a device icon from the configuration diagram onto the graphical program block diagram.

When the device icon(s) corresponding to the sensors or instruments are dropped into the While loop of the block diagram, code and/or graphical program data structures may be created with respect to the block diagram that are operable to access these devices, or use these devices in some way. The device icons which are dragged and dropped into the block diagram may retain the same appearance, i.e., as device icons contained in the block diagram. Alternatively, this may cause new nodes to be programmatically created in the diagram which are operable to access these devices and obtain the data.

After this operation, the device icons (or other nodes) may appear within the block diagram, indicating that data is being accessed from (or other functions are being performed with respect to) these devices. A further visual indication may also be provided as to whether these devices are publishing data to the diagram or subscribing to data from the diagram, i.e., whether the diagram is subscribing to data from these devices, or publishing data to these devices. The While loop may indicate repetitive operation of the device icon(s) in reading and/or writing data from/to the respective device(s).

FIGS. 27A-E—Example of Incorporating a Device Icon into a Program

FIGS. 27A-E are screen shots illustrating a sequence where the user drags a device icon onto a particular program icon, and inserts the device icon into the program represented by the program icon. The example described in FIGS. 27A-E applies whether the user is incorporating a device icon or a program icon into the program. In other words, although FIGS. 27A-E are described in the context of the user dragging a device icon into the source code of a program, this example operates a similar manner (and in one embodiment in an identical manner) when the user drags a program icon into the source code of a program.

Figure 27A:
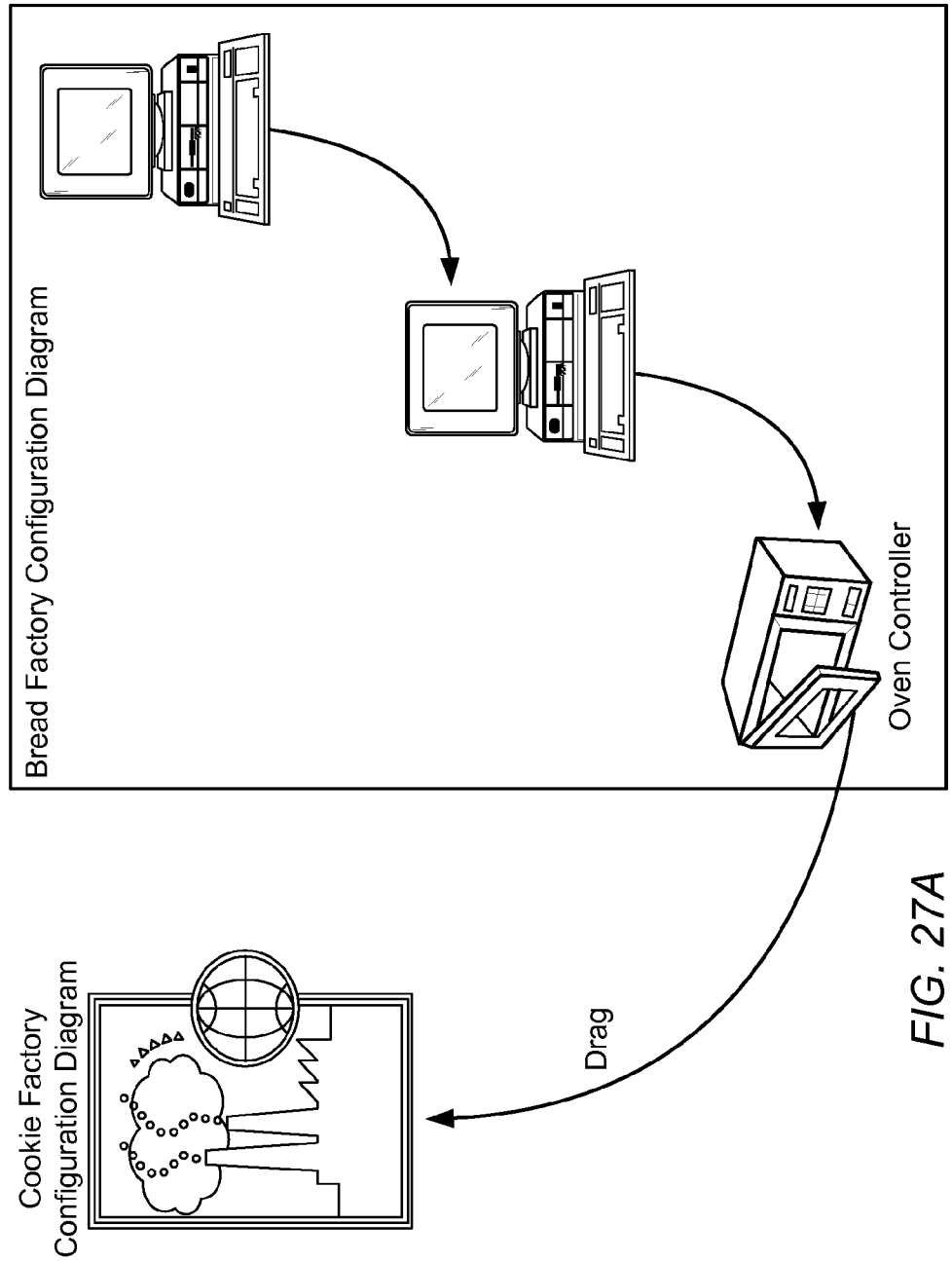
FIGS. 27A-E are screen shots illustrating a sequence where the user drags a device icon onto another configuration diagram, selects a particular device icon in the configuration diagram, selects a particular program icon, and inserts the device icon into the program represented by the program icon.
Figure 27B:
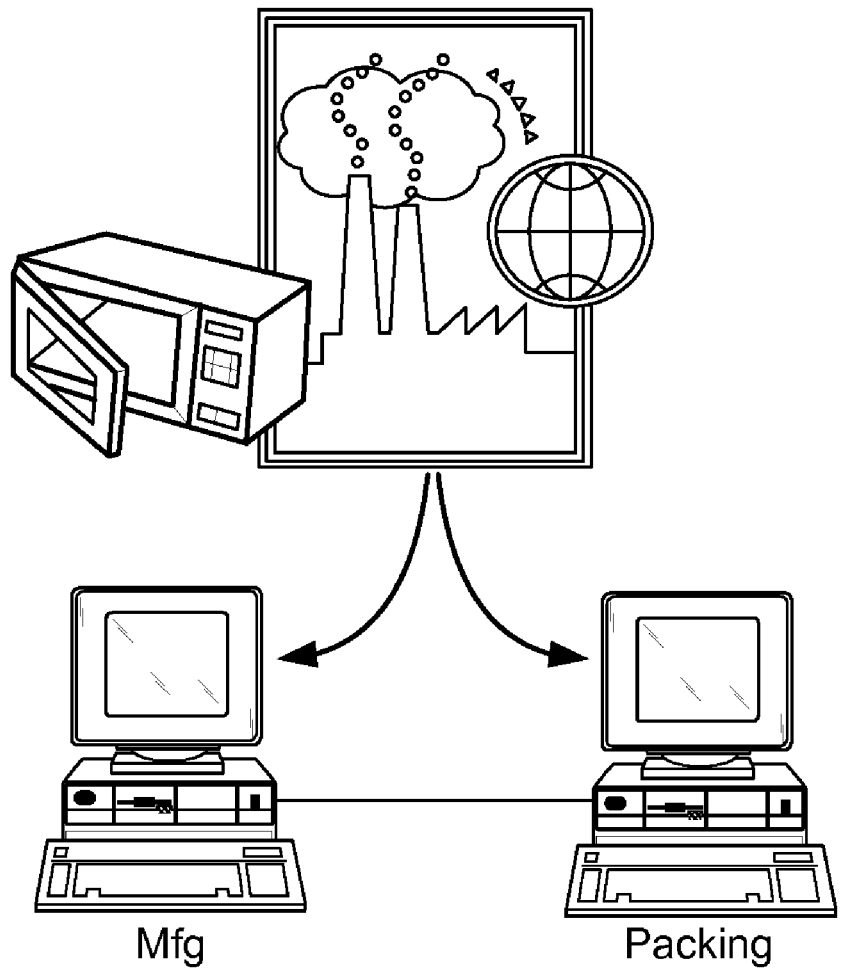

As shown, FIG. 27A illustrates a first configuration diagram ("bread factory configuration diagram") which includes two computer system device icons and an oven controller device icon. The user can associate or drag-and-drop the oven controller device icon onto a configuration diagram icon, another device icon, a program icon, or other icon present in the configuration diagram. As shown in FIG. 27A, the user associates or drags-and-drops the oven controller device icon onto a configuration diagram icon, i.e., an icon that represents a second configuration diagram. In FIG. 27A, the second configuration diagram is referred to as the "cookie factory configuration diagram".

When the user associates or drags and drops the oven controller device icon on the cookie factory configuration diagram, the cookie factory configuration diagram may be automatically expanded to show one or more device icons comprised in the configuration diagram. In the screen shot of FIG. 27B, the cookie factory configuration diagram has been expanded to show two device icons representing computer systems that perform manufacturing and packing. These two computer system device icons may be connected by a link, as shown.

Figure 27C:
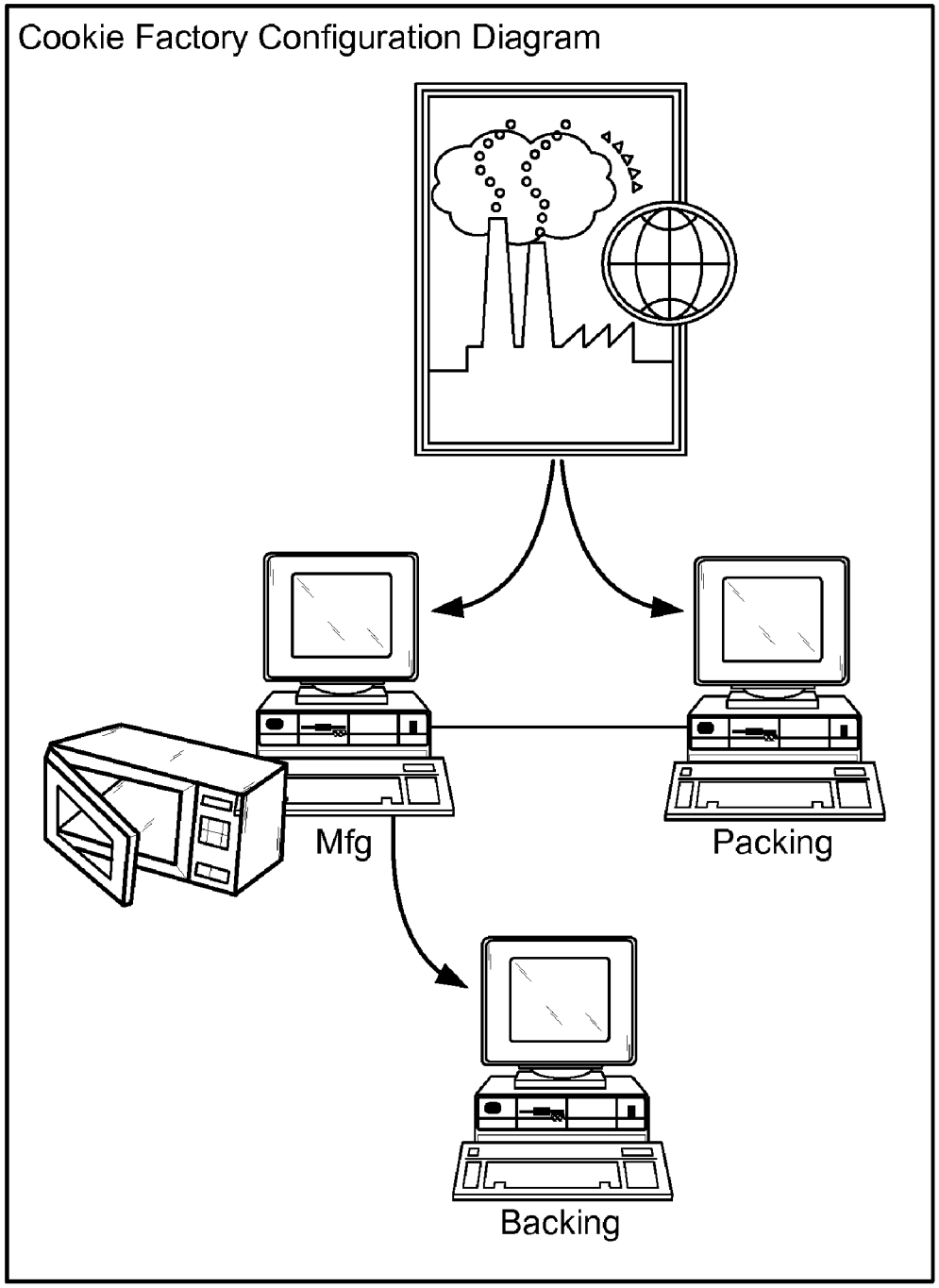

As shown in FIG. 27C, the user may further choose to expand the manufacturing computer device icon to reveal another device icon referred to as "Backing". For example, the manufacturing device icon may be expanded in a hierarchical fashion to reveal devices that perform manufacturing functionality. Alternatively, all device icons present in the configuration diagram may be automatically displayed when the configuration diagram is initially expanded in FIG. 27B.

Figure 27D:
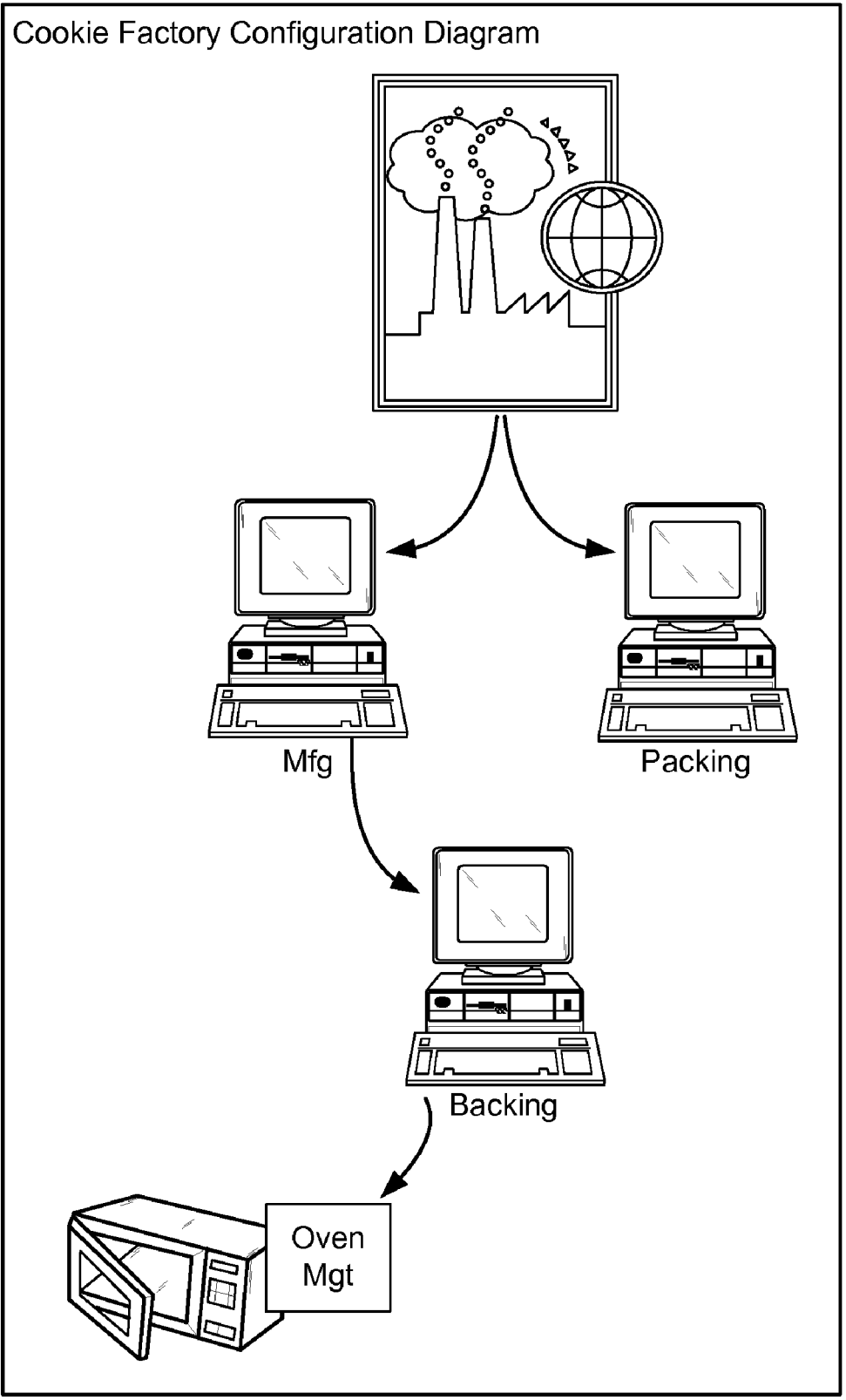

As shown in FIG. 27D, the user may then choose to view one or more program icons present in the device icon. As shown, a program icon related to oven management ("Oven Mgt") has been displayed. In one embodiment, when the user positions the oven controller device icon over the final device icon in the hierarchy (i.e., there are no further device icons in the hierarchy, the top level (or all) program icons may be automatically displayed.

Figure 27E:
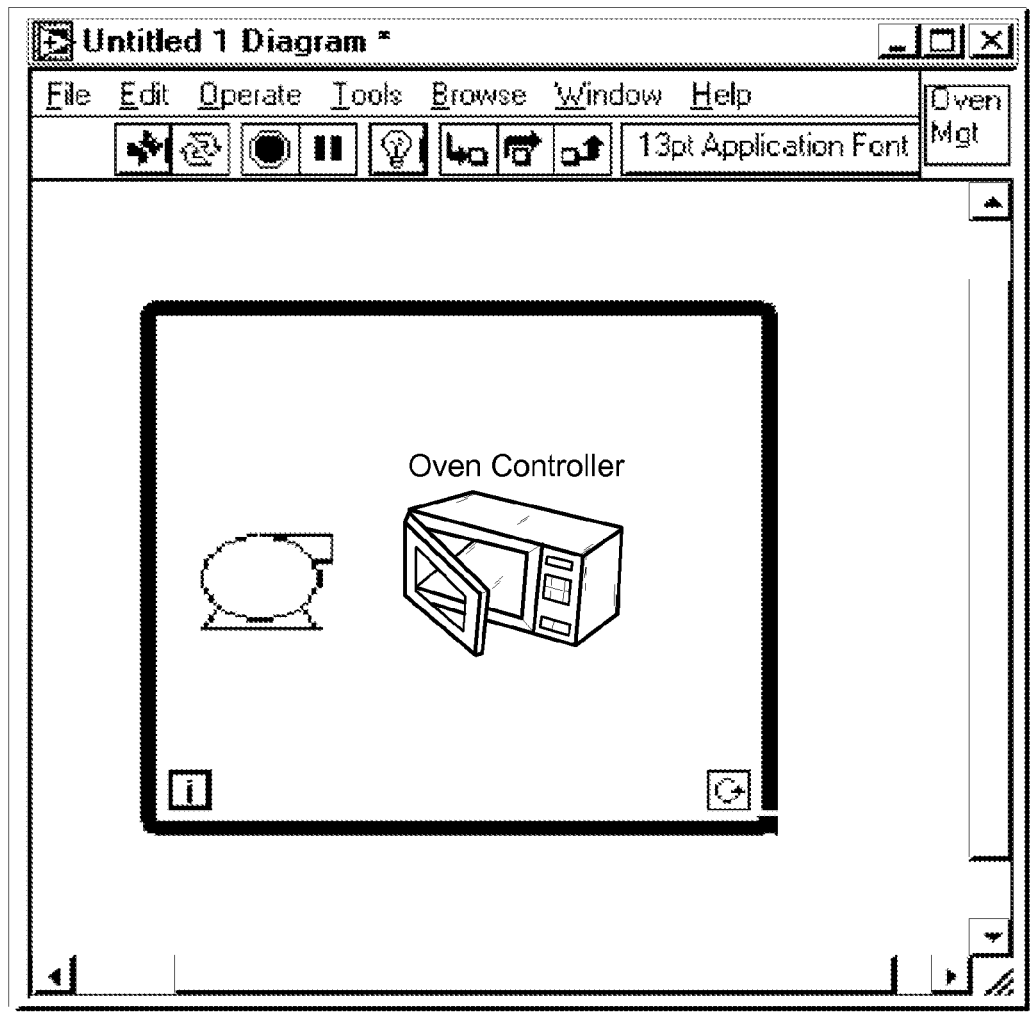

The user may then select an option to view the program represented by this program icon. In one embodiment, when the user positions a device icon, such as the oven controller device icon, over the respective program icon, the program (source code and/or user interface of the program) may be automatically displayed. Alternatively, when the user positions the oven controller device icon over the respective program icon, the user may provide further input to view one or more aspects of the program (source code and/or user interface of the program). In this exemplary embodiment, the program is a graphical program, and a graphical program block diagram is displayed as shown in FIG. 27E. FIG. 27E illustrates a very simple and exemplary graphical block diagram which includes a loop structure and includes a single existing icon or node. The graphical program may have a larger number of interconnected nodes, such as those shown in FIGS. 24A and 24B.

In one embodiment, when the user associates a device icon with a program icon corresponding to a graphical program, and the diagram portion of the graphical program is displayed, the device icon appears in the diagram portion. In another embodiment, when the user associates a device icon with a program icon corresponding to the graphical program, and the diagram portion of the graphical program is displayed, a new graphical program node appears in the diagram portion. This new graphical program node corresponds to the respective device and may represent functionality performed by the device. This graphical program node may have the same or a different appearance than the device icon to which it corresponds. The graphical program node may be programmatically created based on information in the device icon, or may be a generic device access node for accessing a device.

Although not shown in FIG. 27E, the user may then choose to navigate or move the device icon or graphical program node within the graphical block diagram. For example, the user can position the device icon at a certain location in the diagram, which indicates a certain type of operation. As another example, the user can "wire up" the device icon (or the created graphical program node) with other nodes or icons already present in the block diagram. In this operation, the graphical program may automatically create terminals on the device icon (or on the created graphical program node), possibly based on the terminals of the existing nodes in the block diagram to which the user is connecting the device icon.

As another example, the user can navigate or move the device icon or node onto an existing wire or connection path and place the device icon or node as a graphical program node in this connection path. For example, the user can navigate or position the device icon or node to a first location on a wire in the graphical program after a first node in the graphical program. The method may then display the device icon or node as a node connected to an output of the first node in the graphical program. The user can also navigate or position the device icon to a first location on a wire in the graphical program before a second node in the graphical program. The method may then display the device icon or node as a node in the graphical program connected to provide an output to the second node in the graphical program. As another example, the user can navigate or position the device icon or node to a wire or connection path in the diagram between a first node and a second node, and cause the device icon to appear in the diagram as a node connected in the connection path between the first node and the second node.

The device icon, or a node that represents the device icon, may have various functionality. For example, the node may invoke functionality of the device represented by the device icon, simulate operation of the device, invoke programs on the device, acquire data from the device, generate data to the device, etc. In one embodiment, a GUI element may appear, such as a menu, and the user can select the functionality desired.

As described above, the method may programmatically create a node in the diagram which performs an operation associated with the device icon. In one embodiment, the device icon is automatically modified, or a new node is automatically created, which includes one or more input terminals and/or one or more output terminals for connection to other nodes in the diagram. The input terminals and/or output terminals may be created based on parameters of the respective graphical program (or nodes in the graphical program) or of the device corresponding to the device icon. The user may then connect these terminals to other nodes in the diagram. The respective terminals may also be programmatically connected to other nodes in the diagram. Alternatively, the user may manually configure terminals for the node, e.g., configure a connector pane for the node. Type propagation checking may also be performed to ensure that incompatible data types are not connected to/from this node.

Therefore, this embodiment of the present invention allows the user to associate or drag and drop a device icon onto a respective program icon. The user can associate a device icon directly onto a respective program icon that is currently displayed, or the user can navigate through a configuration diagram/device icon/program icon hierarchy to view a desired program icon. The source code of the program may be displayed, and the user can position the device icon in the source code. If the respective program icon corresponds to a graphical program, the diagram portion of the graphical program may be displayed, with the respective device icon (or a node corresponding to the device icon) displayed in the graphical program diagram. The user may then navigate or move the device icon (or node) to a desired location in the graphical program, and optionally wire up or connect the device icon with other nodes in the graphical program, etc.

The method described above may also operate where the program represented by the program icon is a text based program. For example, when the user associates or drags and drops a device icon onto a program icon that represents a text based program, the text based source code of the program may be displayed. The user may then be able to navigate the device icon into a particular location into the textual source code. This may cause a function call or other appropriate textual source code to be inserted at this location in the textual source code.

In another embodiment, when the user associated or drags and drops a device icon onto a program icon, the user interface (e.g., front panel) of the program may appear. In one embodiment, the user has the choice of having either the source code or diagram portion of the program appear, or the user interface or front panel of the program to appear, or both. Alternatively, the user may open the user interface or front panel of the program and then drag and drop the device icon directly to the user interface. The user may navigate the device icon (or node) to an appropriate location in the user interface. The operation of associating a device icon with a user interface may cause a GUI element (e.g., a control or indicator) to appear in the user interface. This operation may also cause a "binding" to occur between the GUI element and data generated by and/or acquired by the respective device.

The above operations greatly facilitate the creation of graphical programs and the distribution of portions of these graphical programs to different devices in a distributed system. For example, the user can create a graphical program in various manners and then during or after the graphical program creation the user can associate (e.g., drag and drop) icons from within the block diagram to different devices to deploy or distribute the functionality represented by these node icons in the diagram on to these respective devices. Also, the user can associate device icons into a graphical program, or can associate other program icons for various devices into the graphical program.

These techniques provide a simple and convenient way for a user to create an application using a graphical program, whereby the user can deploy different programs of the graphical program application to different devices, or incorporate functionality associated with other devices or programs using device icons or program icons, respectively.

Figure 28A:
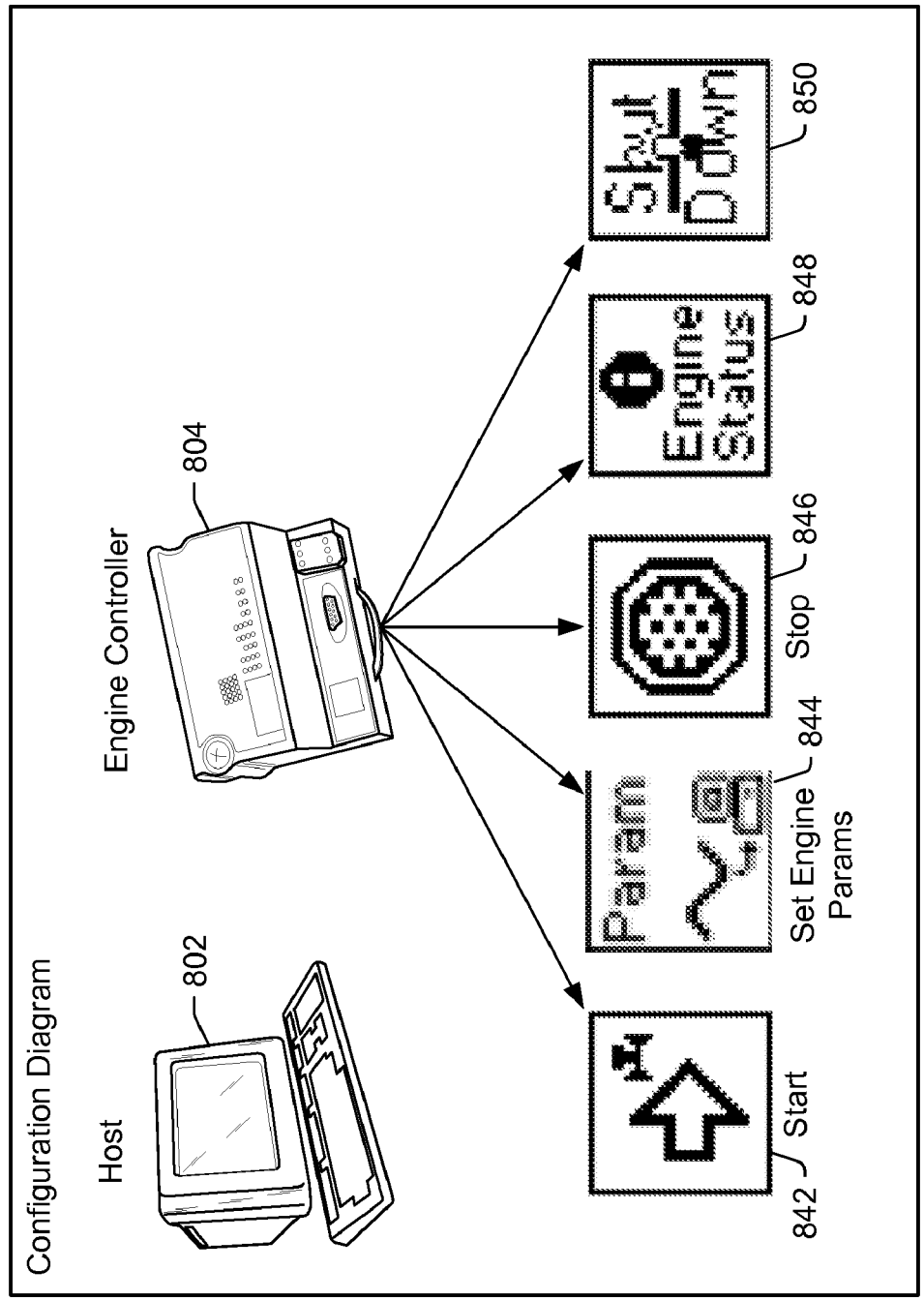
FIGS. 28A and 28B are screen shots illustrating incorporating a program icon from a configuration diagram into a graphical program.
Figure 28B:
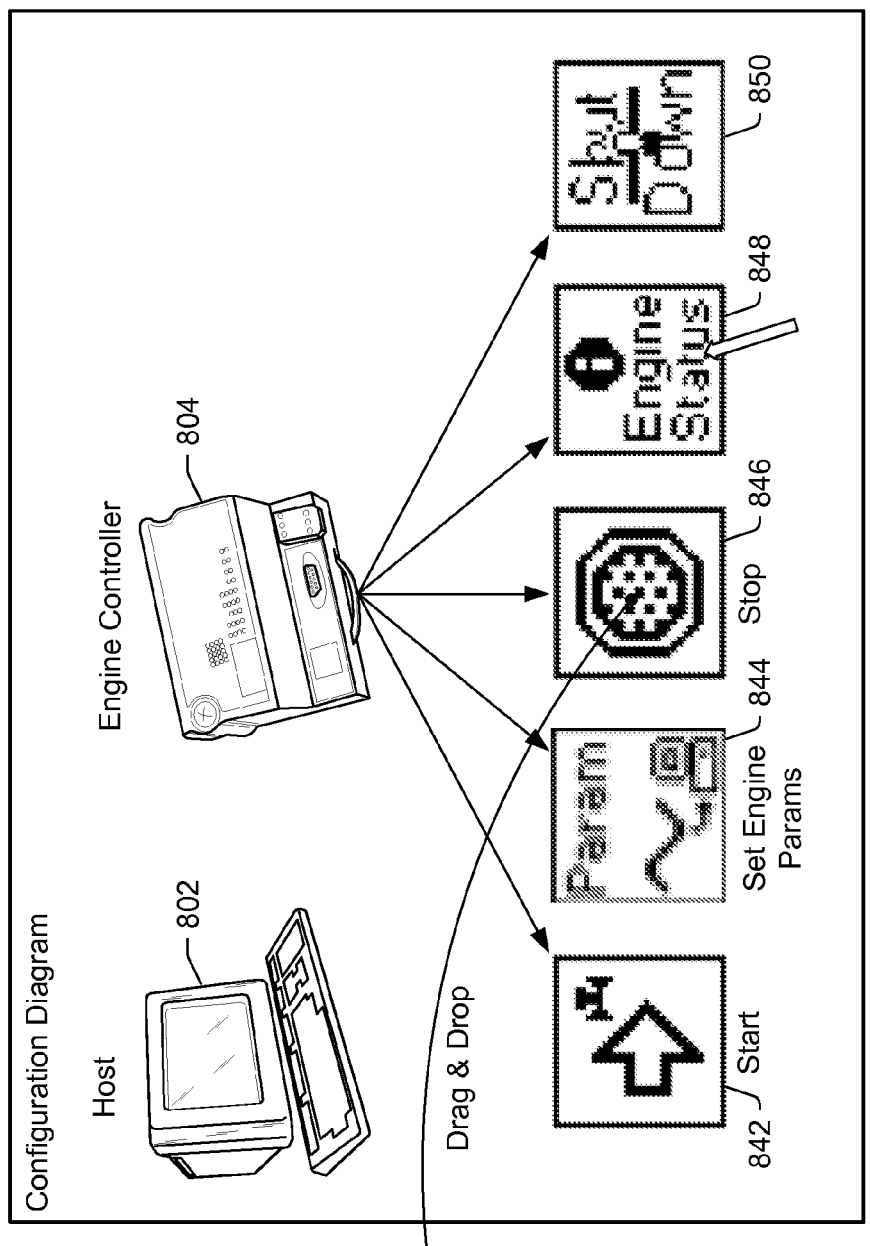
Figure 28B:
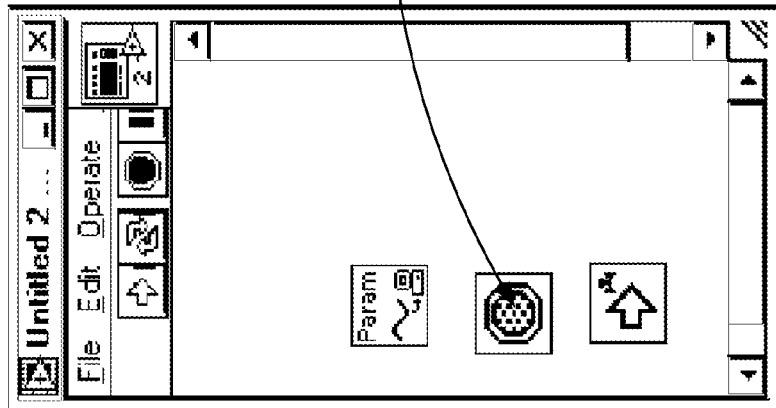

FIGS. 28A and 28B

FIGS. 28A and 28B are screen shots illustrating incorporating a program icon from a configuration diagram into a graphical program. FIG. 28A illustrates a configuration diagram which includes a device icon 802 that represents a host computer, and a device icon 804 that represents a measurement or control device, in this case a Fieldpoint device (referred to as "Engine Controller") from National Instruments Corporation. The device icon 804 includes a number of associated program icons 842-850. In this example the program icons are service icons 842-850. The service icons 842-850 include a Start icon 842 for starting the application program, a Set Engine Params icon 844 for modifying or viewing parameters of the application or device, a Stop icon 846 for stopping the application, an Engine Status icon 848 for checking the status of the application or device and a Shut Down icon 850 for shutting down the application or device. Service icons represent a high level mechanism for interacting with an application or a device, and are described further below.

FIG. 28B illustrates an example where the user associates or drags and drops a program icon (e.g., program icon 846) onto a block diagram of a graphical program. In one embodiment, the program icon 846 may be dragged and dropped into the block diagram, and the program icon does not change its appearance during this operation. In another embodiment, when the program icon 846 crosses the border of the block diagram window during the drag and drop operation, the program icon 846 may change its appearance, or a new node icon may be displayed in its place.

Once the program icon has been "dragged" or positioned in the block diagram, the user can then wire up this program icon 846 with other nodes in the graphical program. Alternatively, the user can drop or place this program icon 846 onto a wire or link in the graphical program. This may cause the program icon 846 to appear as a node in the graphical program connected in the path of this wire or link. In one embodiment, terminals may be automatically added to the program icon, wherein the wire or link connects to these terminals. Thus the program icon may be configured to connect to one or more other nodes in the graphical program.

Configuring a Device Icon in a Configuration Diagram

Figure 29:
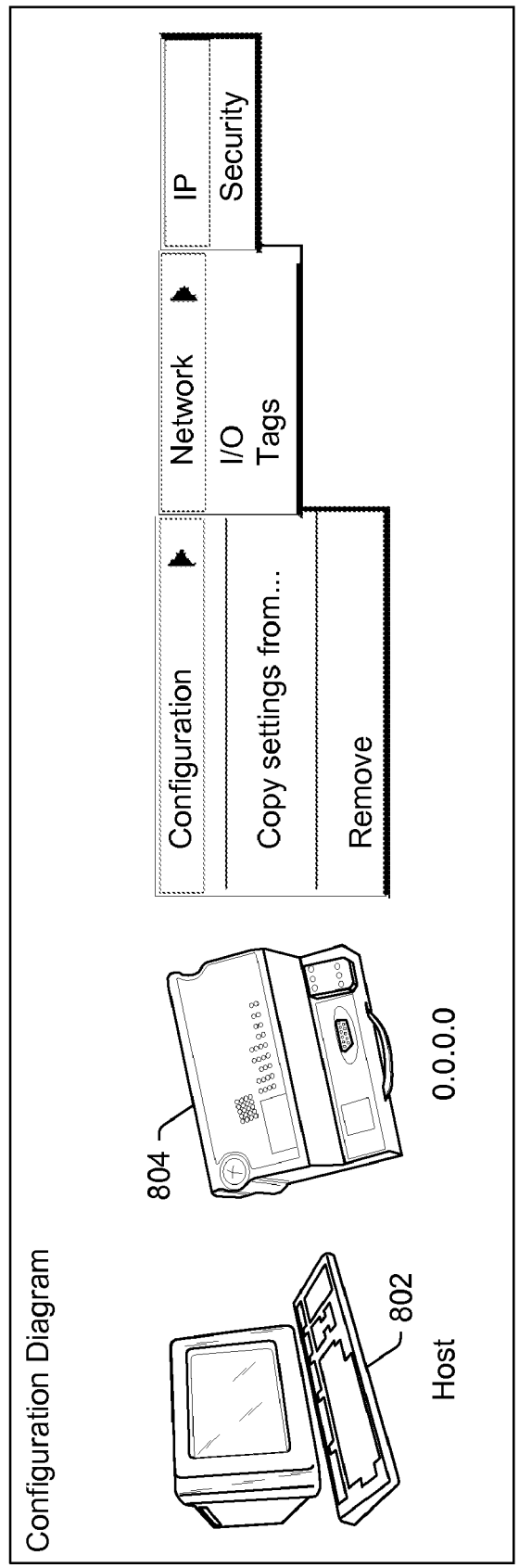
FIG. 29 illustrates a simple configuration diagram where the user has selected a device icon to configure the device.

FIG. 29 illustrates a simple configuration diagram or system panel. As shown, this exemplary configuration diagram includes a device icon 802 which represents a host computer, and a device icon 804 which represents a measurement or control device. In this example, the device icon 804 represents a Fieldpoint device from National Instruments, which may be used for measurement or control applications. As shown, the user can select the device icon 804 representing the Fieldpoint device, upon which one or more menus may be displayed. The user can select various options from these menus.

As shown, the user can select the configuration option on a first menu. This selection produces a second menu that has items for network, I/O, and data points, e.g., tags. As used herein, the term "data point" includes a data point, I/O point, data tag, I/O channel data values, and other types of data values. The data point may be associated with or generated by a device, or may be calculated by a program. When the user selects the network option, the user may receive further options for configuring the IP address of the device, or a security aspect of the device.

Figure 30:
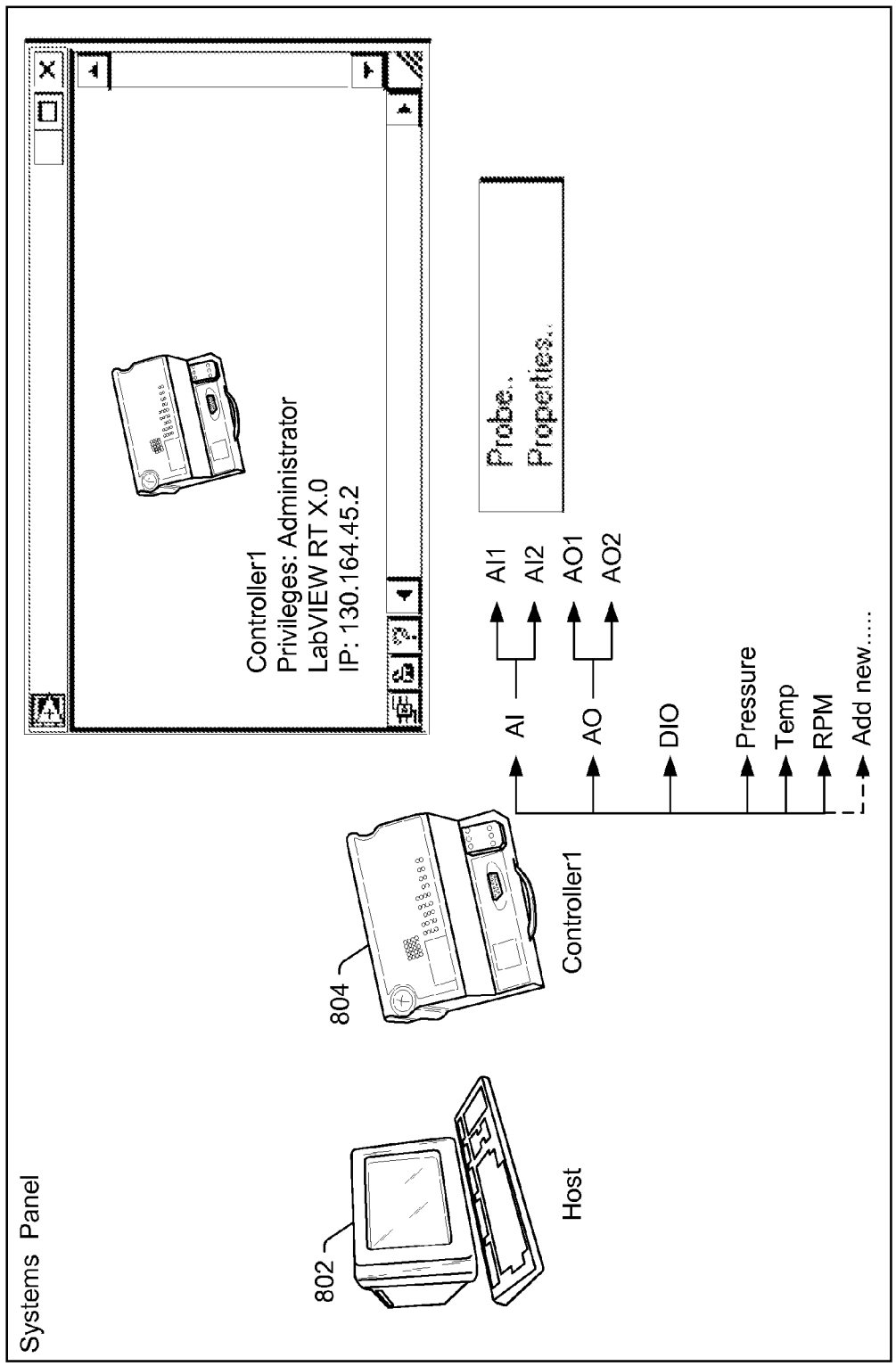
FIG. 30 illustrates the configuration diagram of FIG. 30 where the user has selected an option to view I/O channels and data points of a device icon, and a context-sensitive help window is displayed.

Although not shown in FIG. 29, when the user selects the I/O selection, in one embodiment a measurement configuration program, such as Measurement and Automation Explorer from National Instruments, may be initiated to configure I/O channels. If I/O channels already exist or have previously been configured, then these items may be displayed, as shown in FIG. 30. Thus, when the user selects the I/O or tags items in FIG. 29, if physical I/O points had previously been configured, or data points or tags had previously been configured, then information regarding these may be displayed. For example, as shown in FIG. 30, if the user selects the I/O menu item, various configured I/O channels may be illustrated, such as analog input, analog output, or digital I/O. As also shown in FIG. 30, if the user selects the tags or data points item, various configured data points may be shown, such as, e.g., pressure, temperature, RPM etc. Thus, as shown in FIG. 30, the system may display configured I/O or configured data points. These items may be displayed in a "tree view", or other suitable view. The system may also display an "add new" feature which allows the user to add new physical I/O or data points directly to the tree structure shown in FIG. 30.

FIG. 30 also shows an example where a user may select a help feature for a device icon. For example, the user may right click on the controller1 device icon 804 and select a help feature. The help window "Context Help" may then appear as shown in FIG. 30. The help window may provide various information about the device, such as the name of the device, security privileges, installed software, IP address, calibration information and other information. The help window may be context sensitive. Thus, once a help feature has been selected, and a help window appears as shown, the user may move his/her mouse across the configuration diagram to view context sensitive help related to other device icons, program icons, or other items displayed. Thus, as the user moves the mouse onto different device icons, this causes context sensitive help for that respective device to appear in the help window. Similar operation occurs for other icons, such as program icons.

As also shown in FIG. 30, the user can select a data point item and select various options. For example, the user can select an analog input item (e.g., AI1), which causes a menu to be displayed, from which the user can probe the I/O point (data point) or configure properties of the I/O point. Another feature of the "tree view" shown in FIG. 30 is that every individual tree is preferably collapsible. Thus, the user can choose to see only programs, only data points, only I/O channels, or an entire hierarchical view.

In large distributed systems, the configuration diagram (or system panel) can include a number of different device icons.

In one embodiment, the user can select a particular device icon and cause this device icon to be the only device icon displayed on the screen. Alternatively, the user can select a device icon, causing the device icon to be displayed in a separate panel. The user can then expand the device icon to view various views (e.g., tree views) of the device icon, such as program icons representing programs stored on the device, data points present in the device (such as I/O channels), configuration data such as IP address, etc. The user can also use a browse feature to browse among or discover new/old devices. The user can further select an option to add/show new (or un-configured) devices automatically.

Figure 31:
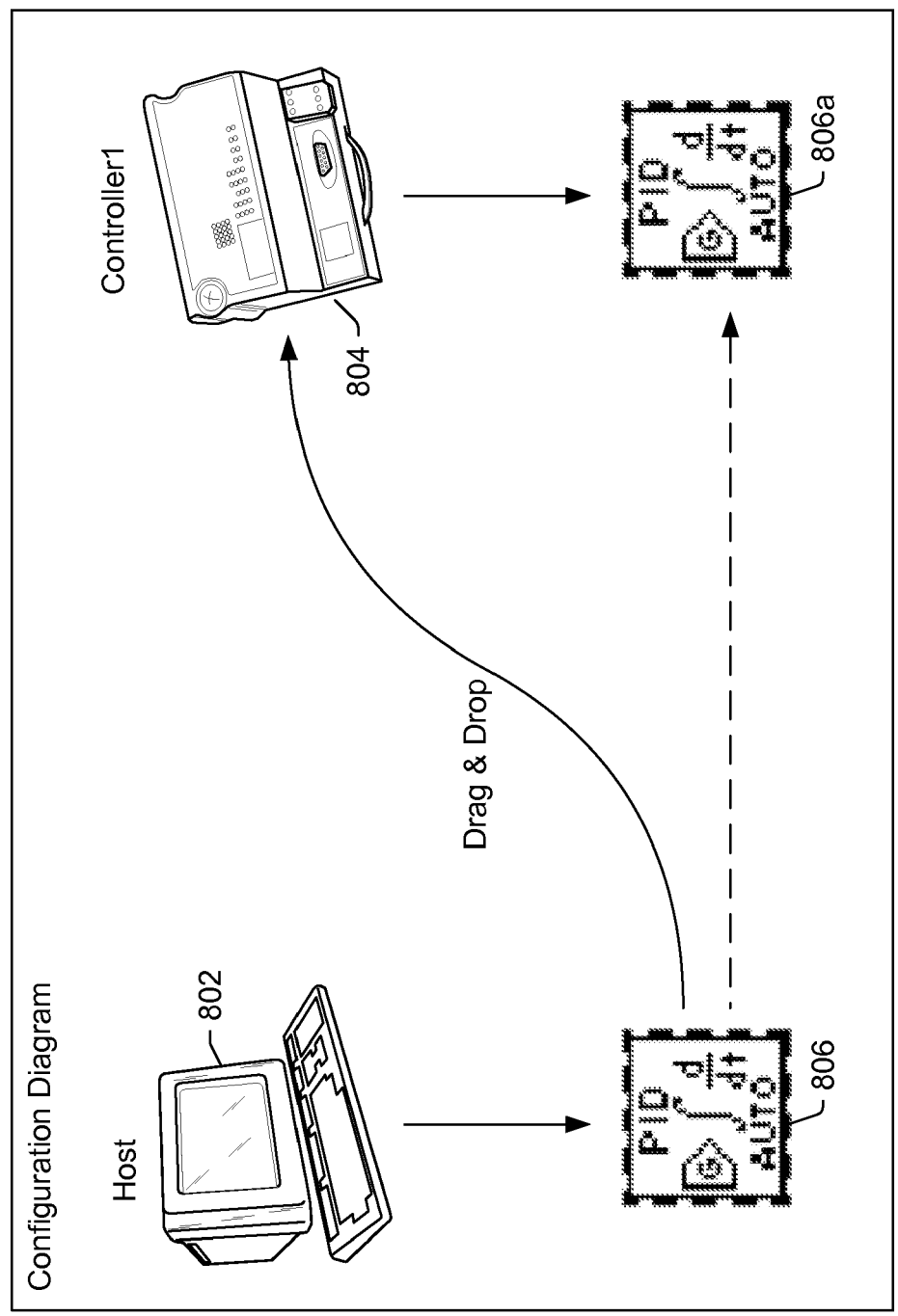
FIG. 31 illustrates operation whereby a user drags and drops a program icon from a first device icon onto a second device icon.

FIG. 31—Deploying a Program to a Device

FIG. 31 illustrates an example of deploying a program represented by a program icon onto a target device. The example shown in FIG. 31 corresponds to the methods described above with respect to FIGS. 15-18. As shown, FIG. 31 illustrates a configuration diagram which includes a device icon 802 that represents a host computer, and a device icon 804 that represents a measurement or control device, in this case a Fieldpoint device (referred to as "Controller1") from National Instruments Corporation. As shown, the host computer device icon 802 includes a program icon referred to as PID 806, which represents a PID control program. In this example, the PID program icon 806 represents a PID virtual instrument or VI developed in LabVIEW. As shown, the user can select the PID program icon 806 and associate (e.g., drag and drop) the PID program icon 806 onto the target device icon 804, i.e., the Fieldpoint device icon 804 referred to as Controller1. After the user has performed this drag and drop operation, the program represented by the program icon 806 is deployed onto the target device (Controller1). This is graphically illustrated in the configuration diagram whereby the PID program icon 806a is shown displayed associated with, e.g., underneath (and possibly connected with), the device icon corresponding to the Fieldpoint device.

After a program icon has been deployed onto the device, it may be desirable to run the program or perform various debugging operations. In one embodiment, the user can select the program icon and start the program, or configure the program to start at a selected time. In the case where the device does not include its own native display capability, in one embodiment, debugging operations can be performed using the display of the host computer system. The display of the host computer system may be used to display debugging operations, such as execution highlighting, single stepping and other debugging features, for a program that is executing inside the target device.

FIG. 32—Associating a Data Point (or I/O Channel) with a Program Front Panel

FIG. 32 illustrates an example of a user selecting a data point item associated with a device icon (Controller1) and associating or dragging and dropping this data point item onto the user interface or front panel of a program. Similar operations may be performed when the user associates a device icon with the user interface or front panel of a program. In this example, the user has selected the RPM (Revolutions Per Minute) data point item and has dragged and dropped this data point item onto the front panel of a graphical program, such as the front panel of a LabVIEW VI. When the user associates or drags and drops a data point item onto the user interface or front panel of a program, in one embodiment, the system may automatically create or display a GUI element, e.g., an indicator or control, in the user interface or front panel that is associated with this data point. This GUI element may be "bound" to the data point. For example, the GUI element may be used to monitor the value of the data point in a "live" fashion, e.g., the value of the data point may be displayed in the GUI element in real time during program execution. The binding may be accomplished using data socket technology as described in U.S. Pat. No. 6,370,569 (application Ser. No. 09/185,161) titled "Data Socket System and Method for Accessing Data Sources Using URLs", which is hereby incorporated by reference. If the GUI element is a control, the GUI element may be used to control or change the value or parameters of the data point, either statically or dynamically during run-time. This drag and drop operation may thus cause a data binding to be created between the GUI element and the data point. Thus, the user can view this GUI element to monitor the value of the data point in a "live" fashion, and may optionally adjust the data point value or parameters associated with the data point value.

In one embodiment, when the user associates or drags and drops a data point onto a program front panel or user interface, the system automatically creates (e.g., selects an displays) a type of GUI element that is appropriate for the type of data represented by the data point. For example, if the data point represents a signal, the system may automatically create or display a chart, waveform or graph GUI element that is capable of displaying the signal. The range or scale of the GUI element may also be configured to display the signal appropriately. As another example, if the data point represents a Boolean value, the system may automatically create a Boolean indicator. In addition, if the data point is a read-only data point, that the system may create a an indicator for this data point. If the data point is write only, the system may create a control for this data point. If the data point is both readable and writeable, then the system may create both a control and indicator for this item, or a single GUI element that is both readable and writeable.

It is noted that similar operations to those described above may be performed when the user associates (e.g., drags and drops) an icon representing other types of data points, such as an I/O element or channel icon (such as AI1) onto a program front panel. Thus, when the user associates (e.g., drags and drops) an I/O element or channel (such as AI1) onto a program front panel, a GUI element (e.g., control or indicator) may be created which can be used to display the value of the channel and/or manipulate the value of the channel. When the user associates a device icon onto a program user interface or front panel, a GUI element may be created which displays data associated with the device, or which can control data associated with the device.

Figure 33A:
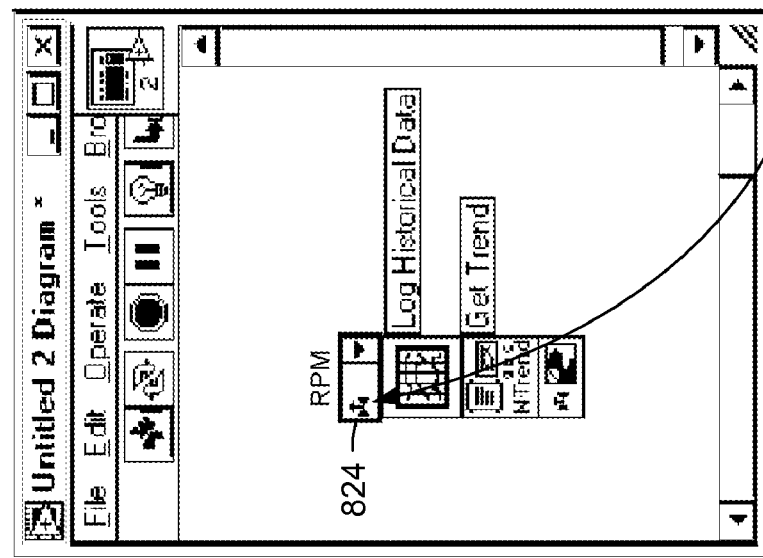
FIG. 33A illustrates operation whereby a user selects a data point element from the configuration diagram and drags and drops the data point element from the configuration diagram on to the block diagram of a graphical program.

FIGS. 33A and B—Associating a Data Point (or I/O Channel) with a Program Block Diagram FIG. 33A illustrates an example where the user has selected a data point item, such as RPM, and has associated or dragged and dropped this data point item onto the block diagram of a graphical program. As shown, this drag and drop operation may cause a graphical program element, e.g., a node 824, to appear in the block diagram that corresponds to the data point item. The graphical program element 824 may correspond to the data point icon and may be operable to programmatically access, i.e., read and/or write values from/ to the data point. In other words, the graphical program element may be operable to read and/or write the data point during graphical program execution. This graphical program element or node 824 may be configured with various functions or properties. In the example shown in FIG. 33A, the graphical program element has the capability to "Log Historical Data" of the data point or "Get Trend" of the data.

Figure 33B:
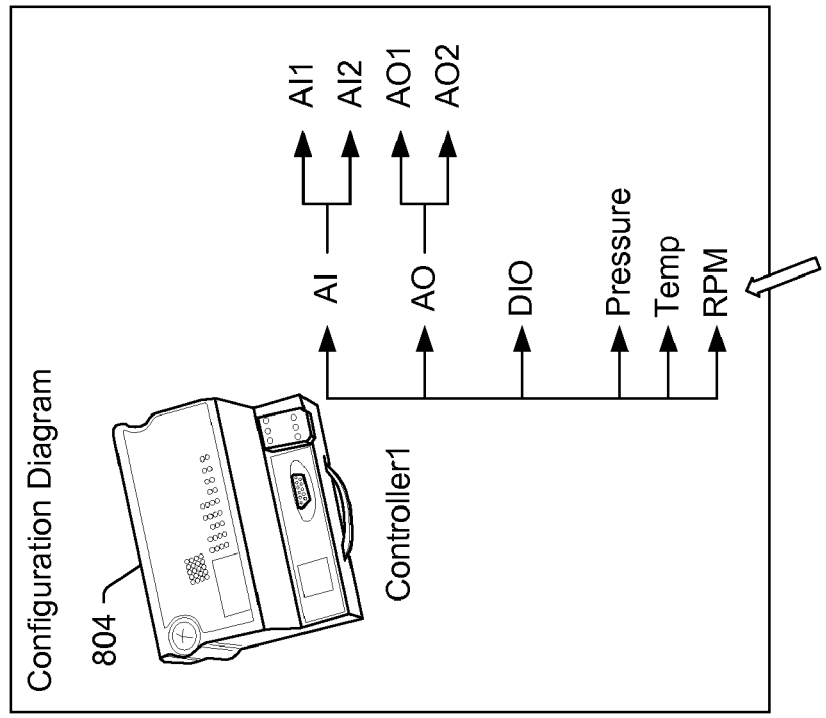
FIG. 33B illustrates operation whereby a user "wires up" an icon representing the data point element with other nodes or graphical program elements in the block diagram.

As shown in FIG. 33B, the user can then connect this graphical program element with other nodes in the block diagram to affect programmatic access, i.e., reading of or writing to, data and/or parameters of this data point. The user can also connect this graphical program element with GUI elements (or a terminal of a GUI element) to enable user access or control of the data point.

For example, the user can connect the output of a function node (e.g., "Calc RPM 822) in the graphical program to the graphical program element 824 that represents the RPM data point (the "RPM graphical program element). Thus, during graphical program execution, a function node may write a value to the RPM graphical program element 824 that programmatically changes a parameter value or data value of the RPM data point. As another example, the user can wire an output of the RPM graphical program element 824 to another function node (e.g., node 826) so that this other function node 826 can read parameter values or data values of this data point. As another example, the user can wire a GUI element (or the terminal of a GUI element) to the RPM graphical program element to enable the user to view or modify values associated with the data point during (or either before or after) program execution.

In the example of FIG. 33B, the user has wired a "Calc RPM" node 822 to an input of the RPM node 824, wherein the Calc RPM node 822 operates to calculate the RPM value for the data point and write this calculated RPM value to the RPM data point represented by node 824. The user has also wired a data logging node 826 to an output of the RPM node 824, wherein the data logging node 826 operates to log values of the RPM data point to a file.

Thus, as described above with respect to FIGS. 32, 33A and 33B, with a simple is drag and drop operation of a data point item onto the block diagram of a graphical program, a graphical program element corresponding to this data point is included in the diagram. The user can easily configure the graphical program element that corresponds to this particular data point for programmatic access or user access. With a simple drag and drop operation of a data point item onto the front panel of a graphical program, a GUI element corresponding to this data point is included in the front panel. This allows user viewing or modification of parameters or data of this data point during program execution. In addition, the same functionality may be used for other items associated such as a device icon or program icon, or various types of data points such as I/O channels, e.g., analog input, analog output or digital I/O channels.

The user can of course also drag and drop other items associated with device icons into a program, such as the block diagram of a graphical program. For example, as described above, the user can drag and drop program icons for a program stored on a device into the block diagram of a graphical program. As another example, a device represented by device icon may include one or more files or configuration data, whereby the user can select a graphical item or icon representing this file or configuration data and drag and drop this item onto the block diagram (or front panel) of a graphical program. This may also allow programmatic access to this file or configuration data.

Figure 33B:
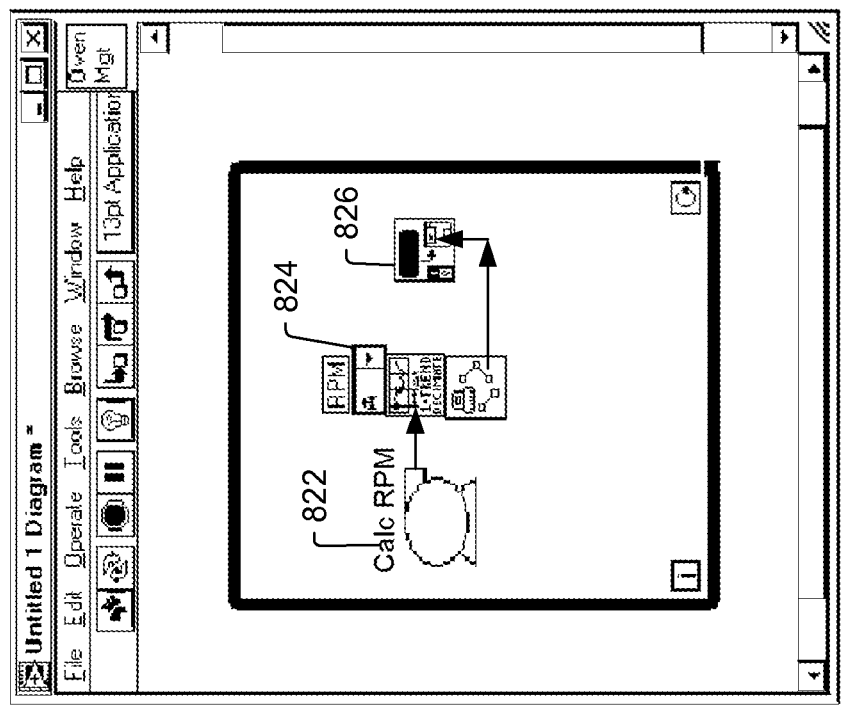

It is also noted that the method described in FIGS. 32 and 33 may also be used with text based programs rather than graphical programs. For example, the user may drag and drop a data point item (e.g., I/O channel item) into a particular location in a C-language program, causing appropriate function call or C programming statements to automatically be included in the program. These textual programming statements may be operable to programmatically read and/or write to this data point. The user may also drag and drop a data point item (e.g., I/O channel item) into the user interface associated with a text language program, with similar operation as described above for the user interface of a graphical program.

Figure 34:
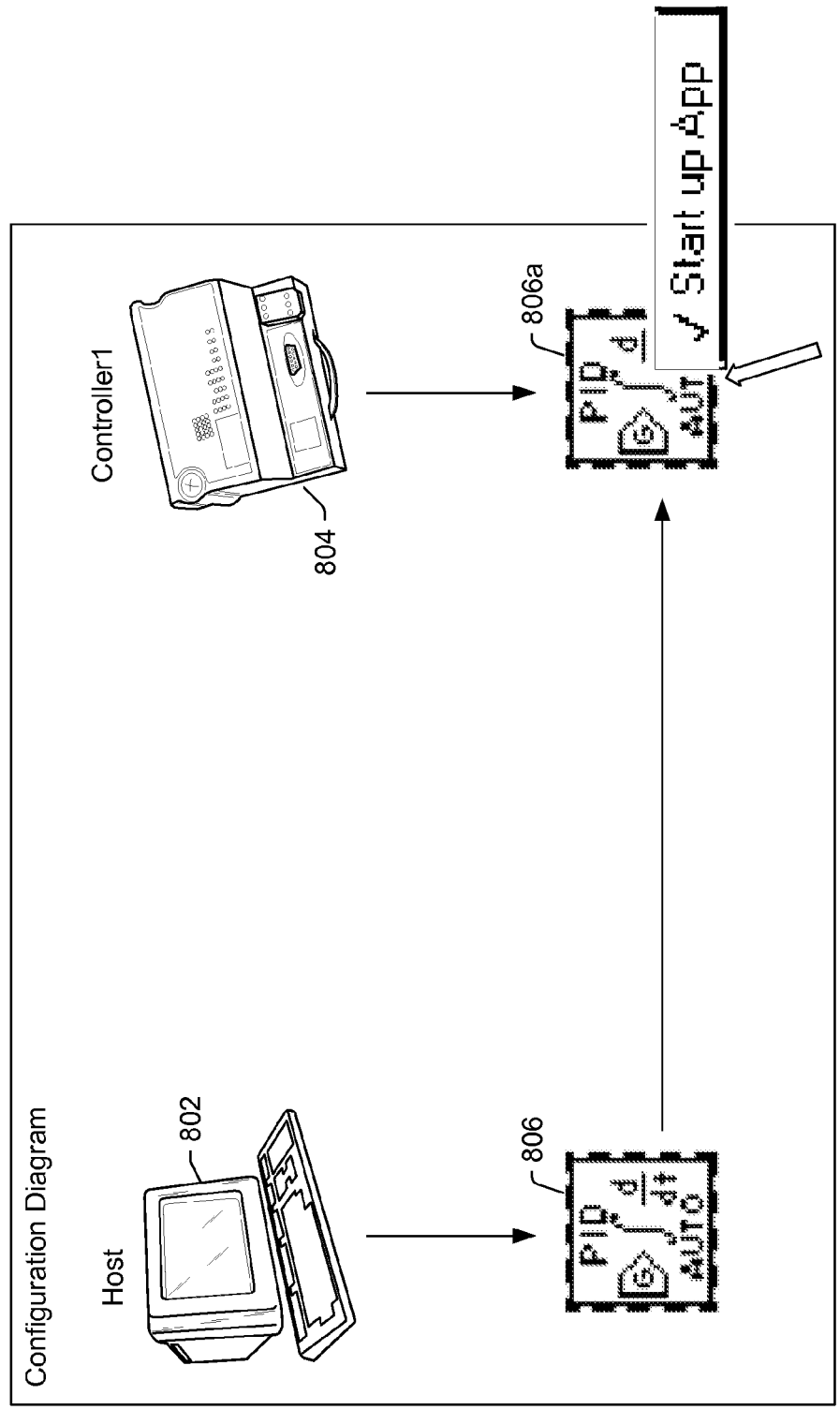
FIG. 34 illustrates operation whereby a user selects a program icon to start operations.

FIG. 34—Start Up Application Feature

FIG. 34 illustrates an example where the user has previously deployed a program onto a target device as described above with respect FIG. 31. In FIG. 34, the user has selected the PID program icon associated with controller1 and has selected a "start up application" feature. When this feature is selected, every time the respective target device is powered on or boots up, the program corresponding to the program icon is executed.

Figure 35:
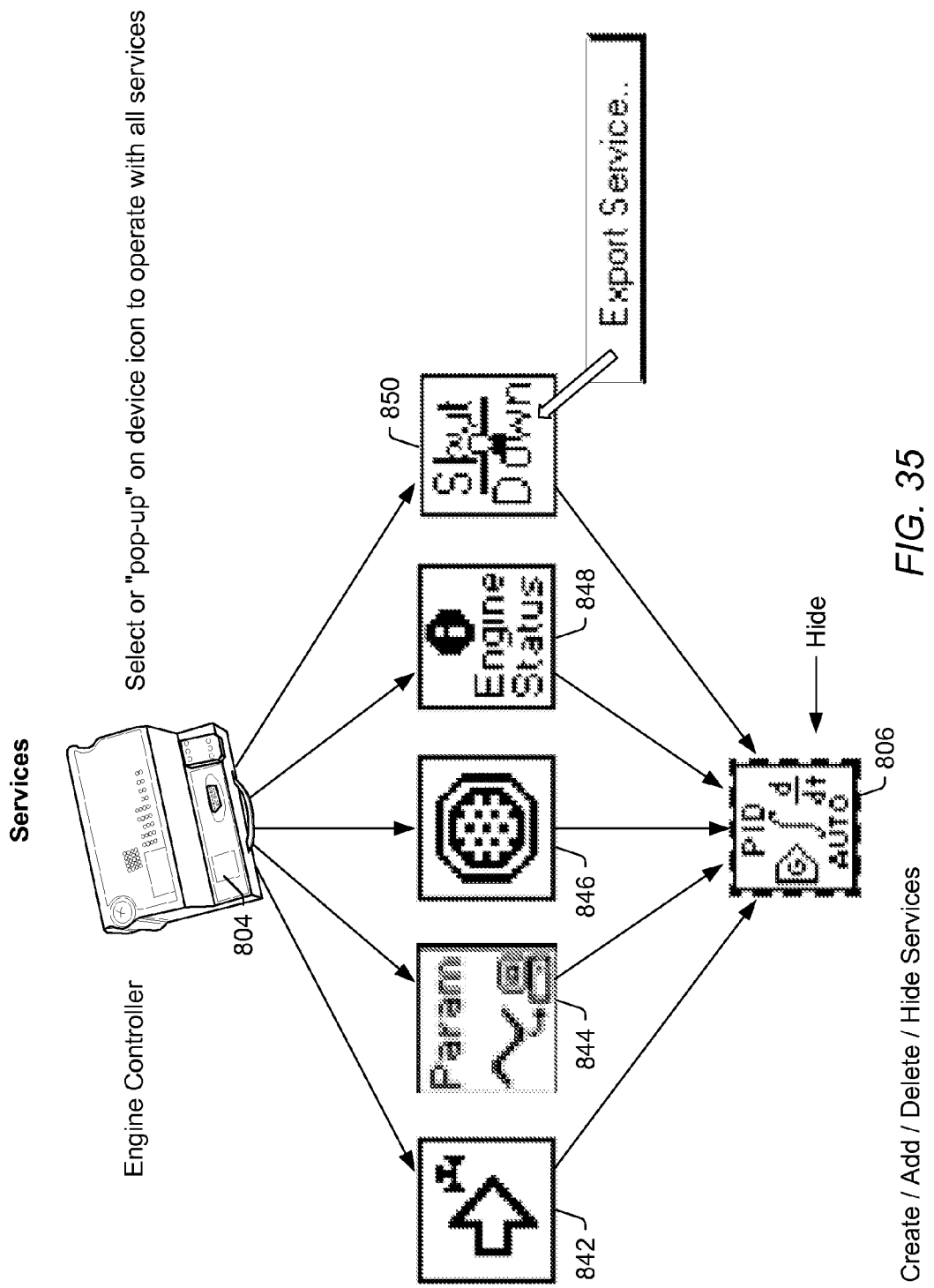
FIG. 35 illustrates exemplary service icons that can be used to control device execution.

FIG. 35—Service Icons

FIG. 35 illustrates a device icon which includes a number of associated service icons. Service icons represent a high level mechanism for interacting with an application or a device. As one exemplary use, it may be presumed that a developer desires to create an application that may then be used by other users. In this example, the user may desire to hide various program icons which represent underlying program functionality, and rather only expose certain basic services of the application. In FIG. 35, service icons 842-850 are displayed which correspond to starting the application program (842), modifying or viewing parameters of the application or device (844), stopping the application (846), checking the status of the application or device (848), or shutting down the application or device (850). Thus, the user can package up an application and distribute his application to a number of different users, whereby the receiving users may only view the service icons 842-850. These service icons 842-850 provide basic high level functionality, without exposing the underlying program structure.

Figure 36:
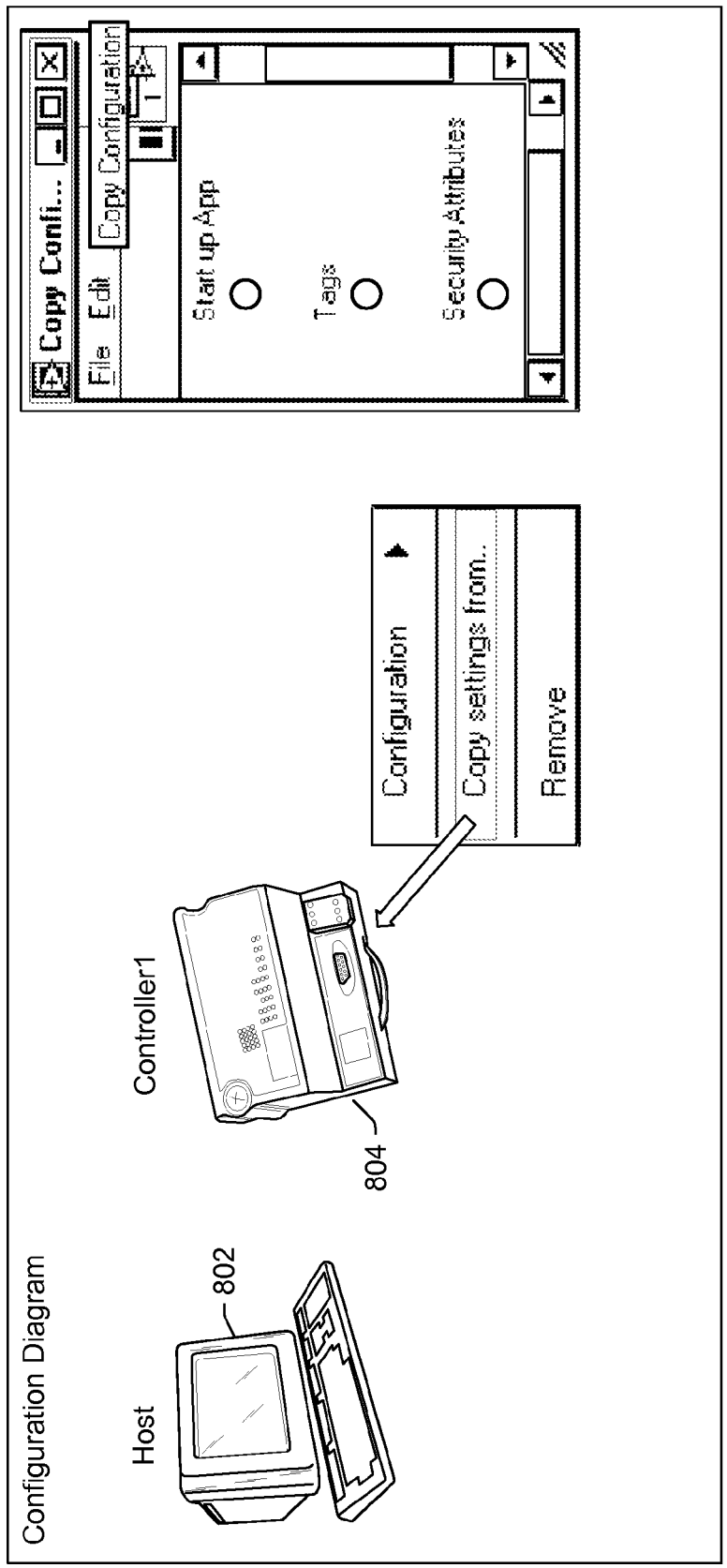
FIG. 36 illustrates operation whereby a user desires to copy settings from a device icon to another device icon.

FIG. 36—Copying Device Settings to Other Devices

FIG. 36 illustrates an example where a user desires to copy the settings from a first device icon and then optionally "paste" or configure the settings onto a second device icon corresponding to a second device. Here, the user may select or right click on a first device icon (e.g., device icon 804) and select a "Copy settings from" option from a menu. This operates to copy the settings of the respective device corresponding to the first device icon 804. The user may then select a second device icon (not shown) corresponding to a second device and paste the settings onto that second device. This provides an easy mechanism to copy settings among various devices.

Remote Debugging

In another embodiment, remote debugging of graphical program block diagrams may be performed in a distributed system. For example, where a graphical program is deployed on a remote device, the user at the main computer 82 may be able to select the device icon and/or select a respective program icon associated with the device and view the block diagram of the graphical program. The user may be able to view the block diagram on the display of the main computer system, wherein this block diagram is actually executing on a remote device. The user may then be able to use various debugging tools that are useful with respect to block diagrams, such as break points, single stepping, and execution highlighting.

The user thus may be able to use the displayed block diagram as a graphical user interface for debugging the block diagram executing on the remote device. The user can single step through the block diagram executing on the remote device using the block diagram GUI displayed on the main computer system display. Also, as a block diagram executes on a remote device, the user may be able to view the block diagram on the main computer system, wherein the respective nodes in the block diagram displayed on the main computer system are highlighted as these nodes execute on the remote device. The user may also be able to view the data output from each of the respective nodes on the block diagram displayed on the main computer system 82 as the respective nodes produce data executing on the remote device.

Viewing Front Panels of Graphical Programs

As mentioned above, the user can select an option on a program icon which represents a program having a corresponding user interface or front panel, wherein this selected option enables the user to view the user interface or front panel, either statically or dynamically during execution. Thus, where the user has a configuration diagram including device nodes and/or program nodes representing programs distributed throughout the system, the user may be able to select any program icon in the distributed system and view the corresponding user interface or front panel of the program as it executes. This provides the user the ability to view the status of execution of programs to put on any of the various devices present in the system.

Asynchronous Data Flow Node

In another embodiment, the user may be able to include an asynchronous data flow node or icon in two or more block diagrams or graphical programs to allow distributed execution among the two or more block diagrams or graphical programs. An asynchronous data flow icon may include two portions which comprise part of the same queue or memory. One portion of the asynchronous data flow icon may be a reader portion and the other portion may be a writer portion. The user may then distribute the reader and writer portions with different devices or different programs, e.g., using the association techniques described above. Thus, a writer portion of the asynchronous dataflow node in a first block diagram may operate to write data to the queue, and a reader portion of a second different block diagram may operate to read data from this queue. These reads and writes may occur asynchronously to each other. This allows a first block diagram to communicate data to a second block diagram, wherein the data may be communicated asynchronously with respect to the second block diagram. This asynchronous data flow may also be configured for bi-directional communication, i.e., with readers and writers in both the first and second block diagrams or graphical programs. This asynchronous data flow may be particularly desirable between a computer system and a remote device.

Therefore, with simple graphical tools, the present system helps a user select and manage a system, such as a measurement system (e.g., a data acquisition system) throughout its complete lifecycle. The tools described herein allow the user to select and order complete systems, including sensors, signal conditioning, data acquisition, industrial computers and software, (including machine vision, motion control, etc.). For example, the configuration diagram displayed on computer 82 may be used by a user to aid in ordering devices or programs from an electronic commerce site presented by server computer 90. The system may also operate to ensure that all components are compatible with each other and that all required parts are order to enable the user to get up and running quickly.

The present system also may be used to help the user in connecting his/her system together, providing cabling diagrams to help understand how sensors, signal conditioning and data acquisition hardware connect together. The present system helps avoid polarity problems, ground current loops, and missing connections. The system may even assist with sensor excitation requirements. One embodiment of the invention allows the user to design his/her own custom cabling interfaces.

In one embodiment, the present system starts with the user's graphical system description and automatically configures easy-to-use DAQ Channel Names—with sensor scaling and unit information built in. A configuration program, such as Measurement & Automation Explorer from National Instruments Corporation, can verify each of the input and output channels—in units or by reading raw voltages.

The present system may also operate to analyze the quality-of-measurement characteristics of configured devices to help the user understand and document the overall measurement uncertainty in the system using industry-standard formulae and terminology. This informs the user about the quality of the measurements.

As the user constructs a system, the graphical tools of the present system make it easy for the user to document the system whether the documentation of the system is for the user, or intended to satisfy thorough corporate or legislative standards. Asset data can be stored locally or in a variety of SQL-compatible databases. The user may have complete control over the format of generated reports. A number of templates are included, such as calibration reports, and financial asset management.

The present system may also simplify system maintenance. The system may operate to remind the user when devices need to be re-calibrated. The system may even be configured to prevent the user from taking measurements with devices that have expired calibration certificates.

The present system may also aid the user in deploying systems as the user moves from the R&D lab to the production floor. The network deployment tools of the present system make it easy to replicate system configuration to one or many destination machines. The system may operate to update information about the physical assets connected to each deployed machine—device serial numbers and calibration data, for example. The system may also include configuration management tools that verify that all changes to a system are recorded.

Therefore, the system offers a number of advantages to the user. The present system allows the user to create a graphical description (configuration diagram) of his/her physical system. The user may operate to select sensors, signal conditioning devices, data acquisition hardware devices, measurement devices, automation devices, etc. for the system being developed.

Various other features of one embodiment of the invention are as follows:

The system does not require hardware to operate.

The system creates custom DAQ Channels for the user's inputs and outputs.

The system verifies that the configuration diagram elements or parts are compatible.

The system may assists with cabling.

The user can annotate his diagram with additional free-form information.

The system can examine hardware to further document his system. The system can, for example, query hardware for transducer electronic data sheets (TEDS), calibration dates, serial numbers, etc. The user can supply this same data manually.

The system creates/modifies scaling information for the DAQ channels based on the TEDS.

The system can help a user produce a virtual TEDS for his sensor. (Physical Metrology).

The user can generate reports displaying this data. The display formats are user-definable, and the system ships with several example templates.

The system can be used a pre-sales tool or an electronic commerce tool, including specification and validation of customer orders The system can help a user perform end-to-end calibration.

The system can help a user modify his documentation when a system is deployed—e.g., re-detect hardware information, step the user through physical or end-to-end calibration, etc.

The system informs the user when calibration is due. The user can configure the system to produce warnings or fail to run entirely when calibration is overdue.

The system can combine quality-of-measurement information from the sensors, conditioning and DAQ boards to produce an overall error estimate. The system can assist users with expression of measurement uncertainty conforming to a variety of industry and government standards.

The user can design custom cabling interfaces between DAQ hardware and sensors.

The system handles measurement and automation property management. The system not only records calibration information, but also can report on inventory, reliability data, financial records, etc. (Alternatively, the system can interoperate with third-party property management tools such as Fluke's MET/TRACK or MET/CAL.)

The system supports configuration management. The system at least records all changes to the system, but perhaps also allows different levels of user access. The system may integrate with deployment tools so that changes due to deployment are handled well.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for deploying a program in a system, wherein the method executes on a first computer system, the method comprising:
    displaying a plurality of program icons on a display of the first computer system, wherein each of the program icons corresponds to a respective at least one program of a plurality of programs;
    displaying a device icon on the display of the first computer system, wherein the device icon corresponds to a device in the system, wherein the device is coupled to the first computer system;
    associating a first program icon of the plurality of program icons with the device icon in response to user input, wherein the first program icon corresponds to a first program;
    wherein the first program and one or more second programs are configured to execute according to a specified relationship, wherein the first program is configured to call the one or more second programs according to the specified relationship, and wherein the one or more second programs have corresponding one or more second program icons;
    deploying the first program onto the device in response to said associating, wherein said deploying comprises deploying the one or more second programs onto the device in response to said associating and in response to the specified relationship;
    displaying the first program icon connected to the device icon in response to said associating, wherein the first program icon displayed connected to the device icon visually indicates that the first program is deployed on the device; and
    displaying the first program icon and the one or more second program icons proximate to the device icon in response to said associating, wherein the first program icon and the one or more second program icons displayed proximate to the device icon visually indicates that the first program and the one or more second programs are deployed on the device.

2. The method of claim 1,
    wherein said displaying the first program icon comprises modifying the first program icon to visually indicate that the first program is deployed on the device and will be executing on the device.

3. The method of claim 1, further comprising:
    wherein said displaying the first program icon and the one or more second program icons comprises displaying the one or more second program icons connected to the first program icon.

4. The method of claim 1,
    wherein the plurality of programs are comprised in an application;
    wherein, when the application executes, the application is operable to invoke the first program on the device.

5. The method of claim 1, wherein the plurality of programs comprise an application, the method further comprising:
    modifying the application to invoke the first program on the device in response to said associating;
    executing the application after said deploying;
    the application invoking the first program on the device during said executing; and
    the first program executing on the device.

6. The method of claim 1,
    wherein said associating the first program icon of the plurality of program icons with the device icon in response to user input comprises dragging and dropping the first program icon onto the device icon.

7. The method of claim 1,
    wherein the plurality of programs include one or more graphical programs.

8. A non-transitory computer-accessible memory medium comprising program instructions for distributing an application among devices in a system, wherein the application comprises a plurality of programs, wherein the system comprises a plurality of devices, wherein the program instructions are computer-executable to implement:
    displaying a plurality of program icons on a display of a first computer system, wherein each of the program icons corresponds to a respective at least one program in the application;
    displaying a plurality of device icons on the display of the first computer system, wherein each of the device icons corresponds to a device in the system;
    associating a first program icon of the plurality of program icons with a device icon in response to user input, wherein the first program icon corresponds to a first program in the application, wherein the device icon corresponds to a device in the system;
    wherein the first program and one or more second programs are configured to execute according to a specified relationship, wherein the first program is configured to call the one or more second programs according to the specified relationship, and wherein the one or more second programs have corresponding one or more second program icons;

deploying the first program onto the device in response to said associating, wherein said deploying comprises deploying the one or more second programs onto the device in response to said associating and in response to the specified relationship;

displaying the first program icon connected to the device icon in response to said associating the first program icon with the device icon, wherein the first program icon displayed connected to the device icon visually indicates that the first program is deployed on the device; and displaying the first program icon and the one or more second program icons proximate to the device icon in response to said associating, wherein the first program icon and the one or more second program icons displayed proximate to the device icon visually indicates that the first program and the one or more second programs are deployed on the device.

9. The non-transitory memory medium of claim 8, wherein the program instructions are further executable to implement:

modifying one or more of an appearance or a position of the first program icon to visually indicate that the first program is deployed on the device and is executable on the device, wherein said modifying is performed in response to said associating.

10. The non-transitory memory medium of claim 8, wherein the program instructions are further executable to implement:

displaying the first program icon proximate to the device icon in response to said associating;

wherein the first program icon displayed proximate to the device icon visually indicates that the first program is deployed on the device.

11. The non-transitory memory medium of claim 8, wherein said displaying the plurality of device icons further comprises displaying connections between the plurality of device icons, wherein the displayed connections indicate physical couplings between the devices.

12. The non-transitory memory medium of claim 8, wherein, when the application executes, the application is operable to invoke the first program on the device.

13. The non-transitory memory medium of claim 8, wherein the program instructions are further executable to implement:

modifying the application to invoke the first program on the device in response to said associating; and executing the application after said deploying, including the application invoking the first program on the device during said executing, and the first program executing on the device.

14. The non-transitory memory medium of claim 8, wherein said associating the first program icon of the plurality of program icons with the device icon in response to user input comprises dragging and dropping the first program icon onto the device icon.

15. The non-transitory memory medium of claim 8, wherein said plurality of programs include one or more graphical programs.

* * * * *